(12) United States Patent
Wright

(10) Patent No.: US 10,323,907 B1
(45) Date of Patent: Jun. 18, 2019

(54) PROPORTIONAL VELOCITY-DEFICIT GUIDANCE FOR BALLISTIC TARGETING ACCURACY

(71) Applicant: Cummings Aerospace, Inc., Huntsville, AL (US)

(72) Inventor: Charles W. Wright, Huntsville, AL (US)

(73) Assignee: Cummings Aerospace, Inc., Huntsville, AL (US)

( * ) Notice: Subject to any disclaimer, the term of this patent is extended or adjusted under 35 U.S.C. 154(b) by 0 days.

(21) Appl. No.: 15/688,172

(22) Filed: Aug. 28, 2017

Related U.S. Application Data

(60) Provisional application No. 62/380,180, filed on Aug. 26, 2016.

(51) Int. Cl.
| | |
|---|---|
| *G06F 19/00* | (2018.01) |
| *F41G 7/36* | (2006.01) |
| *F41G 7/34* | (2006.01) |
| *F41G 7/00* | (2006.01) |
| *G06F 17/12* | (2006.01) |

(52) U.S. Cl.
CPC .............. *F41G 7/36* (2013.01); *F41G 7/006* (2013.01); *F41G 7/346* (2013.01); *G06F 17/12* (2013.01)

(58) Field of Classification Search
CPC . F41G 7/30; F41G 7/303; F41G 7/007; F41G 7/20; F41G 7/22; F41G 7/2206; F41G 7/226; F41G 7/2293; F41G 7/306; F41G 7/343; F41G 7/36; F42B 15/01; F42B 10/66
USPC .......................................................... 235/417
See application file for complete search history.

(56) References Cited

U.S. PATENT DOCUMENTS

| | | | |
|---|---|---|---|
| 4,470,562 A * | 9/1984 | Hall ................... | F41G 7/343 244/3.2 |
| 5,082,200 A | 1/1992 | Gray | |
| 5,328,129 A | 7/1994 | Gray | |
| 5,435,503 A | 7/1995 | Johnson, Jr. et al. | |
| 5,671,138 A * | 9/1997 | Bessacini .......... | G05D 1/12 244/3.13 |

(Continued)

OTHER PUBLICATIONS

Si-Yuan Chen et al., A Multiconstrained Ascent Guidance Method for Solid Rocket-Powered Launch Vehicles, International Journal of Aerospace Engineering, Mar. 28, 2016, vol. 2016, Hindawi Publishing Corporation.

Chen Feng et al., Guidance Based on Velocity-to-be-gained Surface for Super-range Exoatmospheric Intercept, 2010.

Sang-Jae Kim et al., Flight-Path Angle Control for Cutoff Insensitive Guidance, Journal of Guidance, Control, and Dynamics, April, vol. 38, No. 4: pp. 706-710, online publication May 30, 2014.

(Continued)

*Primary Examiner* — Thien M Le
(74) *Attorney, Agent, or Firm* — Angela Holt; Bradley Arant Boult Cummings LLP

(57) ABSTRACT

A method for guiding a ballistic missile to a target has a first mode guidance process that drives a magnitude of a velocity-to-go (Vgo) vector toward zero. On regular intervals, a proportional velocity deficit value is calculated as equal to a time constant (Tau) multiplied by a specific force magnitude (sf). When the magnitude of the Vgo vector has been driven to less than or equal to the proportional velocity deficit value by way of the first mode guidance process, a second mode guidance process is initiated. The second mode guidance process constrains the magnitude of the Vgo vector to be equal to the proportional velocity deficit value throughout the remaining portion of powered flight.

26 Claims, 36 Drawing Sheets

(56) References Cited

U.S. PATENT DOCUMENTS

| | | | | |
|---|---|---|---|---|
| 5,671,140 A * | 9/1997 | Bessacini | ............... | G05D 1/12 |
| | | | | 244/3.13 |
| 5,788,179 A | 8/1998 | Wicke | | |
| 5,804,812 A | 9/1998 | Wicke | | |
| 5,811,788 A | 9/1998 | Wicke | | |
| 5,862,496 A * | 1/1999 | Biven | ............... | F41G 5/08 |
| | | | | 244/3.11 |
| 5,944,762 A * | 8/1999 | Bessacini | ............... | F41G 7/306 |
| | | | | 701/27 |
| 6,244,535 B1 | 6/2001 | Felix | | |
| 6,382,554 B1 | 5/2002 | Hagelin | | |
| 7,032,857 B2 | 4/2006 | Hua | | |
| 7,825,848 B2 * | 11/2010 | Schoettl | ............... | G01S 13/72 |
| | | | | 342/140 |
| 8,063,347 B1 * | 11/2011 | Urbano | ............... | F41G 7/007 |
| | | | | 244/3.1 |
| 8,130,137 B1 | 3/2012 | Luu et al. | | |
| 8,288,696 B1 * | 10/2012 | Boka | ............... | F42B 10/66 |
| | | | | 244/3.1 |
| 8,346,690 B2 * | 1/2013 | Omar | ............... | F41G 7/22 |
| | | | | 706/14 |
| 8,436,283 B1 * | 5/2013 | Tournes | ............... | F41G 7/22 |
| | | | | 244/3.1 |
| 8,725,327 B2 * | 5/2014 | Shroff | ............... | G01S 19/47 |
| | | | | 701/21 |
| 9,475,591 B2 | 10/2016 | Dula | | |
| 2017/0036782 A1 | 2/2017 | Dula | | |

OTHER PUBLICATIONS

M. Kothari et al., Energy-Insensitive Guidance of Solid Motor Propelled Long Range Flight Vehicles Using MPSP and Dynamic Inversion, Proceedings of the 17th World Congress, The International Federation of Automatic Control, Seoul, Korea, Jul. 6-11, 2008, pp. 14023-14028.

N. Prabhakar et al., A Predictive Explicit Guidance Scheme for Ballistic Missiles, Defence science journal, Oct. 2013, vol. 63(5), pp. 456-461.

Steven P. Burns et al, Lambert Guidance Routine Designed to Match Position and Velocity of Ballistic Target, Journal of Guidance, Control, and Dynamics, Nov.-Dec. 2004, vol. 27, No. 6, pp. 2-4.

Raul De Celts et al., Guidance and control for high dynamic rotating artillery rockets, Aerospace Science and Technology, 2017, vol. 64, pp. 204-212.

Max Cerf, Space trajectory optimization. Last stage of a launcher—Space debris cleaning. Optimization and Control [math.OC], Université Pierre et Marie Curie—Paris VI, 2012.

Jeffrey F. Glusman, Theoretical Performance Model and Initial Experimentation of a Baffled-Tube Ram Accelerator, University of Washington, 2016.

W.J. Harlin et al., Ballistic missile trajectory prediction using a state transition matrix, Applied Mathematics and Computation 188 (2007) 1832-1847.

\* cited by examiner

PROPORTIONAL VELOCITY-DEFICIT GUIDANCE FOR BALLISTIC TARGETING ACCURACY

CROSS REFERENCE TO RELATED APPLICATIONS

This application claims the benefit of U.S. Provisional Application No. 62/380,180, titled "Proportional Velocity-Deficit Guidance for Ballistic Targeting Accuracy that is Insensitive to Delta-V Uncertainty," filed on Aug. 26, 2016, the entire contents of which are herein incorporated by reference.

GOVERNMENT LICENSE RIGHTS

This invention was made with government support under Contract No. W31P4Q-09-A-0016 awarded by the Department of Defense. The government has certain rights in the invention.

BACKGROUND AND SUMMARY

The guidance method according to the present disclosure reduces aimpoint miss distance sensitivity to mass and motor uncertainties. The guidance method is specifically designed to compensate for solid motors that have the inability to be shut down. This guidance method begins when a velocity-to-go magnitude drops below a threshold that is a function of a specified time constant. Once the guidance method is switched on, a zero effort miss (ZEM) is reduced as though there were a feedback loop nulling the ZEM. At the end of the maneuver the missile attitude will be near the Range Insensitive Axis (RIA) and will continue to hold the ZEM near zero as the motor continues to burn and tail off The method is performed with a novel constraint on the Lambert solution that relies on sensed acceleration feedback rather than any explicit calculation of the ZEM, Instantaneous Impact Point (IIP), or Range Insensitive Axis (RIA), and it can be applied to any ballistic missile that has an exo-atmospheric burnout state. This includes both Earth fixed targets and ballistic intercepts.

PVD guidance is based on the idea that the total ballistic guidance gain is proportional to the missile specific force (sf=thrust/mass) and inversely proportional to the velocity-to-go (Vgo). Dividing sf by Vgo results in units of 1/time which can be thought of as the bandwidth in radians/second. Inverting this equation results in an equivalent first order time constant (Tau=vgo/sf) which is in units of time.

In a typical control feedback loop, a desired time constant is enforced by applying appropriate gain to an error term. For PVD guidance, this error is desired to be the ZEM; however calculating and controlling ZEM directly would require a cumbersome numerical approach. Rather than attempting this, the PVD guidance method of the present disclosure simply constrains Vgo so that Vgo=Tau*sf, through iteration of the Lambert guidance solution which constrains the time-of-flight (TOF). While there is not an explicit ZEM feedback loop, the system behaves as though this loop exists. In fact, the idealized explicit loop may be used in conjunction with the linearized autopilot to predict the linear system response in both the time and frequency domain. This analysis method is referred to herein as the pseudo-loop analogy.

The success of the guidance method has been proven through 6DOF simulation, which demonstrates that the method effectively eliminates any sensitivity to the mass and motor uncertainties that are typically the main guidance accuracy driver when solid boosters are used. Aimpoint dispersions on the order of 100 km due to large motor impulse uncertainty were reduced to less than 5 meters for a 10,000 km trajectory. These results assume perfect navigation, no reentry aerodynamics, and perfect alignment of the thrust vector with the missile axis at zero TVC deflection. The addition of thrust alignment error sources degraded this result to nearly five-hundred meters of miss for 100 Monte-Carlos.

BRIEF DESCRIPTION OF THE DRAWINGS

The disclosure can be better understood with reference to the following drawings. The elements of the drawings are not necessarily to scale, emphasis instead being placed upon clearly illustrating the principles of the disclosure. Furthermore, like reference numerals designate corresponding parts throughout the several views.

DETAILED DESCRIPTION

The acronyms and terminology used herein are defined below:

| Acronyms and Terminology | |
|---|---|
| ECEF | Earth Centered Earth Fixed, an Earth fixed (rotating) coordinate frame located at the center of the Earth. The x-axis goes through zero lat/lon, the z-axis goes through North pole and the y-axis completes the right hand rule |
| GEMS | Generalized Energy Management Steering, method for wasting excessive motor impulse |
| IMU | Inertial Measurement Unit, includes accelerometers and gyros that measure acceleration and angular rate |
| IIP | Instantaneous Impact Point, the point at which a ballistic trajectory will strike the surface of the Earth or will pass through a given altitude. |
| Lambert Problem | Solve for the initial velocity if the initial position, final position, and TOF are known |
| Lambert Solution Locus | Locus or curve of all Lambert solutions for a particular initial and final position |
| Lambert Velocity | Velocity vector that is the solution to the Lambert problem |
| MCPI | Modified Chebyshev Picard Iteration, a numerical method for solving orbital mechanics problems |
| Mdelta | Airframe stability derivative that represents the angular pitch acceleration per unit TVC deflection is all other effects are ignored |
| mf | Final mass of a missile or stage |
| mi | Initial mass of a missile or stage |
| POCA | Point of Closest Approach, the point at which the missile trajectory is the closest it will ever be to the target |
| pseudo-loop | ZEM feedback loop analogy used to predict the PVD guidance behavior |
| PVD | Proportional Velocity Deficit, the commanded value of the Vgo vector in the PVD guidance method, equal to specific force magnitude multiplied by a time constant |
| RIA | Range Insensitive Axis, the direction along which additional delta-V will not affect the ZEM distance. |
| Specific Force | Specific Force (sf) is force/mass. It is the acceleration that is measured by accelerometers in an IMU. Equal to true acceleration minus gravity. |
| Tgo | Time to Go, the remaining time of flight to reach the POCA to the target |
| TOF | Time of Flight, either total time of flight, or remaining time of flight (Tgo) |

Acronyms and Terminology

| | |
|---|---|
| TVC | Thrust Vector Control |
| Vcap | Delta-velocity remaining in a missile or stage |
| Velocity Deficit | Another term for Vgo, typically referring to the magnitude of Vgo in this application |
| Vgo | Velocity to Go, vector or scaler additional instantaneously applied velocity required to hit the target |
| ZEM | Zero Effort Miss, the ballistically propagated miss distance at POCA |

Figure 1:
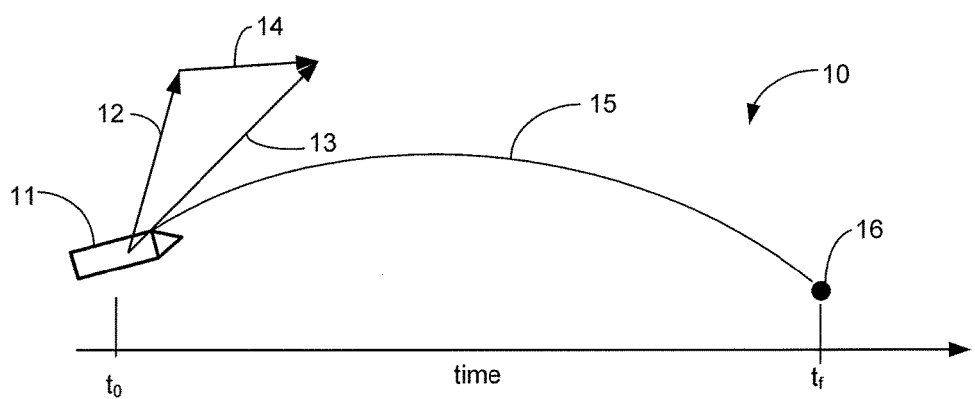
FIG. 1 depicts an exemplary missile guidance system.

FIG. 1 depicts an onboard ballistic missile guidance system 10. The system 10 comprises a missile 11 that is guided from an initial time $t_0$ on a trajectory 15, and arriving at a desired aimpoint 16 at a final time $t_f$. Ballistic missile guidance systems typically rely on the ability to terminate the thrust of the missile's motor (not shown). The traditional method is to specify the time-of-flight and iterate on some variation of the Kepler equations to arrive at the desired velocity and flight path angle which defines the Lambert velocity vector 13. The impulsive velocity-to-go (Vgo) vector 14 is then calculated by subtracting the missile velocity vector 12 from the Lambert velocity vector 13. This Vgo vector 14 is the guidance attitude command. Pointing the missile 11 along the Vgo vector 14 adds delta-V along the Vgo vector direction and reduces the magnitude of Vgo, referred to herein as the velocity deficit. As the velocity deficit approaches zero the motor is shut off. The accuracy of the missile 11 is dependent on the ability to terminate the thrust at the desired moment as well as other factors such as navigation accuracy, separation system delta-V, and impulse added by a post boost attitude control system.

While liquid motors inherently have the ability to terminate the thrust, most solid motors do not. A method that addresses part of this problem is to use Generalized Energy Management Steering (GEMS). Solid motors often have tight tolerances on their total impulse and GEMS energy wasting allows the velocity-to-go to be driven to zero when the nominal booster delta-V is expended. This however does nothing to compensate for uncertainties in total impulse and mass. These uncertainties are almost always sufficient to produce large dispersions in the aimpoint miss distance. In J. E. White, "Cut-Off Insensitive Guidance with Variable Time of Flight," in Guidance Navigation and Control Conference, Monterey, Calif., 1993, White proposed a method to transition the booster attitude to the range-insensitive-axis (RIA) as Vgo approaches zero. More recently, in S. Kim and T. Um, "Flight-Path Angle Control for Cutoff Insensitive Guidance," AIAA Journal of Guidance, Control, and Dynamics, 2015, Kim proposed a method based on optimal control theory. Both of these papers suggest approaches that are different from the method of the present disclosure. A proportional velocity deficit (PVD) method of the present disclosure performs an attitude transition that approaches the RIA; however, this maneuver is a necessary by-product of the PVD guidance rather than the primary objective. Applying the PVD method disclosed herein, the missile's guidance behavior is equivalent to having a feedback loop that nulls the ZEM at a rate inversely proportional to the user-selected time constant as the motor continues to burn.

Figure 2A:
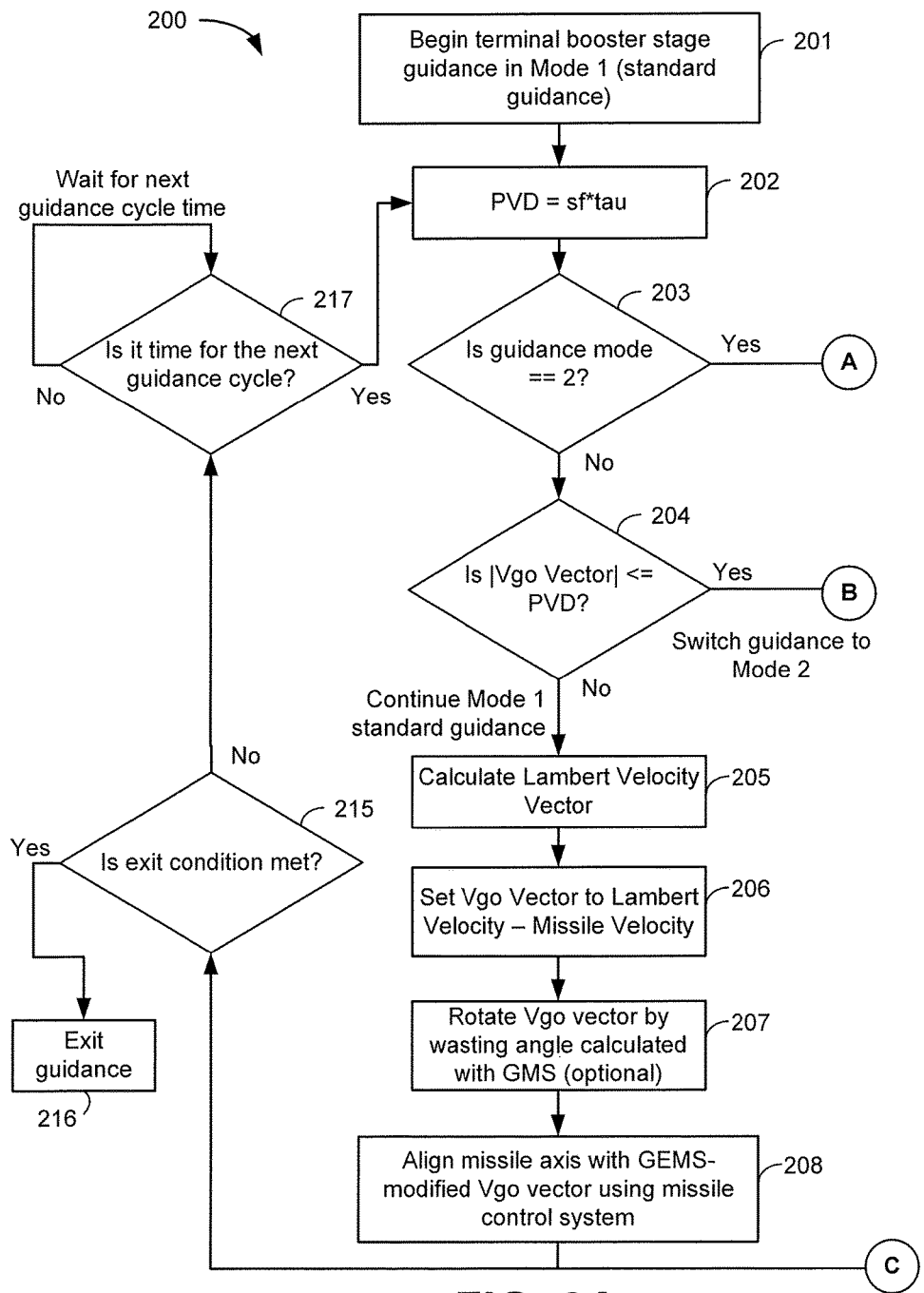
FIG. 2A depicts a missile guidance method according to an exemplary embodiment of the present disclosure.
Figure 2B:
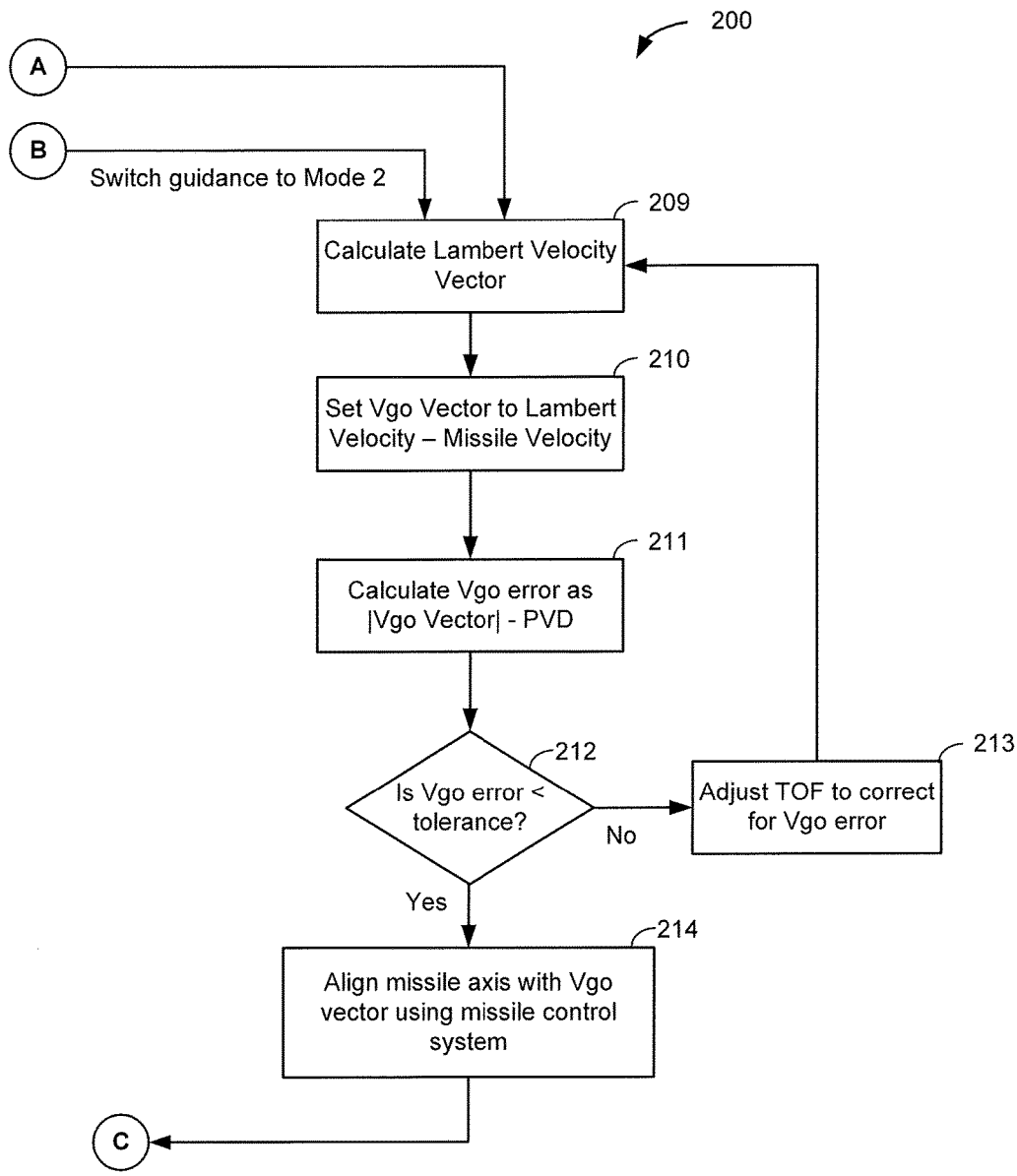
FIG. 2B is a continuance of the missile guidance method of FIG. 2A.

FIGS. 2A and 2B depict a method 200 according to an exemplary embodiment of the present disclosure. In step 201 of the method 200, the missile's terminal booster stage guidance begins in a first mode. The first mode is typically a standard guidance process in which the magnitude of the Vgo vector is being driven towards zero. The Vgo vector is an additional velocity required to fly in a ballistic manner, with no application of propulsion or control forces, to the target.

In step 202 of the method 200, the system calculates the PVD value as being equal to the measured specific force magnitude multiplied by the PVD time constant Tau. The specific force is observable using an accelerometer or accelerometers within an inertial measurement unit of the missile.

In step 203 of the method 200, the system queries whether the guidance has already been switched to mode 2 during a previous cycle. If the system has been switched to mode 2, the process continues at step 209. If the system is not in mode 2, the process continues at step 204.

In step 204 of the method, the system queries whether the magnitude of the Vgo vector is less than or equal to the proportional velocity deficit value. If the magnitude of the Vgo vector is less than or equal to the proportional velocity deficit value, then the guidance mode switches to mode 2 and the process continues at step 209. If the magnitude of the Vgo vector is not less than or equal to the proportional velocity deficit value, then mode 1 standard guidance continues at step 205.

In step 205, the first mode guidance method continues by calculating the Lambert velocity vector using traditional means.

In step 206, the Vgo vector is set to equal the Lambert velocity minus the missile velocity.

In step 207 of the method 200, the Vgo vector is rotated by a wasting angle that is calculated with GEMS. This step can be skipped with some impact on the ability to shape the trajectory, as further discussed herein. In step 208 of the method 200, the missile's axis is aligned with the GEMS-modified Vgo vector using the missile control system. If the GEMS step is skipped, then the axis is simply aligned with the Vgo vector.

In step 209 of the method 200, when the guidance method is in mode 2, the Lambert velocity vector is calculated using traditional means.

In step 210 of the method 200, the Vgo vector is set to equal the Lambert velocity minus the missile velocity.

In step 211 of the method 200, a Vgo error is calculated as the magnitude of the Vgo vector minus the proportional velocity deficit value.

In step 212 of the method 200, the system queries whether the Vgo error is less than a predetermined tolerance. If the Vgo error is not less than the tolerance, then in step 213 the time of flight is adjusted to correct for the Vgo error, and the method returns to step 209. If the Vgo error is less than the tolerance, then in step 214, the missile axis is aligned with the Vgo vector using the missile control system.

In step 215 of the method 200, the system queries whether an exit condition is met. This condition can be based on various parameters but it must occur after which time the motor has effectively burned out and thrust is substantially equal to zero. If the condition is met, then the guidance is exited. If it is not met then it continues to step 217.

In step 217 of the method 200, the system queries whether it is time for the next guidance cycle to begin. If it is time then it proceeds to step 202 where the process begins again. If it is not yet time, then it waits until it is time to proceed. This step is typically controlled by the missile's flight computer which uses its internal timer to assure that the guidance is cycled at discreet regular intervals.

As shown in FIGS. 2A and 2B, the steps in the method 200 are performed multiple times over the missile's flight, sometimes many times per second.

Figure 3:
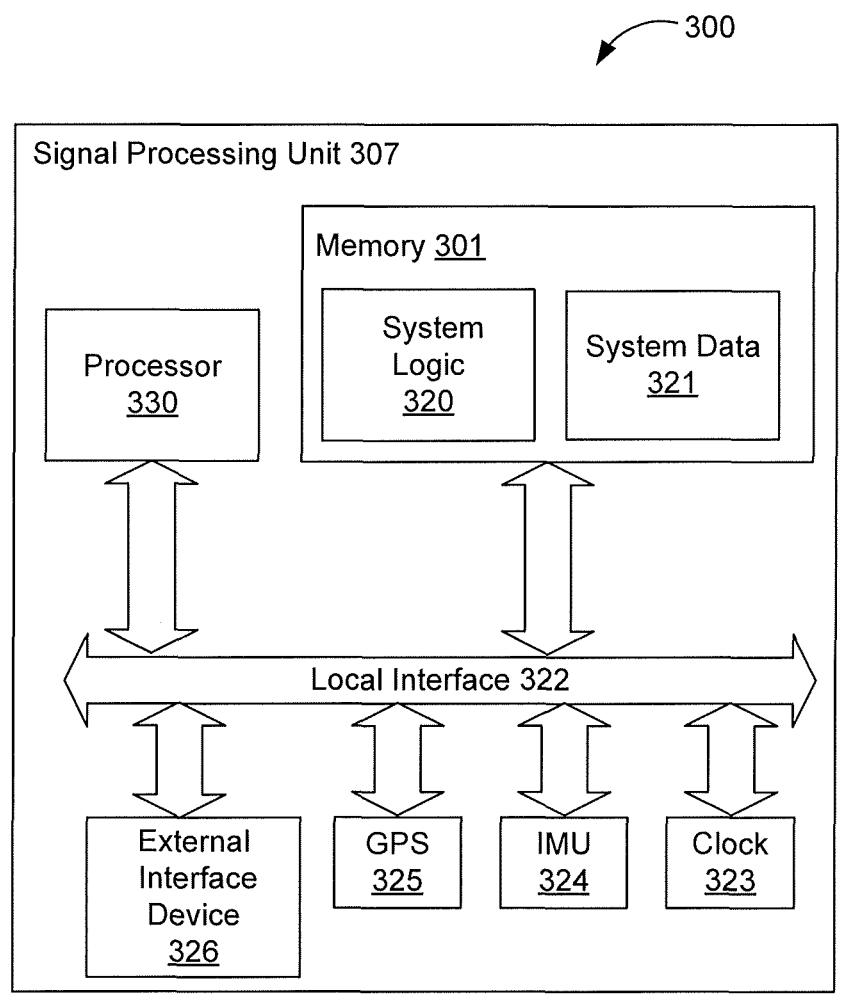
FIG. 3 depicts a processor of an onboard ballistic missile guidance system according to an exemplary embodiment of the present disclosure.

FIG. 3 depicts an exemplary signal processing unit 307 of the missile 11 (FIG. 1) according to an embodiment of the present disclosure. The signal processing unit 307 processes data and performs navigation analysis, as further discussed herein.

The signal processing unit 307 may comprise a Global Positioning System (GPS) 325 and/or an Inertial Measurement Unit (IMU) 324. A Global Positioning System is a satellite-based navigation device that provides a user with position and velocity information. An IMU is an electronic device that measures and reports on the missile's specific force acceleration and angular velocity. The IMU comprises one or more accelerometers and gyros that measure acceleration and angular rate. The signal processing unit 307 may further comprise a clock 323.

The signal processing unit 307 further comprises system logic 320 and system data 321. In the exemplary signal processing unit 307 system logic 320 and system data 321 are shown as stored in memory 301. The system logic 320 and system data 321 may be implemented in hardware, software, or a combination of hardware and software. The system logic 320 executes the processes described herein.

The signal processing unit 307 also comprises a processor 330, which comprises a digital processor or other type of circuitry configured to run the system logic 320 by processing the system logic 320, as applicable. The processor 330 communicates to and drives the other elements within the signal processing unit 307 via a local interface 322, which can include one or more buses. When stored in memory 301, the system logic 320 and the system data 321 can be stored and transported on any computer-readable medium for use by or in connection with logic circuitry, a processor, an instruction execution system, apparatus, or device, such as a computer-based system, processor-containing system, or other system that can fetch the instructions from the instruction execution system, apparatus, or device and execute the instructions.

An external interface device 326 connects to and communicates with navigation/localization applications (not shown), such as navigation systems, far target locators, auto-pilot systems, control systems, and the like. The external interface device 326 may also communicate with or comprise an input device, for example, a keyboard, a switch, a mouse, and/or other type of interface, which can be used to input data from a user of the system. The external interface device 326 may also communicate with or comprise a display device (not shown) that can be used to display data to the user. The external interface device 326 may also or alternatively communicate with or comprise a personal digital assistant (PDA), computer tablet device, laptop, portable or non-portable computer, cellular or mobile phone, or the like. The external interface device may also or alternatively communicate with or comprise a non-personal computer, e.g., a server, embedded computer, FPGA, microprocessor, or the like.

6DOF Simulation

A 6DOF simulation model was developed with following features, to prove the validity of the method disclosed herein:

6-DOF rotating Earth environment with EGM-96 8×8 gravity model and WGS-84 Oblate Spheroid Earth shape model.

Thrust and mass table lookups base on an Orion50SXLG/Orion50XL/Orion38 three stage booster stack. All motor data is from the Orbital/ATK Booster catalog which is an open source document.

Third stage is assumed exo-atmospheric.

$2^{nd}$ Order TVC model with 20 Hz bandwidth, 0.7 damping, 115 deg/s slew rate limit, and 5 deg deflection limit.

$2^{nd}$ Order gyro and accelerometer isolator model with 60 Hz bandwidth and 0.6 damping coefficient.

Since the purpose of this simulation was to test and evaluate the PVD guidance method, the first and $2^{nd}$ stage dynamics were simplified by setting the aerodynamic moment to zero in the truth model. This produced a neutrally stable airframe that was easy to control. PVD guidance is only active during the latter portion of third stage. Because the third stage is completely exo-atmospheric, there were no aero forces or moments for that stage.

Figure 4A:
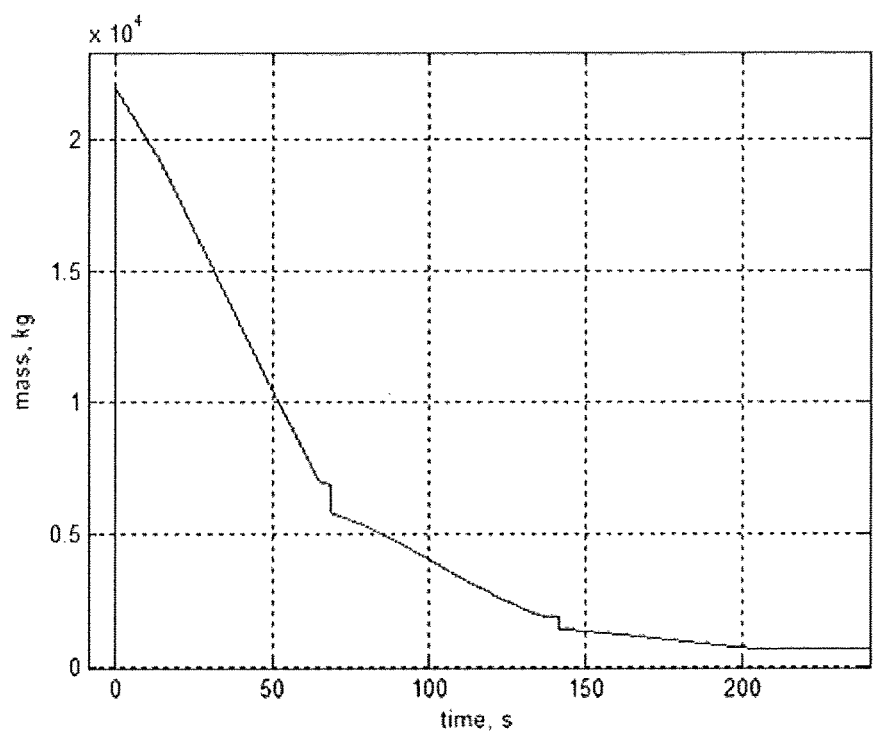
FIG. 4A shows a nominal mass of the modeled missile on a typical 10,000 km trajectory against an Earth fixed target.
Figure 4B:
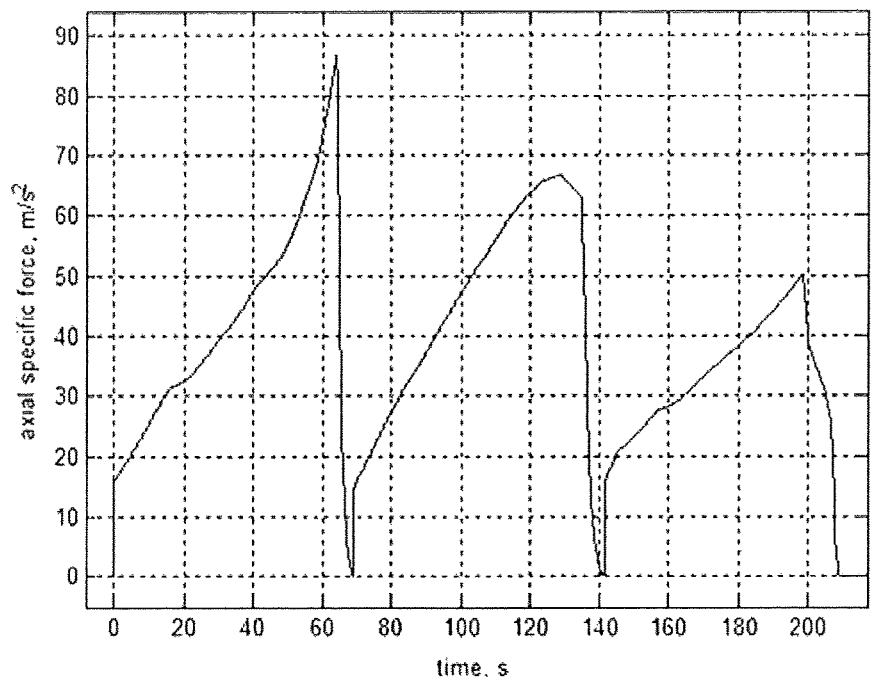
FIG. 4B shows a nominal acceleration of the modeled missile on a typical 10,000 km trajectory against an Earth fixed target.
Figure 5:
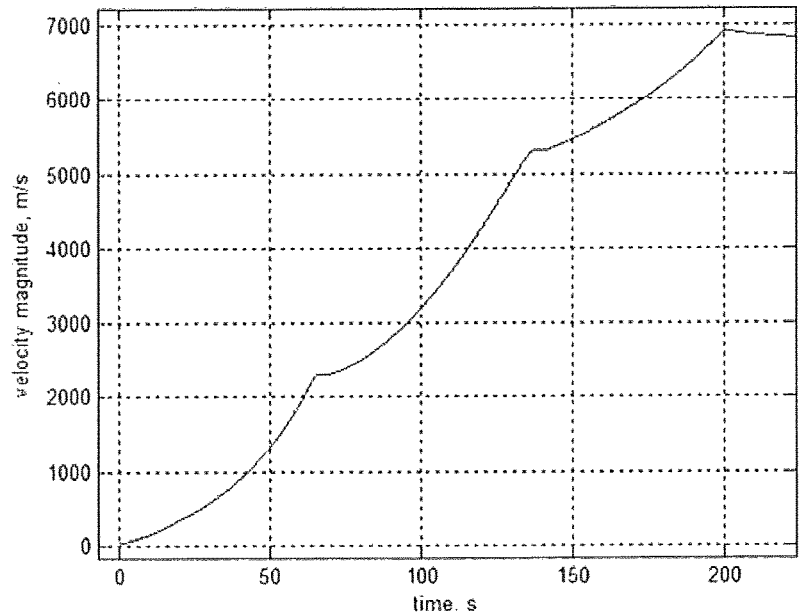
FIG. 5 shows a nominal velocity of the modeled missile on a typical 10,000 km trajectory against an Earth fixed target.

FIG. 4A shows a nominal mass of the modeled missile. FIG. 4B shows the nominal acceleration for the same missile on a typical 10,000 km trajectory against an Earth fixed target. FIG. 5 shows the nominal velocity for the same missile.

Attitude Autopilot

The endo-atmospheric portion of the flight is controlled with a three loop flight-path autopilot consisting of a flight path (gamma) loop followed by an acceleration loop and finally an inner rate loop. The flight path command is the Lambert velocity vector converted into an ECEF (Earth relative) velocity vector. Once the dynamic pressure reduces to less than 25 kPa, the acceleration command is set to zero for a gravity turn. Once the dynamic press reduces to less than 0.5 kPa during $2^{nd}$ stage, then full exo-atmospheric guidance is turned on and the control switches to a simple two loop attitude autopilot.

Figure 6:
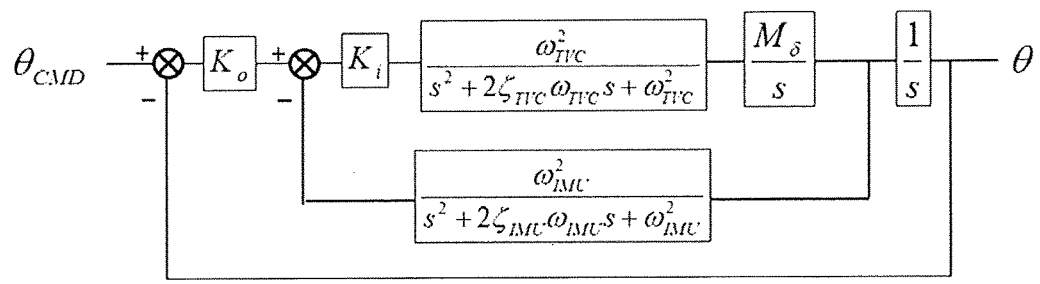
FIG. 6 depicts a linear block diagram for the attitude autopilot according to an exemplary embodiment of the present disclosure.
Figure 7:
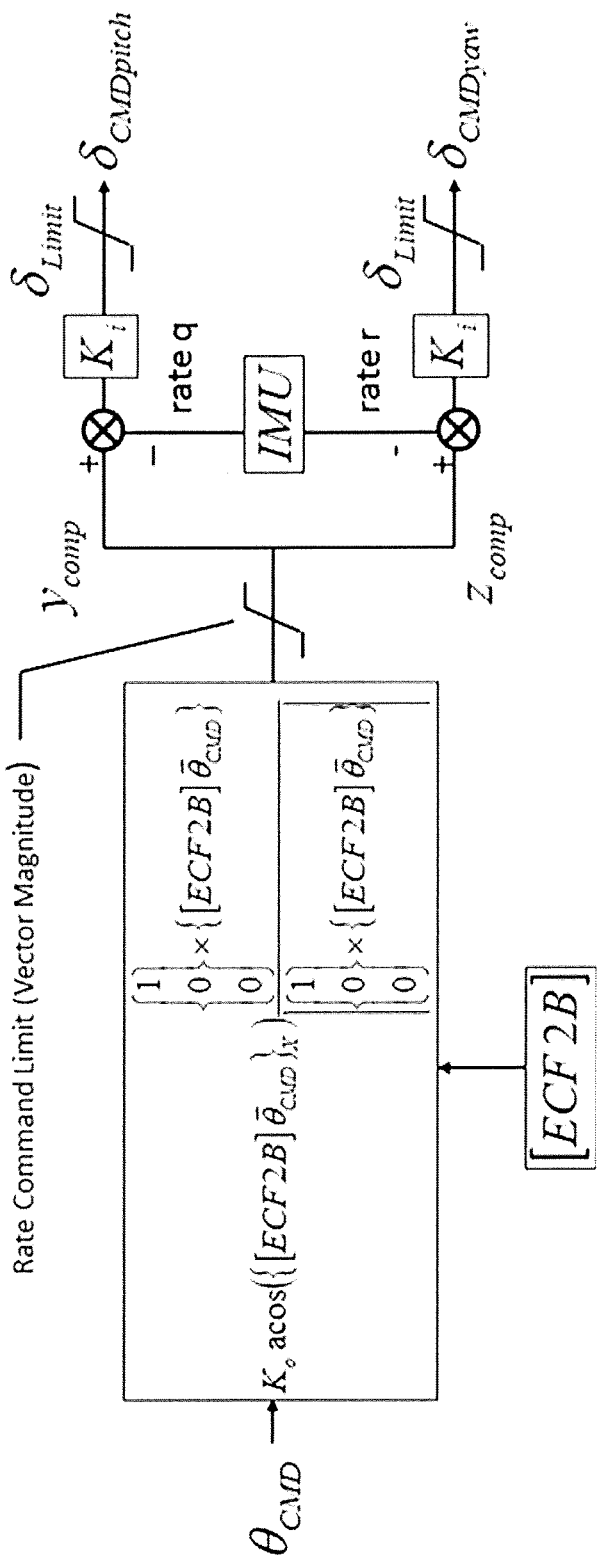
FIG. 7 is a block diagram showing an example of one implementation of the autopilot according to an embodiment of the present disclosure

FIG. 6 depicts a linear block diagram for the attitude autopilot according to an exemplary embodiment of the present disclosure. The attitude autopilot is tuned so that the rate loop bandwidth is approximately one fifth the TVC bandwidth and the attitude loop gain is selected to achieve an approximate $2^{nd}$ order attitude response with a damping coefficient of 0.7 which is slightly underdamped as compared to a critical damping ratio of 1.0. The variables in FIG. 6 are listed below:

$K_o$ Outer loop (attitude loop) gain
    $K_i$ Inner loop (rate loop) gain
    Mδ Mdelta stability derivative
    s Laplace transform variable (imaginary)=j*omega where omega is the frequency.
    $\omega_{TVC}$ Corner frequency of simple $2^{nd}$ order TVC model
    $\zeta_{TVC}$ Damping coefficient of simple $2^{nd}$ order TVC model
    $\omega_{IMU}$ Corner frequency of simple $2^{nd}$ order IMU model
    $\zeta_{IMU}$ Damping coefficient of simple $2^{nd}$ order IMU model FIG. 7 is a block diagram showing an example of one implementation of the autopilot. The attitude feedback, error signal, and rate command are all calculated with vector manipulation. There is a rate command limit applied to the vector rate command. The limited command is then split into the pitch and yaw channels. At the end of the autopilot, the TVC commands are limited to 5 degrees. The variables in FIG. 7 are listed below:

$K_o$ Outer loop (attitude loop) gain
    $K_i$ Inner loop (rate loop) gain
    $\theta_{CMD}$ Attitude command vector for the missile axis expressed in the ECEF frame
    [ECF2B] Transformation matrix frm the ECEF frame to the missile body frame
    $\{[ECF2B]\theta_{CMD}\}_x$ X-axis value of the attitude command after transformation into missile body frame
    rate q body frame Y-axis angular rate of the missile
    rate r Body frame Z-axis angular rate of the missile
    $\delta_{Limit}$ TVC deflection command limit $\delta_{CMDpitch}$ Pitch axis (body Y-axis) TVC position command $\delta_{CMDyaw}$ Yaw axis (body Z-axis) TVC position command Monte-Carlo Uncertainties A total of 29 Monte-Carlo variables were originally selected for this study. Mass and total impulse uncertainties are the primary contributors to guidance aimpoint dispersion when using a solid booster. Additional contributors are lateral cg offset and lateral TVC pivot point offset which cause the thrust vector to not be aligned with the missile axis under steady state conditions (will be thrusting through cg). Burn time, axial cg, axial pivot location, the inertia tensor, and TVC response can all degrade the autopilot control margins and affect the autopilot performance, however if the autopilot is robust enough to handle it, then these should not have a significant effect on accuracy.

Table 1 provides the uncertainties applied to the Monte-Carlo variables. Group 1 uncertainty indicates primary contributor to dispersion without PVD guidance. PVD guidance compensates for these. Group 2 uncertainty indicates secondary contributor to dispersion. PVD Guidance does not compensate for these effects. Group 3 uncertainty indicates minimal contribution to dispersion.

Simulation Scenarios

Simulations were performed for two trajectories: an ICBM range trajectory with an Earth fixed aimpoint, and a midcourse intercept against an ICBM range trajectory. All trajectories were launched from 0 degrees latitude, 0 degrees longitude. A total of 20 different Monte-Carlo sets were performed based on these two trajectories. Each Monte-Carlo set consists of 100 runs plus a nominal run for a total of 101.

ICBM Trajectory

The ICBM range trajectory has an aimpoint at 30 degrees longitude, 85 degrees latitude, and 100 km altitude for a total range of approximately 9500 km. The 100 km altitude was chosen so as not to imply that reentry aerodynamics are considered. The nominal apogee of this trajectory is 1000 km. The ICBM trajectories used a first mode guidance which performs an iterative search on the Lambert solution to constrain the apogee. Upon entering the second mode guidance (PVD guidance) the ability to continue constraining the apogee is lost, however late transition to the second mode minimizes the deviation from the constrained apogee.

Midcourse Intercept

The midcourse Intercept targets a ballistic state that is initialized at 30 degrees longitude, 60 degrees latitude, and 100 km altitude with an Earth relative velocity of 6 km/s, an Earth relative vertical flight path angle of 20 degrees and an Earth relative horizontal flight path angle of 135 degrees. This combination has it initially ascending in a South-West direction. The interceptor launches at the same time that the target is initialized and intercepts at a nominal 800 seconds. The intercept trajectories used a Lambert solution first mode guidance to constrain TOF which is the same as constraining the intercept time. Upon entering the second mode guidance (PVD guidance) the ability to continue constraining TOF lost, however late transition to the second mode minimizes the deviation from the constrained TOF.

Run Matrix

Monte-Carlo sets were run to span the various autopilot and guidance options discussed herein. The details of these sets are listed in Table 2. The first seven sets are labeled as set ID 101 through 107 and were selected to provide a performance baseline without using PVD guidance. The next seven sets are labeled as ID 201 through 207. These sets mirror 101 through 107, but are using PVD guidance and will be used for direct comparison purposes. Sets 208 through 209 were selected to demonstrate the PVD guidance performance with various combinations of the options listed in Table 3. Sets 304 and 305 were added to demonstrate the most pure and basic version of PVD guidance for comparison against Sets 104/105 and 204/205. A PVD time constant (Tau) of 0.6 was used for all runs except 304 and 305 which have a time constant of 2.0 which was calculated within the simulation flight code as 0.5pi/pitchRateLimit where the pitch rate limit during PVD guidance was 0.25*pi rad/sec. for all sets.

The GEMS Vcap reserve value was set to 200 m/s for all sets except 304 and 305 which used a value of 400 m/s because of their larger time constant which required more time to complete the maneuver.

Lambert/Apogee Guidance with GEMS

When solid boosters with no thrust-termination capability are used for the terminal stage of a ballistic missile system Lambert Guidance with GEMS energy management may be used to correct for the nominal impulse of the motor so that motor burntime uncertainty is not a major error source, however motor total impulse uncertainties continue to contribute to inaccuracy. GEMS can be used with traditional ballistic guidance methods that are designed to drive the Vgo vector toward zero. This includes standard Lambert solutions which constrain TOF and variations on Lambert which constrain other flight parameters such as apogee. Implementation of these methods is described in further detail herein.

The Lambert boundary value problem solves for the velocity at an initial point in an orbit when the position and time at the initial and a secondary point are defined. Solutions to this problem are the primary focus of most ballistic missile guidance methods. When implementing a Lambert method for missile guidance, the current missile state typically defines the initial position and time in the Lambert problem. The second position is the target and the desired time of flight (TOF) is specified by the guidance.

The missile velocity is typically subtracted from the Lambert velocity vector in order to calculate the Vgo vector. It is this vector that the autopilot uses as an attitude command so that the thrust (nominally along the missile axis) is applied in the direction of the velocity deficit (Vgo magnitude). Often it is desired to constrain the solution to something other than TOF. In this case the Lambert solutions can be iterated on to find the TOF that corresponds to the desired constraint condition. Apogee or re-entry angle are common constraints.

Figure 8:
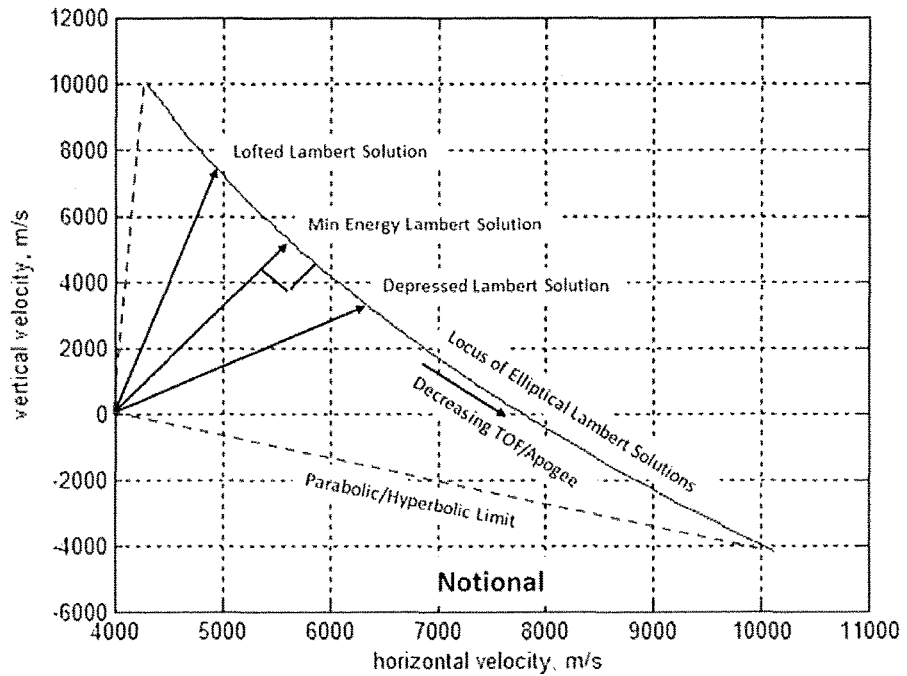
FIG. 8 shows the locus of all elliptical Lambert solutions for a typical ICBM trajectory.

FIG. 8 shows the locus of all elliptical Lambert solutions for a typical ICBM trajectory. The locus shown in the picture is based on trajectory with the missile at 100 km altitude and the target at sea level with an Earth centered angle between the two of 90 degrees (~10,000 km range). The point of this figure is that there are an infinite number of Lambert solutions for any unique pair of initial and final conditions. Picking a more lofted solution will always result in a greater TOF and apogee while a more depressed solution will shorten the TOF and apogee. These are monotonic relationships that lend themselves to iteration if one wishes to constrain the solution for something other than TOF.

Figure 9:
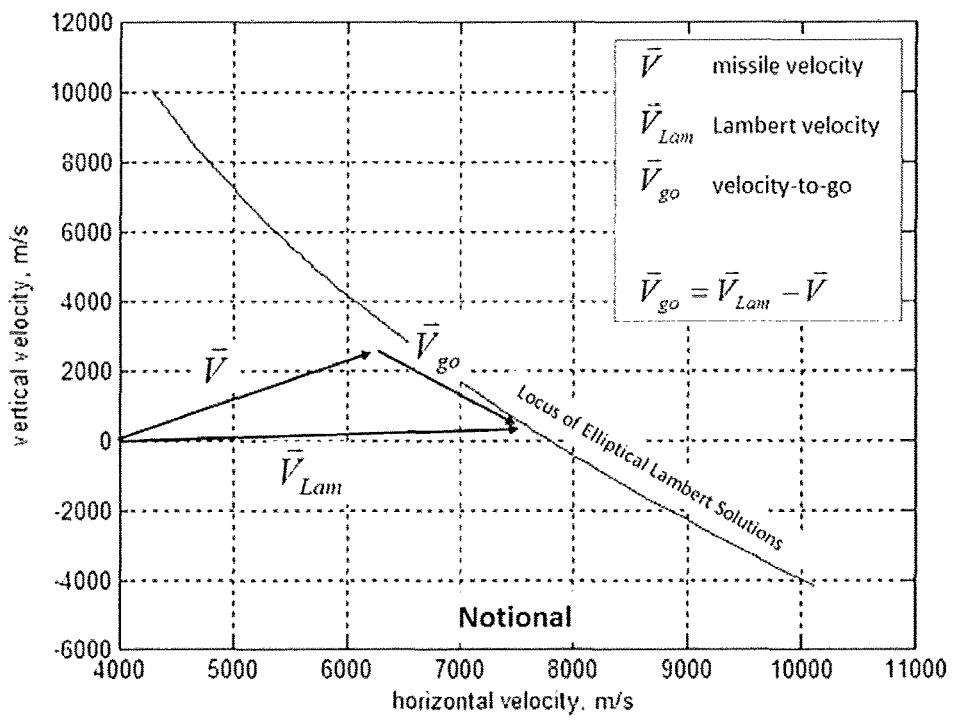
FIG. 9 shows the relationship between the Lambert vector, the Vgo vector and the missile velocity vector.

The minimum energy solution is the one in which the Lambert vector intersects the locus at a 90 degree angle. Solutions lofted above or depressed below this solution will require increased velocity, so if velocity were used as a constraint it would not be a unique solution and care would need to be taken in selecting either the lofted or depressed solution. FIG. 9 shows the relationship between the Lambert vector, the Vgo vector and the missile velocity vector.

GEMS

GEMS (Generalized Energy Management Steering) is an energy wasting method that can be used with Lambert guidance to correct for the nominal motor impulse. In order to use the GEMS method, the remaining delta-velocity (Vcap) of the motor must be known. The initial Vcap is calculated with the rocket equation or is otherwise known. Vcap is updated during the flight by subtracting off the integral of specific force as shown in equations 1 and 2. The GEMS wasting angle calculation is shown as equation 3. The Vgo guidance vector must be rotated by this angle. The direction of rotation is somewhat arbitrary, but the rotation vector must be normal to the Vgo vector. Equation 4 shows a robust way to select the rotation vector which was used in the simulation. If the positive sign is selected it will rotate the vector downward. The rotation is performed using the well-known Rodriguez rotation equation.

$$V_{cap0} = gI_{sp}\ln\frac{m_i}{m_f} \quad 1$$

$$V_{cap} = V_{cap0} - \int |\vec{s}_f| dt \quad 2$$

$$\theta_{waste} = \sqrt{6\left(1 - \frac{V_{go}}{V_{cap}}\right)} \quad 3$$

$$\vec{\theta}_{waste} = \pm \theta_{waste} \frac{(\vec{V} \times \vec{X} \times \vec{V}_{go} \times \vec{V}_{go})}{|\vec{V} \times \vec{X} \times \vec{V}_{go} \times \vec{V}_{go}|} \quad 4$$

MCPI Lambert Solutions

MCPI stands for Modified Chebyshev Picard Iteration. This is a method that uses Chebyshev polynomials in conjunction with Picard iteration to solve the Lambert boundary value problem or the Initial value (state propagation) problem. The majority of the simulation runs were performed using this method to correct for the EGM96 8×8 gravity model. MCPI methods are a current research topic. The particular method used in this simulation is based on the recent work presented by Robyn Woollands in her PhD dissertation at Texas A&M University. (R. M. Woollands, "Regularization and Computational Methods for Precise Solution of Perturbed Orbit Transfer Problems," (Dissertation) Texas A&M University, College Station Tex., 2016.

A brief overview of the MCPI follows. The orthogonal nature of the Chebyshev polynomial lends itself to efficient curve fitting of the missile trajectory which is initially based on a Keplerian orbit. The method iterates on the entire solution by first calculating the accelerations at a series of nodes, then it uses state transformation matrices to transform (integrate) these accelerations into velocities and positions. The accelerations are then recalculated at the new positions and the process continues until the position and velocity error are sufficiently small. It is important to note that this process is performed for all the nodes at once. This is very different from methods that rely on forward propagation in time such as Runge-Kutta and other numerical integration techniques.

The MCPI method is much more efficient than numerical time integration methods, and it can be set up with Lambert boundary conditions. This last point of discussion is important because most methods for solving the Lambert problem for higher order gravity models require a shooting method which is basically an initial value problem which is iterated on.

With the MCPI method, both Lambert and initial value problems may be solved. For this PVD guidance study the Lambert solution was used in the guidance, and the initial value solution was used for the ballistic intercepts to predict the position of the ballistic target as a function of time.

Rationale and Development of the PVD Guidance Method

Figure 10:
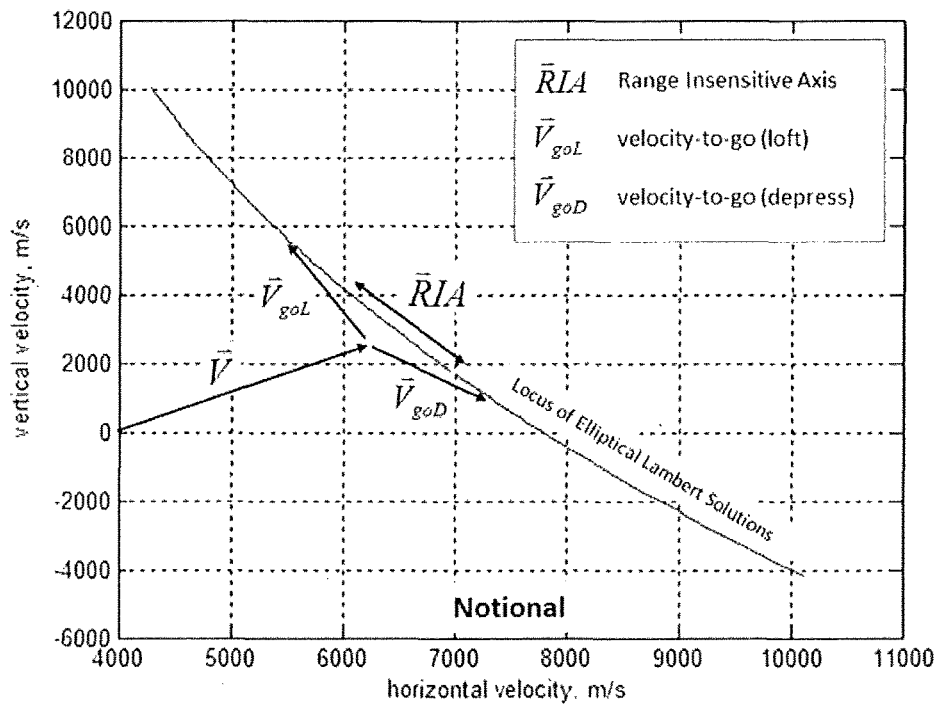
FIG. 10 illustrates the Vgo and RIA ambiguity where there are two separate solutions for the Vgo vector direction for a given Vgo magnitude and there are two RIA directions

Referring back to FIG. 9 and the discussion concerning velocity-to-go it is apparent that the Vgo vector is depressed relative to both the missile velocity and the Lambert velocity vector. It was also discussed that two possible Lambert solutions exist for any given Lambert velocity magnitude. A similar situation occurs for the Vgo vector. For any given Vgo magnitude there are two possible solutions. One of the Vgo solutions will point from the velocity vector downward to meet the Lambert locus curve and the other will point from the velocity vector upward to meet the locus curve as shown in FIG. 10. Note also that in FIG. 10 the Vgo vectors were drawn at angles that imply they are approaching the slope of the locus curve which is also the RIA. The fact that the RIA direction is defined by the locus curve is easy to accept if one considers that any delta-V added parallel to the locus curve will simply move the missile velocity parallel to the locus without getting the solution any closer or farther away. Downward movement will decrease TOF, apogee, and reentry angle while upward movement will increase these parameters.

Figure 11:
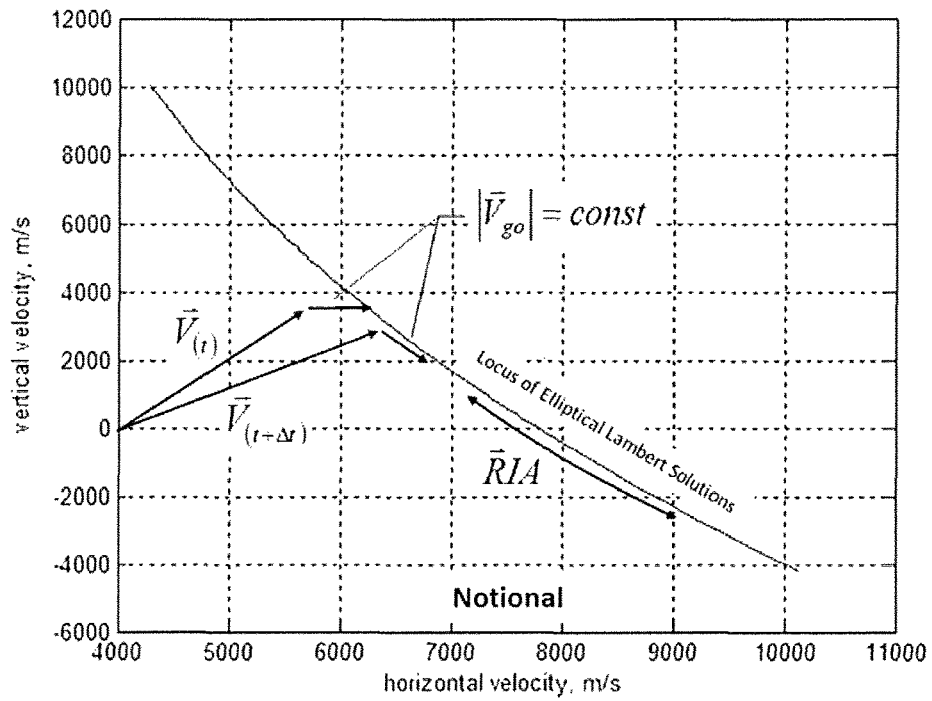
FIG. 11 illustrates the transition to RIA with constant Vgo magnitude.

Imagine now that there was a way to smoothly transition the Vgo vector from whatever its current orientation is to that of the RIA (or locus curve) while simultaneously driving the missile velocity vector to the locus curve. This would allow the missile to continue burning while driving the ZEM to zero and would completely eliminate accuracy dispersions due to mass and solid booster uncertainties. This can actually be done in a straight forward manner by constraining the magnitude of the Vgo vector. FIG. 11 is an illustration of what happens when Vgo is constrained. Suppose that at some point late in the terminal stage burn, the magnitude of Vgo is made constant. This can be done by iterating on the Lambert solution just like is done for apogee or reentry angle guidance, however care needs to be taken that the correct (lofted or depressed) Vgo solution is selected. With this Vgo constraint the missile velocity is being driven toward the locus curve as the Vgo vector approaches the slope of the locus curve. This is illustrated in FIG. 11 where the locus curve is assumed to remain unchanged from one guidance cycle to the next. In reality the locus curve is changing as the position of the missile changes, but this is a very stable and gradual process and the locus curve can be thought of as quasi-steady with respect to other aspects of the guidance solution which change much faster.

Figure 12:
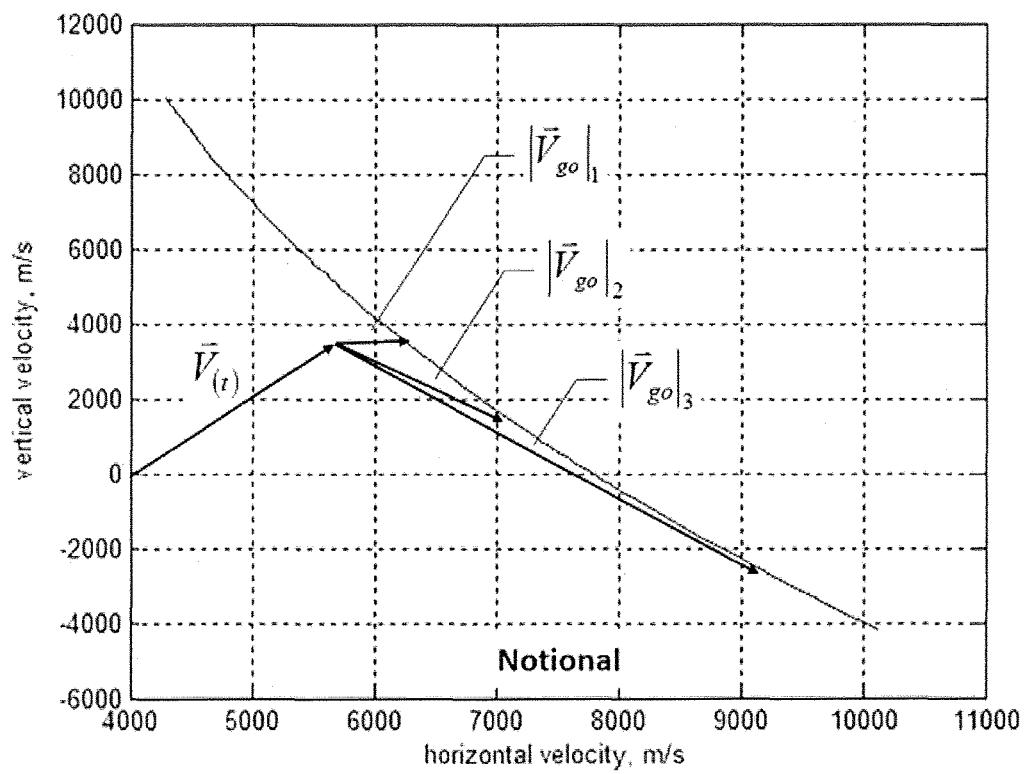
FIG. 12 is a Lambert solution locus plot along with the missile velocity vector and three different depressed Vgo vector solutions.

Suppose now that rather than setting the Vgo magnitude to a constant value, it is dynamically selected to control the rate at which ZEM approaches zero. FIG. 12 shows the Lambert solution locus plot along with the missile velocity vector and three different depressed Vgo vector solutions. One thing that is apparent is that the larger the magnitude of Vgo the closer the slope of the Vgo vector approaches that of the solution locus which is also the RIA. This means that the larger the magnitude of Vgo the slower the rate of convergence of ZEM to zero.

A fundamental assumption of the PVD guidance method is that the rate at which ZEM approaches zero is inversely proportional to the Vgo magnitude and is also proportional to rate at which delta-V is being added along the Vgo vector direction. Equation 5 is an expression of this principal with the added assumption that the thrust vector perfectly follows that guidance attitude command. Equation 5 states that the rate of convergence of ZEM divided by the ZEM magnitude is equal to the axial specific force (applied along Vgo) divided by the Vgo magnitude.

$$\frac{sfx}{|V_{go}|} = \frac{\dot{Z}}{Z} \qquad 5$$

Figure 13:
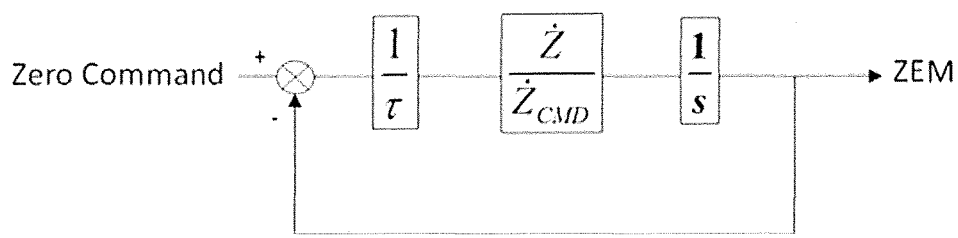
FIG. 13 depicts an ideal first order ZEM feedback loop.

Now assume an ideal situation where a control feedback loop nulls ZEM. This loop would appear as shown in FIG. 13. In the case where the inner Zdot transfer function has a bandwidth that is much higher than the outer loop, the time constant may be defined as shown in 6 which is the relationship for a perfect first order time constant also referred to as a first order lag. Combining this equation with equation 5 results in equation 7 which is the fundamental PVD guidance equation where Vgo magnitude (Velocity Deficit) is Proportional to the specific force magnitude of the missile.

$$\tau = \frac{Z}{\dot{Z}} \qquad 6$$

$$|V_{go}| = sf \cdot \tau_{PVD} \qquad 7$$

Selection of PVD Guidance Time Constant

There are two basic constraints in selecting the PVD time constant. These are the autopilot bandwidth, and the system nonlinearities (primarily the pitch rate limit). Simply stated, PVD guidance performs just like an outer loop surrounding the autopilot and the bandwidth of the PVD guidance must be significantly less than that of the autopilot for a well damped response. Tau must also be selected so that it doesn't "outrun" the pitch rate limit of the missile system. This is almost always the main driver if a constant Tau with no limiting is used. The use of a dynamic tau limit which allows for higher guidance bandwidth is further discussed herein.

Equation 8 defines the angle between the missile axis and the RIA as being a maximum of 0.5pi (90 degrees). Assuming this 90 degree maximum and dividing by the pitch rate limit as shown in equation 9 results in a reasonable estimate of the time constant for the rate limited PVD guidance. This value may typically be scaled down to some degree for improved performance, however if it made too small, then the ZEM response will oscillate and accuracy will be lost. If an RIA estimate is calculated, then the initial estimated angle between the missile axis and RIA may be used rather than the upper bound of 0.5pi.

$$RIA_{Err} = \theta - \theta_{RIA} \leq \frac{\pi}{2} \qquad 8$$

$$\tau_{Lim} \approx \Delta t_{RIA} > \frac{RIA_{Err}}{\dot{\theta}_{Lim}} \qquad 9$$

PVD Guidance Cross-Over Point

Selecting the time to cross over from the standard guidance method to PVD guidance is relatively straight forward. The first requirement is that the Vgo magnitude be driven down early. If GEMS is being used in conjunction to PVD guidance, then a delta-V reserve must be subtracted from the initial value of Vcap (see Appendix A). This will force the guidance to drive Vgo toward zero early with a delta-V approximately equal to the reserve value yet to be burned. If no GEMS is used, then the Vgo will drive towards zero early on its own if the missile has sufficient excess delta-V. Well before Vgo reaches zero the PVD guidance should start calculating the desired Vgo value (Tau*sf). When the Vgo magnitude from the standard guidance first becomes less than or equal to this value, the cross-over should occur. It is at this point where Vgo is substantially equal to the PVD value that both the standard guidance and the PVD guidance share the same solution.

The Minimum Vgo Limit

As the motor nears burnout and the thrust begins to tail off, the Vgo magnitude from the PVD guidance will reduce proportional to the reduction in axial specific force. It does this to maintain the time constant of the guidance loop. At some point this will cause the guidance vector to start pulling away from the RIA to maintain this bandwidth as thrust diminishes. This can appear as a severe pitch maneuver right before control authority is lost due to burnout. The end result is that the last small bit of delta-V gets added to the system in an uncontrolled manner in a direction that is away from the RIA. This will result in some loss of accuracy. The solution to this is to establish a lower limit for Vgo. This limit should be based on the amount of acceleration needed from the booster to maintain positive control in the attitude loop as shown in equations 10 and 11.

$$V_{go_{Lim}} = \tau_{PVD} sfx_{Lim} \qquad 10$$

$$|V_{go}| = \max(\tau_{PVD} sfx, \tau_{PVD} sfx_{Lim}) \qquad 11$$

The optimal value at which to limit the specific force feedback is system dependent. For this study a value of 20 m/s was used although values as low as 5 m/s were found to work reasonably well. Additionally the guidance command was frozen when specific force dipped below 5 m/s to null any remaining body rate. The end result was that the motor burns out with the missile axis pointing nearly along the RIA and without any significant body rate. This helps to ensure that accuracy is maintained even if the motor has a long thrust tailoff or thrust from chuffing. It will also allow separation of the payload along the RIA so as to minimize the effect that the axial separation velocity has on the accuracy.

One minor point to be aware of is that during this period the effective time constant is the limited value of Vgo divided by the true axial specific force of the vehicle. Any analysis involving pseudo-loop predictions as described herein should use this time constant.

It is also worth noting that there is another minimum Vgo limit, the minimum Vgo magnitude that is possible from the Lambert solution. Referring to FIG. 9, it is apparent that the Vgo vector extends from the tip of the velocity vector to the locus curve. The minimum possible value is the one that would intersect the locus curve at a right hand angle. This typically does not occur with a properly set up PVD guidance method, however it is advisable that the guidance be able to handle this situation in a graceful manner.

PVD Guidance Enhancements

The basic PVD guidance method works very well, however there are two major enhancements that can improve the performance and robustness of the method. These are dynamic tau limiting, and using TOF prediction to force a lofted or depressed Vgo solution.

Dynamic Tau Limiting

Figure 14:
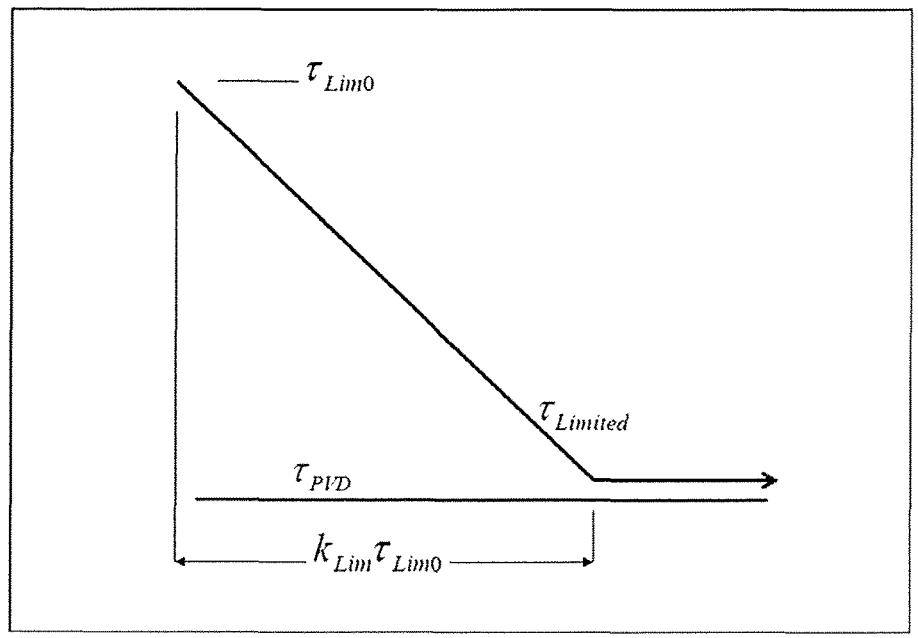
FIG. 14 illustrates a ramped time constant limit.

As discussed herein, there are two factors to consider when selecting the PVD time constant. The first of these is that during the transition from the initial PVD guidance cross-over to the completion of the maneuver the missile attitude must rotate from its initial direction to near that of the RIA. This rotation can be as large as 90 degrees, and the speed at which it can do this will be limited by attitude autopilot pitch rate limit as discussed earlier. The time constant required to accommodate the pitch rate limit is typically much larger than what is required for linear stability. As the missile axis nears the RIA, the rate limit effect goes away and small perturbations dominate the system dynamics. In a typical attitude autopilot the body rate command is proportional to the attitude error which is no larger than the RIAerr term. While the system is against the rate limit, the reduction in RIAerr will be linear. This suggests that a linear reduction in time constant would be appropriate to maximize the guidance gain as shown in equation 13 and FIG. 14. A good initial value for $k_{Lim}$ is 0.5. Decreasing $k_{Lim}$ will make for a more aggressive slope.

Equation 14 demonstrates how to apply the limit.

$$\tau_{Lim0} = k_{Lim} \frac{RIA_{Err}}{\dot{\theta}_{Lim}} \qquad 12$$

$$\tau_{Lim} = \tau_{Lim0} - k_{Lim} \frac{(\tau_{Lim0} - \tau_{PVD})}{\tau_{Lim0}}(t - t_{0PVD}) \qquad 13$$

$$\tau_{PVD\,Limited} = \max(\tau_{PVD}, \tau_{Lim}) \qquad 14$$

Forcing a Lofted or Depressed Vgo Solution

As previously discussed, care must be taken in constraining the Vgo magnitude, because there are two possible solutions. In most cases using TOF from the previous Lambert solution as the initial guess for the iteration is sufficient to maintain continuity in the solution, however this is not guaranteed. The thrust axis will transition to where it is near the RIA and TOF can change fairly rapidly once this has occurred. When using relatively large guidance time steps (0.1 seconds is not uncommon) along with a small time constant and a high missile acceleration it is possible for the Lambert TOF to change enough from one cycle to the next to cause convergence to the wrong solution. A way to solve this potential problem is to estimate the lofted and depressed TOFs for the guidance cycle and pick the appropriate TOF estimate as the initial condition in the iteration loop. There is also another reason to force a particular solution. If for a certain trajectory, the uncertainties in the system are enough to flip the solution for various Monte-Carlo runs, it may be desirable to force a lofted or depressed solution for every run so that parameters such as apogee, TOF, and reentry angle remain grouped. If the solutions are allowed to flip from run to run, then there will be two distinct groups or families of trajectories.

For the majority of the Monte-Carlo sets in this study, the nearest solution was picked. In other words, it was determined within the code whether the missile axis was nearer the lofted or depressed RIA and the solution forcing was set to that. For runs 304 and 305, no solution forcing was used since they were demonstrations of the basic PVD method. There were no known issues with these sets.

Figure 15:
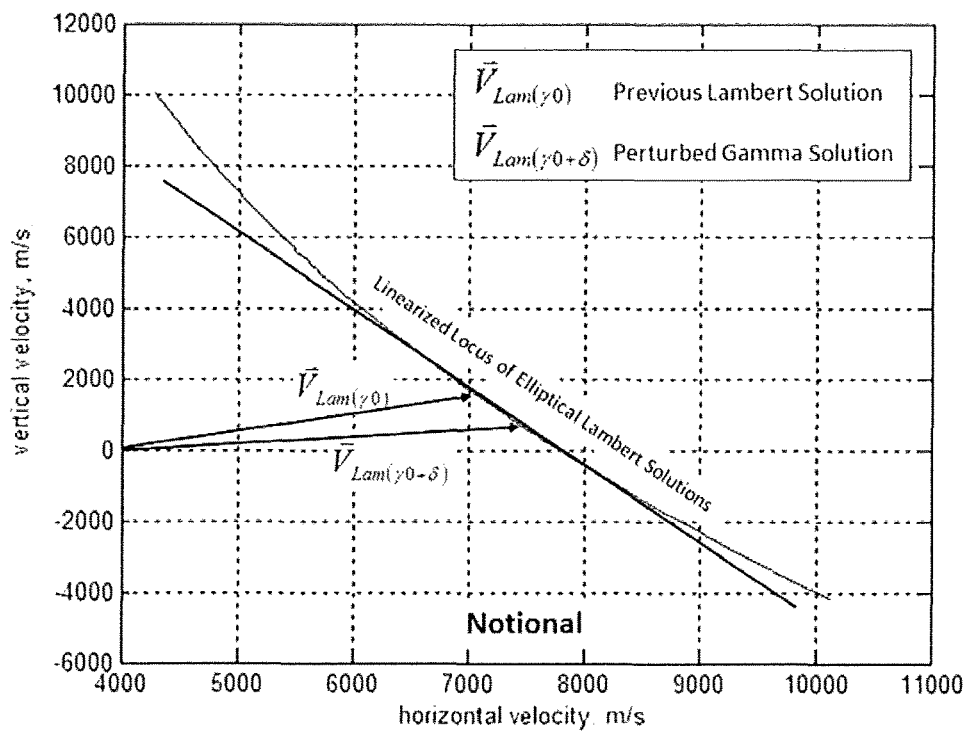
FIG. 15 illustrates a method of linearizing the solution locus.
Figure 16:
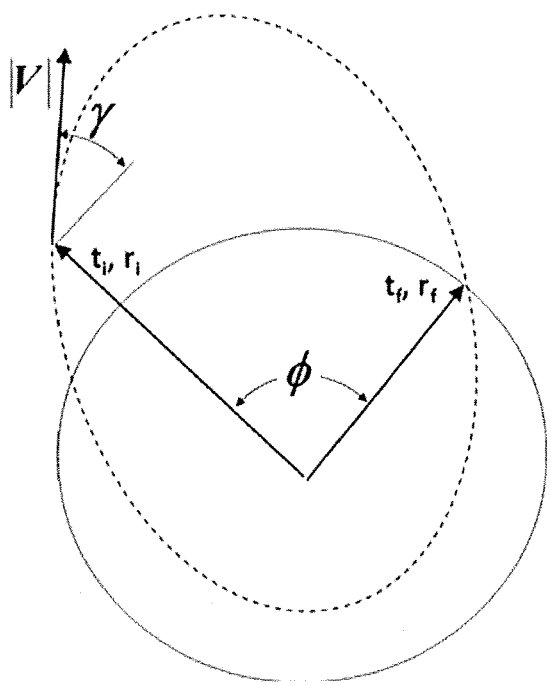
FIG. 16 illustrates Lambert parameters from Zarchan.

By linearizing the locus of Lambert solutions about a point the next pair of constrained Vgo solutions can be estimated geometrically. FIG. 15 demonstrates the method of linearizing the locus. It is simply a matter of using the Lambert parameters as shown in FIG. 16 along with equation 15 (Zarchan) and the current missile position to provide two Lambert solution estimates. The first of these estimates uses the Lambert flight path and central angle from the previous guidance cycle along with the current missile position radius. The second (perturbed) estimated uses the same parameters but perturbs the flight path by a small amount. The line that passes through these two solutions is the linearized locus.

$$V = \sqrt{\frac{gm(1 - \cos(\phi))}{r_i \cos(\gamma)\left(\frac{r_i}{r_f}\cos(\gamma) - \cos(\phi + \gamma)\right)}} \qquad 15$$

$$TOF = \frac{r_i}{V\cos(\gamma)}\left(\frac{\tan(\gamma)(1 - \cos(\phi)) + (1 - \lambda)\sin(\phi)}{(2 - \lambda)\left(\frac{1 - \cos(\phi)}{\lambda\cos^2(\gamma)} + \frac{\cos(\gamma + \phi)}{\cos(\gamma)}\right)} + \frac{2\cos(\gamma)}{\lambda\left(\frac{2}{\lambda} - 1\right)^{\frac{3}{2}}}\arctan\left(\frac{\sqrt{\frac{2}{\lambda} - 1}}{\cos(\gamma)\cot\left(\frac{\phi}{2}\right) - \sin(\gamma)}\right)\right) \qquad 16$$

Figure 17:
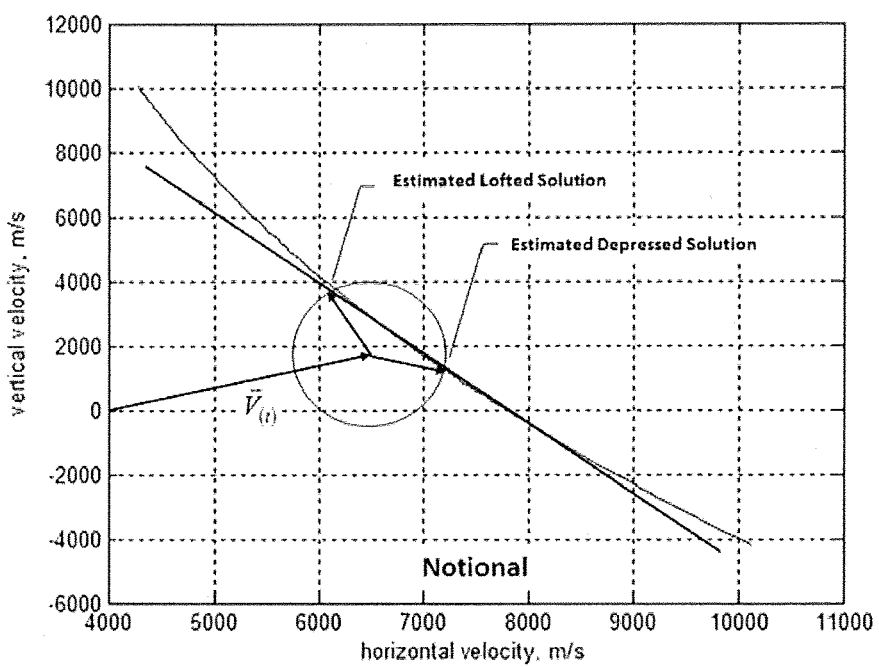
FIG. 17 shows estimated Lambert solutions as intersections of a line and a circle.
Figure 18:
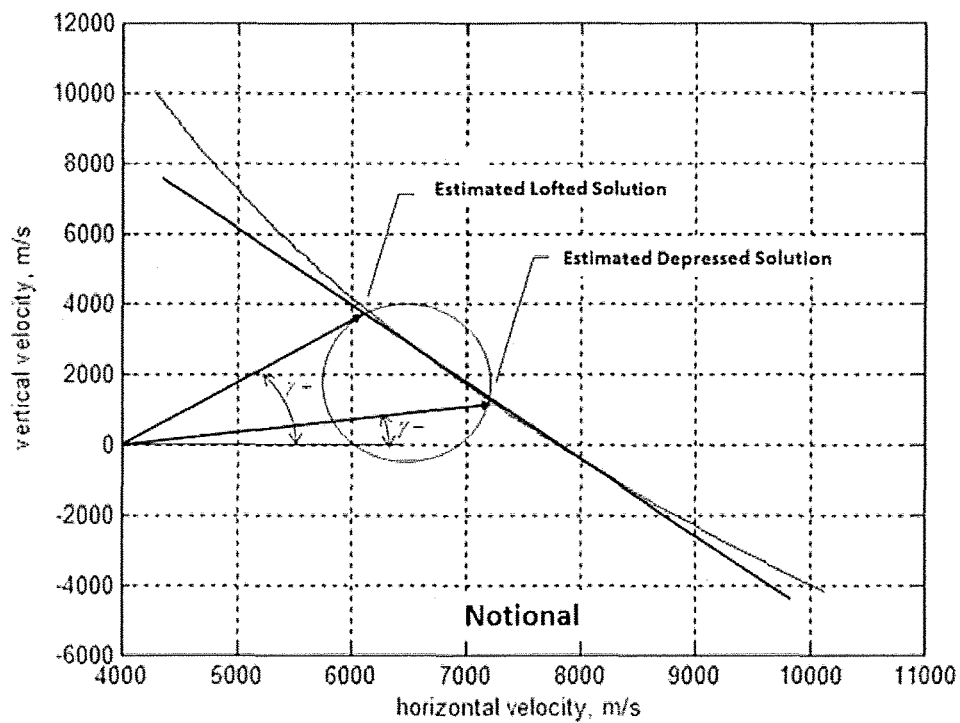
FIG. 18 illustrates inertial flight path angles of estimated Lambert vectors.

Once the line representing the linearized locus is established, the two Lambert solutions associated with the desired Vgo magnitude are found as the intersections of this line and a circle. The circle is centered at the end of the missile velocity vector and has radius equal to the desired Vgo magnitude as shown in FIG. 17. This will be a quadratic equation with two solutions. Once these intersection points are determined the associated Lambert flight path angles are geometrically defined as shown in FIG. 18. From these two flight path angles the TOFs are then calculated from equation 16, which comes from P. Zarchan, Tactical and Strategic Missile Guidance, AIAA, 1994 ("Zarchan").

Figure 19:
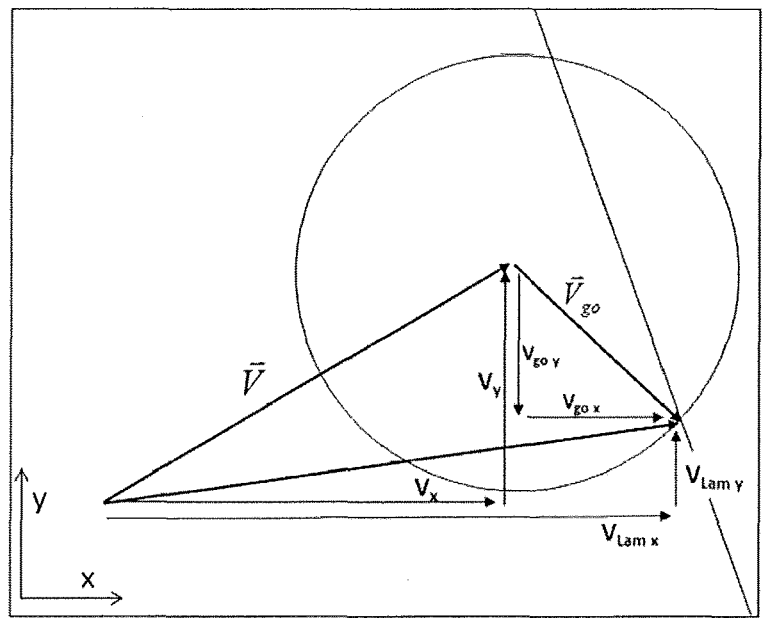
FIG. 19 illustrates the geometry for estimating the two flight path estimates in detail.

FIG. 19 illustrates the geometry for estimating the two flight path estimates in detail. Variables referred to in FIG. 19 are:

$V_x$ Inertial x (horizontal) component missile velocity $V_y$ Inertial y (vertical) component missile velocity $\gamma_0$ Lambert vertical flight path angle from previous guidance cycle $\Phi_0$ Earth centered angle between missile and target from previous guidance cycle $r_i$ Distance from Earth center to missile $r_{f0}$ Distance from Earth center to target from previous guidance cycle The following equations represent the two points that define the linearized solution locus, using the Lambert velocity equation from Zarchan:

$$V_{LamX(\gamma_0)} = |V_{Lam(\gamma_0,\phi_0,r_i,r_{f0})}|\cos(\gamma_0)$$

$$V_{LamY(\gamma_0)} = |V_{Lam(\gamma_0,\phi_0,r_i,r_{f0})}|\sin(\gamma_0)$$

$$V_{LamX(\gamma_0+\delta)} = |V_{Lam(\gamma_0+\delta,\phi_0,r_i,r_{f0})}|\cos(\gamma_0 + \delta)$$

$$V_{LamY(\gamma_0+\delta)} = |V_{Lam(\gamma_0+\delta,\phi_0,r_i,r_{f0})}|\sin(\gamma_0 + \delta)$$

The slope of the linearized solution locus is:

$$m = \frac{V_{LamY(\gamma_0+\delta)} - V_{LamY(\gamma_0)}}{V_{LamX(\gamma_0+\delta)} - V_{LamX(\gamma_0)}}$$

The following four unknowns are solved for:
$V_{goX}$
$V_{goY}$
$V_{LamX}$
$V_{LamY}$
There will be two solution sets (lofted and depressed)
The following equations are used to solve for the four unknowns:

$$V_{LamX} = V_X + V_{goX}$$
$$V_{LamY} = V_Y + V_{goY}$$
$$V_{goX}^2 + V_{goY}^2 = |V_{go}|^2$$
$$V_{\lambda Y} = m(V_{LamX} - V_{LamX(\gamma_0)}) + V_{LamY(\gamma_0)}$$

A solution of the four equations above follows:

$$A = V_{LamY(\gamma_0)} - mV_{LamX(\gamma_0)} - V_Y$$
$$a = 1 + m^2$$
$$b = 2(mA - V_X)$$
$$c = V_X^2 + A^2 - |V_{go}|^2$$

$$V_{LamX} = \frac{-b \pm \sqrt{b^2 - 4ac}}{2a}$$
$$V_{LamY} = m(V_{LamX} - V_{LamX(\gamma_0)}) + V_{LamY(\gamma_0)}$$

$$\gamma = \operatorname{atan}\left(\frac{V_{LamY}}{V_{LamX}}\right)$$

Figure 20:
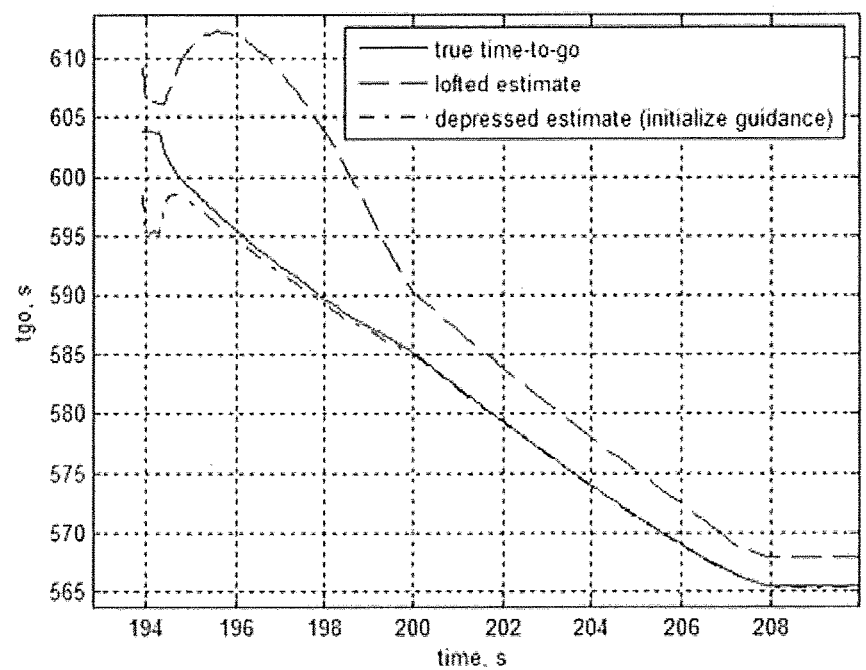
FIG. 20 illustrates that the TOF associated with the guidance solution tracks well with the TOF estimate when this estimate is used to force the depressed solution.
Figure 21:
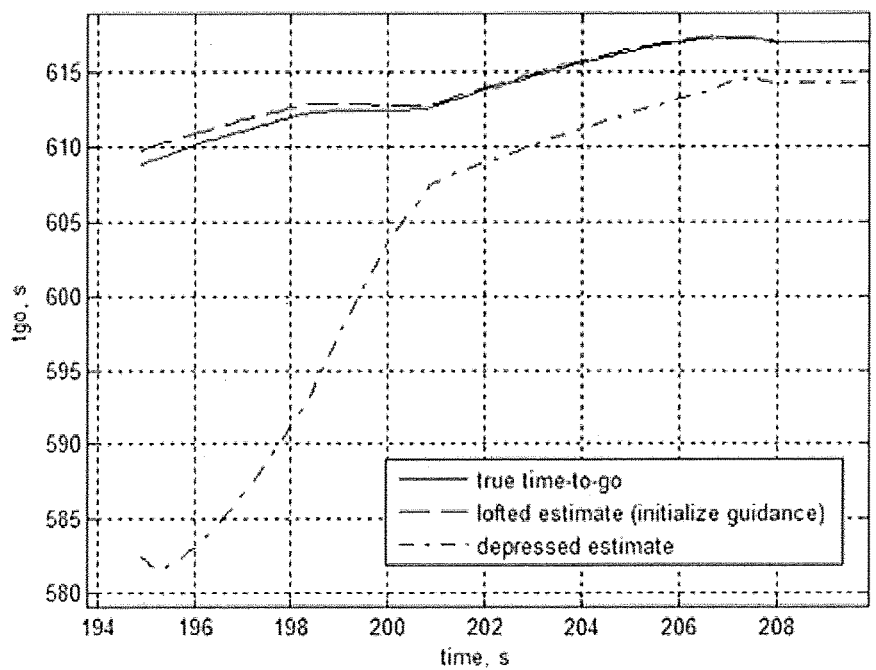
FIG. 21 illustrates that the TOF associated with the guidance solution tracks well with the TOF estimate when this estimate is used to force the lofted solution.
Figure 22:
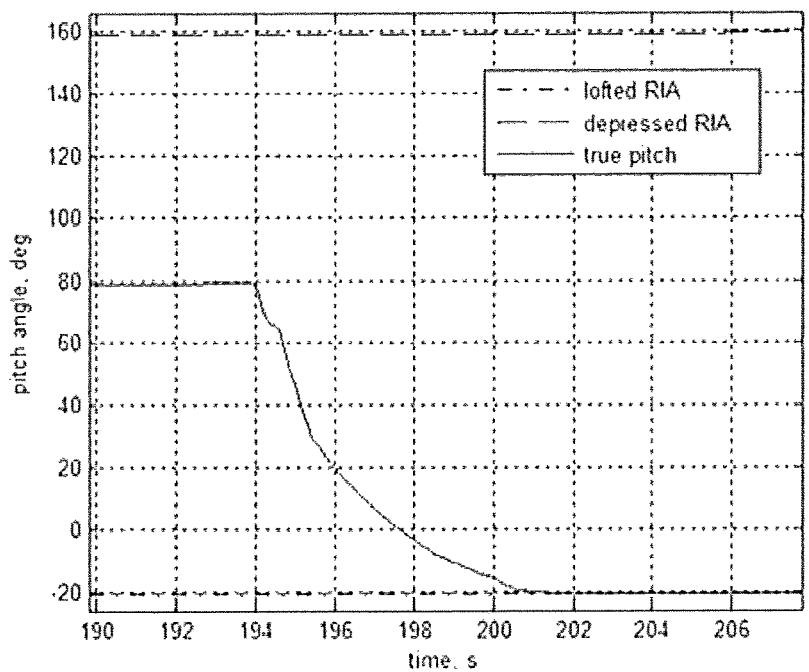
FIG. 22 illustrates the missile attitude transitions to the depressed RIA when the depressed solution for the Vgo vector of the desired Vgo magnitude is selected.
Figure 23:
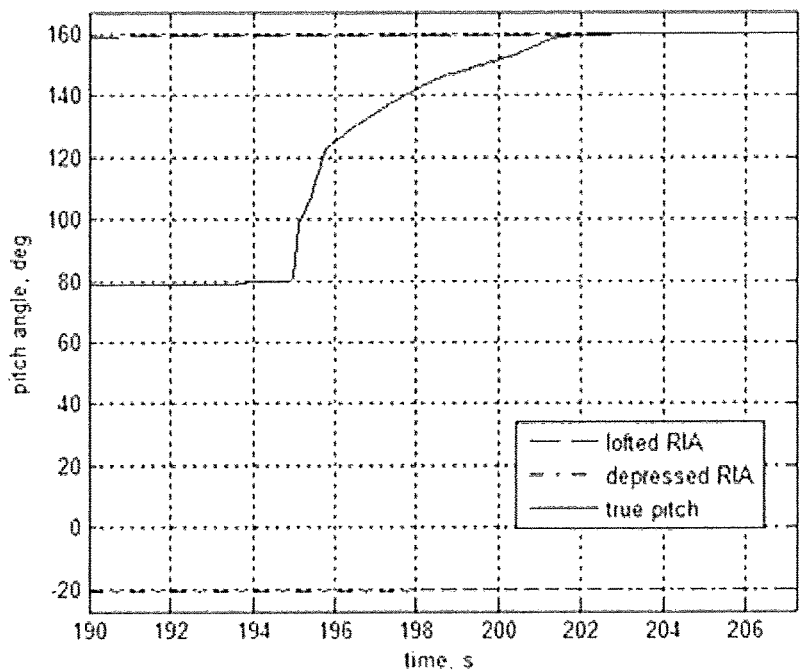
FIG. 23 illustrates the missile attitude transitions to the lofted RIA when the lofted solution for the Vgo vector of the desired Vgo magnitude is selected.

FIG. 20 shows the "true" and estimated TOF, for the nominal run from set 205 which selects the depressed solution. FIG. 21 shows an equivalent run where the lofted solution was forced. These two figures show that initializing the iteration loop with the estimated TOF successfully forces the desired solution (lofted or depressed). FIGS. 22 and 23 show the attitude convergence to the appropriate RIA for these same two runs.

Description of PVD Guidance Implementation

The heart of the PVD method is a robust solution that allows the velocity deficit to be constrained. An efficient way to do this is by constructing an iteration loop around the Lambert solver that uses either the secant or Newton Raphson method. An example of this pseudo code is shown in below:

vgoErr=2.0*epsilon;
tof=tof-dt; //use last pass for new initial guess
delta=-dt; //set numerical derivative delta
while(vgoerr>epsilon)
{
vgoVec=Lambert(tof); //nominal solution
vgoVec_d=Lambert(tof+delta); //perturbed solution
vgoMag=RSS(vgoVec); //get vector magnitude
vgoMag_d=RSS(vgoVec_d); //get vector magnitude
vgoErr=vgoMag-vgoCMD;
//use Newton Raphson method to correct for tof
tof=tof-delta(vgoMag_d-vgoMag)*vgoErr;
}
If a system/trajectory combination has a tendency to command a Vgo magnitude that is less than the minimum possible as discussed herein, then the iteration loop may be modified such that it senses this condition and transitions to a method designed to find minimum or near minimum values. A bisector bracketing method has been tested and works well. This is typically only an issue if an overly aggressive dynamic tau limiting is being used (resulting in unstable guidance), or if a lofted or depressed solution is being forced in the direction opposite the nearest RIA.

Figure 24:
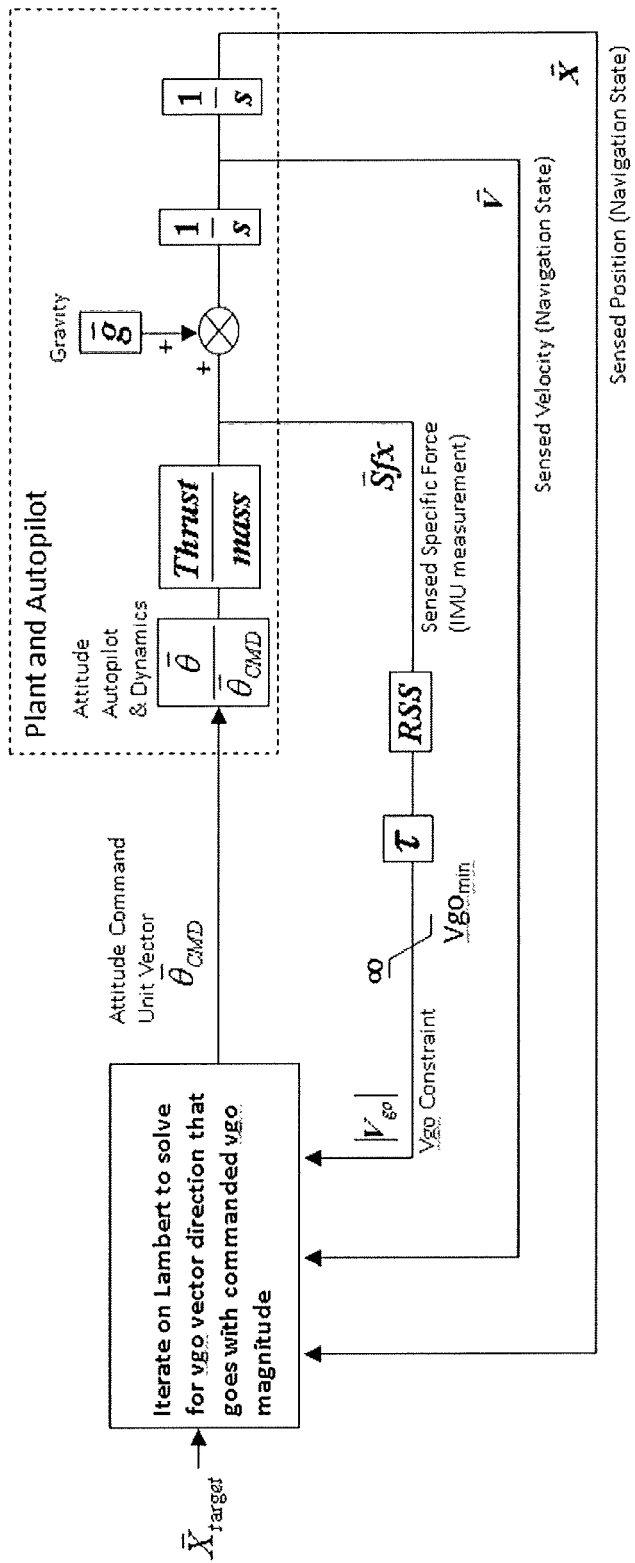
FIG. 24 is block diagram of the guidance control loop implementation.

A block diagram of the guidance control loop implementation is shown in FIG. 24. The limiter prevents a severe pitch maneuver as the motor burns out. In the case of a ballistic intercept, the target state is propagated such that the position is a function of time. In the case of a static target the position is also a function of time (due to Earth rotation).

The PVD Guidance Pseudo-Loop Analogy

Figure 25:
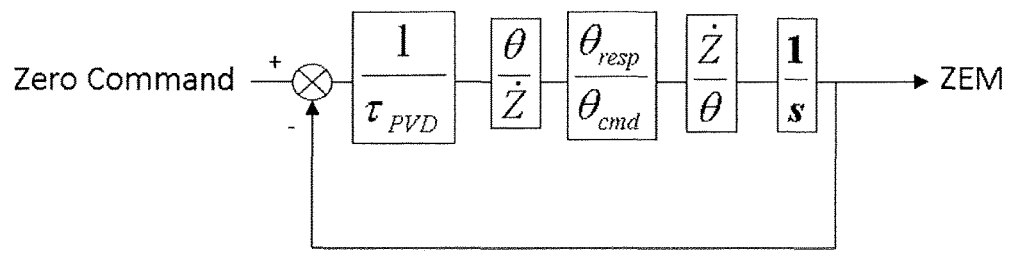
FIG. 25 depicts insertion of attitude dynamics into a ZEM loop.
Figure 26:
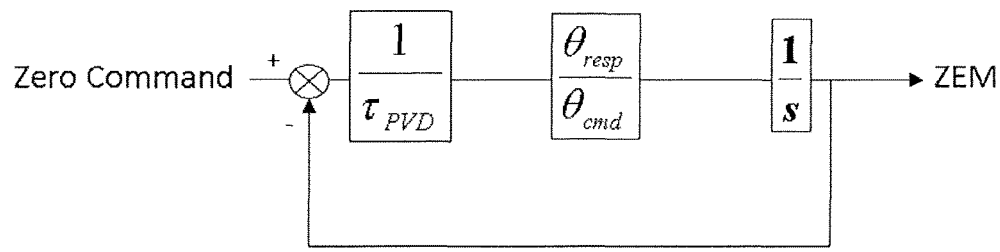
FIG. 26 depicts a basic PVD pseudo loop.
Figure 27:
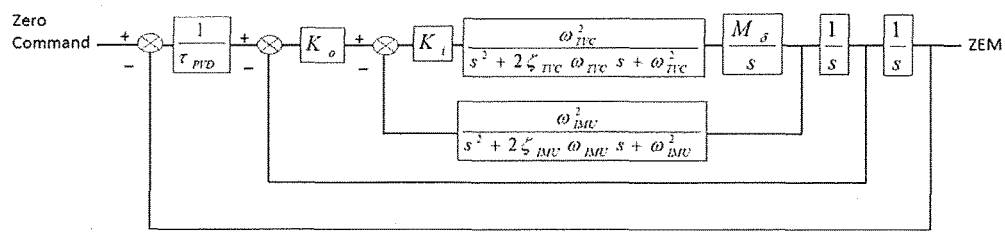
FIG. 27 depicts a full PVD pseudo loop with representative autopilot and airframe dynamics.
Figure 28:
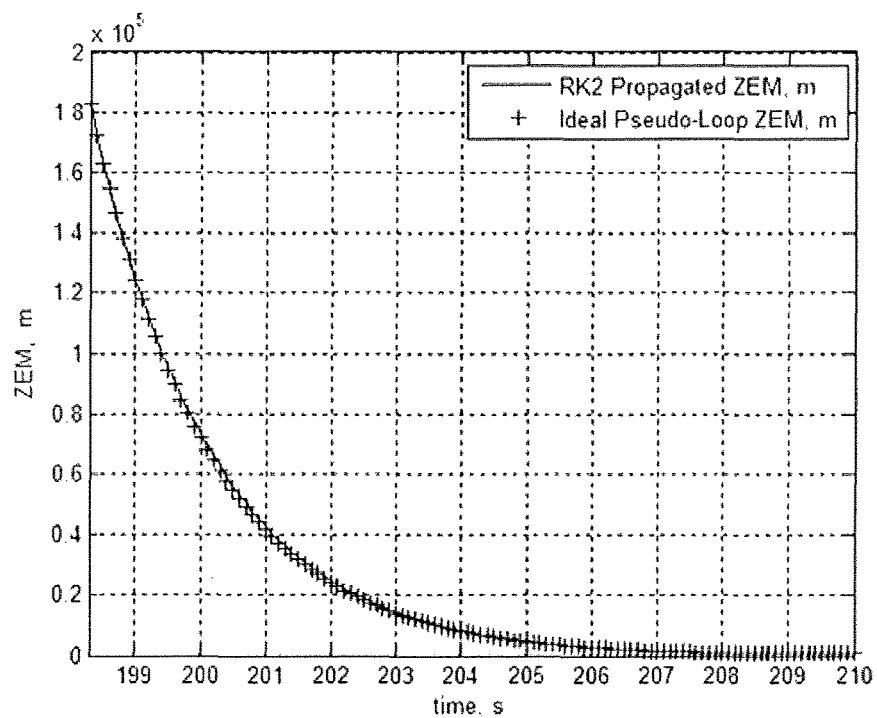
FIG. 28 depicts the ZEM comparisons for the nominal run of set 304 of the simulations.
Figure 29:
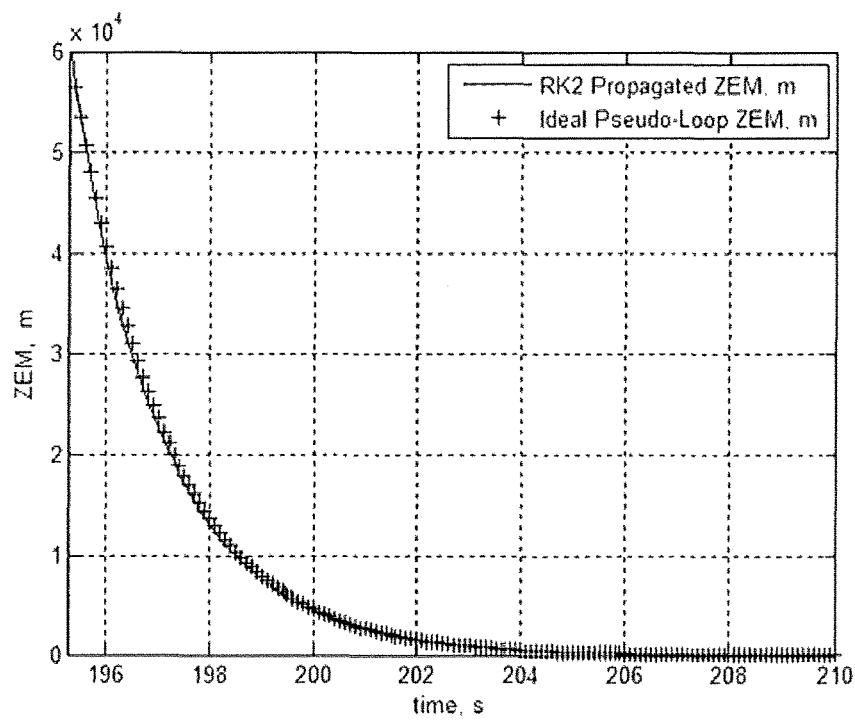
FIG. 29 depicts the ZEM comparisons for the nominal run of set 305 of the simulations.
Figure 30:
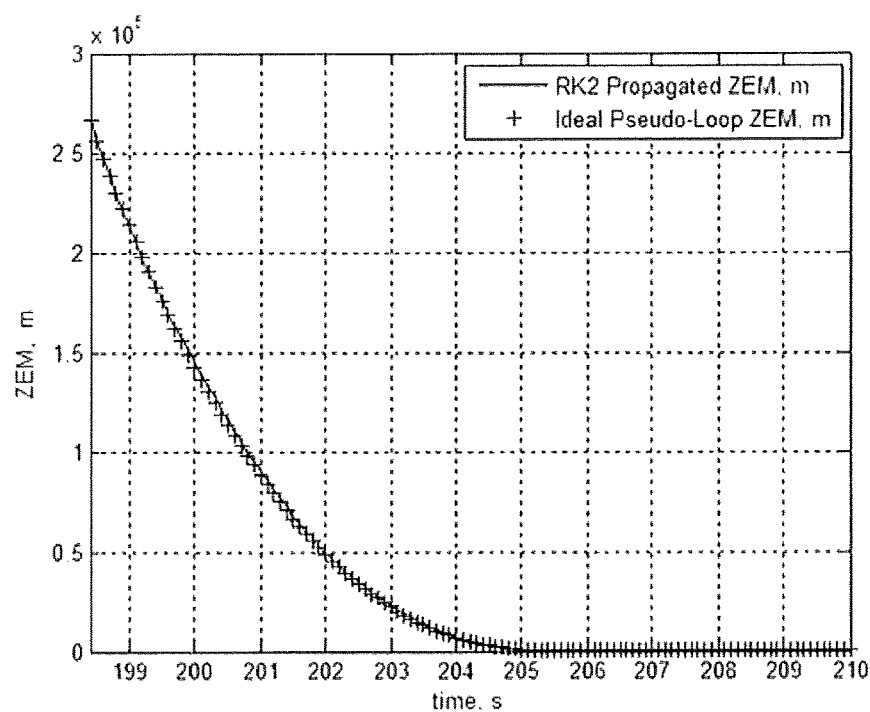
FIG. 30 depicts the ZEM comparisons for the nominal run of set 201 of the simulations.
Figure 31:
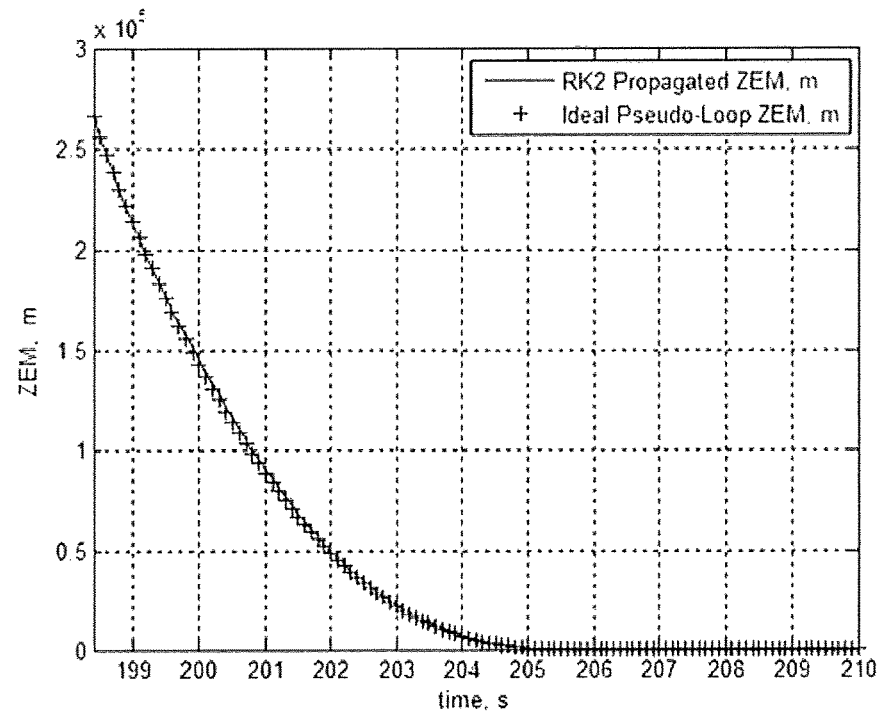
FIG. 31 depicts the ZEM comparisons for the nominal run of set 202 of the simulations.
Figure 32:
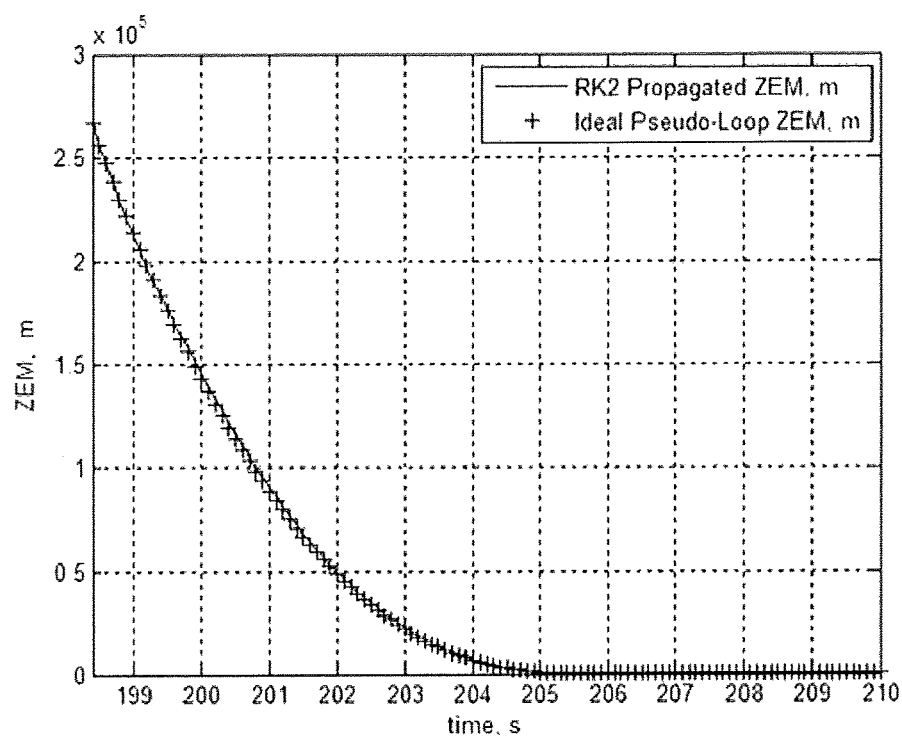
FIG. 32 depicts the ZEM comparisons for the nominal run of set 203 of the simulations
Figure 33:
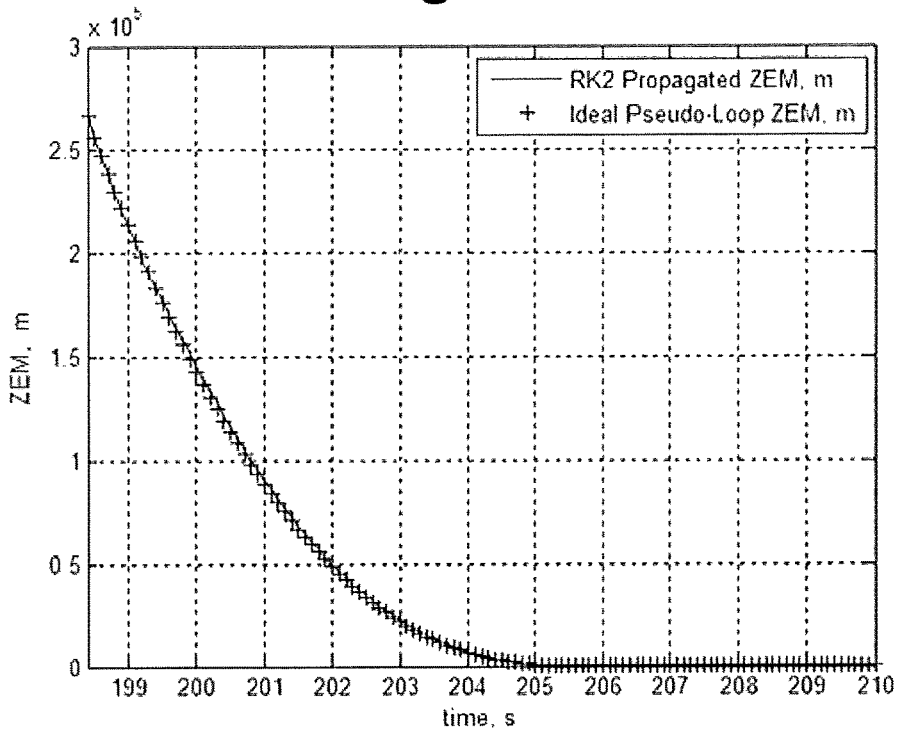
FIG. 33 depicts the ZEM comparisons for the nominal run of set 204 of the simulations
Figure 34:
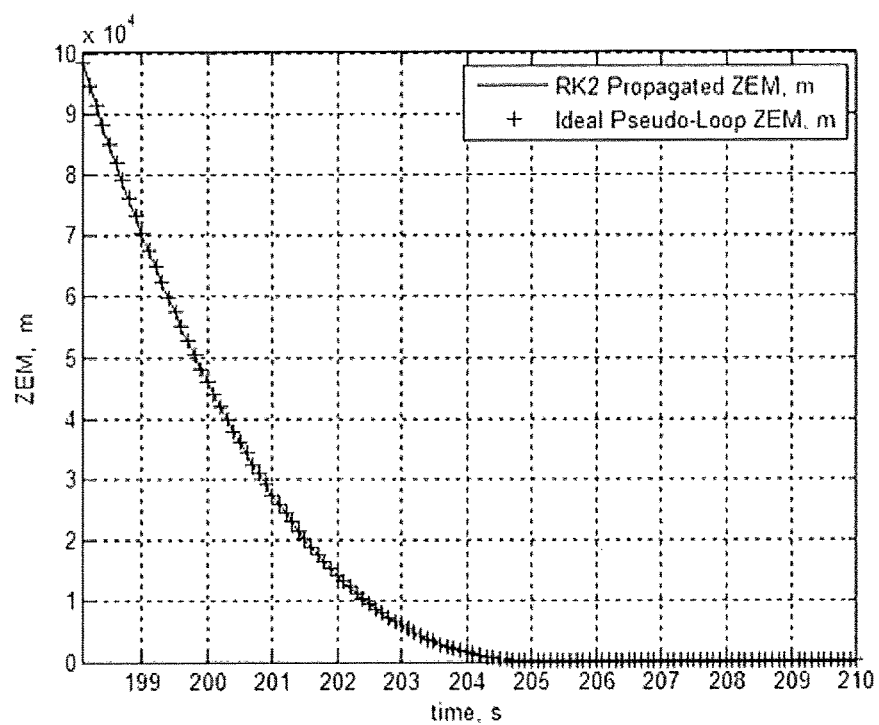
FIG. 34 depicts the ZEM comparisons for the nominal run of set 205 of the simulations.

Comparing the hypothetical idealized control loop in FIG. 13 to the implementable loop shown in FIG. 24, although they are very different, the behavior of the two are the same. Assuming that a transfer function exists that transforms pitch attitude into ZEM rate, the loop can be arranged as shown in FIG. 25 where the closed loop autopilot and airframe pitch dynamics are inserted into the idealized loop. For a purely linear analysis (no rate limits, etc.) the ZEM transfer functions cancel each other and can be removed. The resulting control loop shown in FIG. 26 is the PVD pseudo loop. Its linear behavior is identical to the linear behavior of the full PVD control loop shown in FIG. 24. FIG. 27 shows the pseudo-loop with the attitude autopilot linear block diagram inserted. When properly initialized these loops will produce a time domain step response that matches the ZEM time history during PVD guidance from the 6DOF simulation as long as nonlinear effects in the 6DOF are minimal (no extended periods of autopilot rate limited or TVC deflection limited dynamics). In addition to predicting the time domain behavior, the pseudo-loop can also be used to perform classical control theory analysis in the frequency domain.

Simulation Results

A great deal of data was collected from the simulation runs including detailed time histories of the missile dynamics for each individual run. There were a total of 20 Monte-Carlo sets completed with 100 runs per set plus the nominal runs. From all of this data the quantities that best demonstrate the PVD guidance behavior and performance are the ZEM, the pseudo-loop ZEM, and the aimpoint scatter at POCA. These are the quantities discussed herein.

Pseudo-Loop Comparisons for Nominal PVD Runs

As discussed herein, the complexity of the PVD guidance method can be represented linearly as a simple feedback loop on ZEM that surrounds the attitude autopilot. The gain on this loop is simply 1/tauPVD where tauPVD is Vgo/sf. This simple feedback loop was coined the PVD pseudo-loop or PVD pseudo-loop analogy. This is a very power tool because it reduces the entire PVD method including the Lambert solution in all of its forms, MCPI, Earth Rotation effects etc. into what is essentially a 1-D error summation a gain and an integral. While the pseudo-loop cannot guide a missile, it is ideal for both time and frequency domain analysis of the performance of the PVD guidance method. This analysis could include time domain step responses and frequency domain analysis to determine the optimal time constant as well as stability margins and many other useful metrics and parameters.

Comparisons between the actual propagated ZEM value and the pseudo-loop predicted ZEM are presented herein for the nominal simulation runs. The ZEM prediction was performed within the simulation at 20 Hz intervals (the guidance sample rate) using 10 Hz RK2 integration of the missile state. For ballistic intercepts the target state was also propagated with the same RK2 integration. Earth fixed targets simply required an Earth rotation to update the target state. Regardless of the target type, the missile and target states were taken to POCA and the ZEM distance was calculated. The pseudo-loop ZEM was calculated using a time domain representation of the loop shown in FIG. 27 including a discrete z domain filter for the TVC. This loop was updated at 200 Hz which is also the autopilot sample rate. The IMU transfer function was not included because it was at a sufficiently high (60 Hz) rate to have little effect. The 200 Hz sample rate of the loop would also be insufficient for a 60 Hz discreet filter.

FIGS. 28-34 represent the ZEM comparisons for the nominal runs from sets 304, 305, and 201 through 205, respectively. These sets all use the MCPI Lambert method. Sets 201 through 205 also use dynamic tau limiting. The agreement between the propagated ZEM and the pseudo-loop ZEM is excellent for all of these runs.

Figure 35:
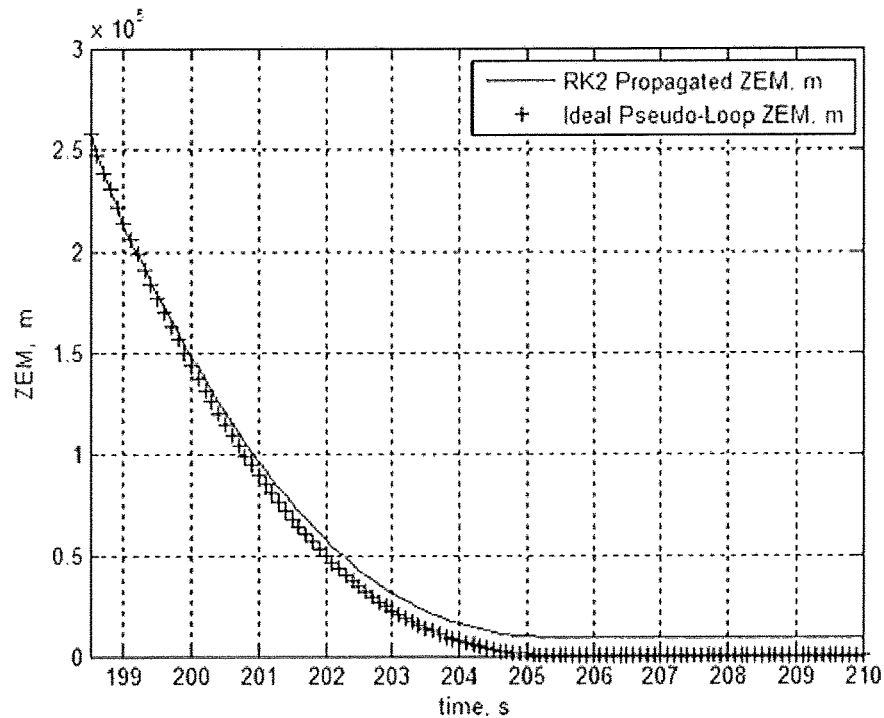
FIG. 35 depicts the ZEM comparisons for the nominal run of set 206 of the simulations.
Figure 36:
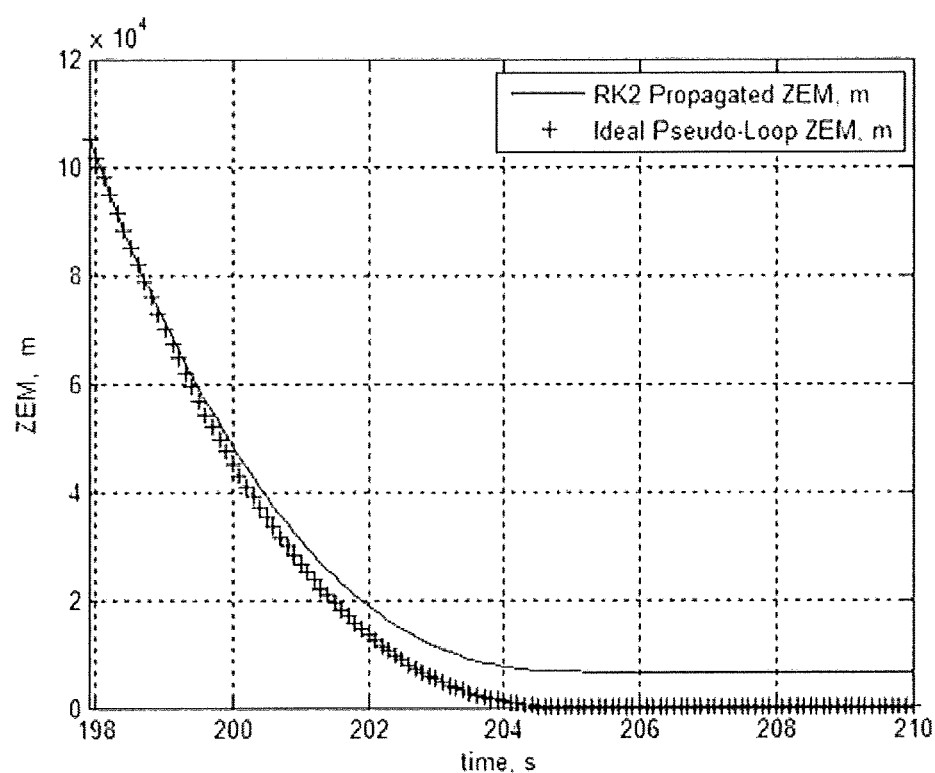
FIG. 36 depicts the ZEM comparisons for the nominal run of set 207 of the simulations.

FIGS. 35 and 36 represent the nominal runs from sets 206 and 207, respectively. These sets are identical to 204 and 205 except the traditional Kepler Lambert method was used. This introduces a guidance bias error because it only compensates for spherical Earth gravity effects. This bias can be seen as an offset between the propagated ZEM and the pseudo-loop ZEM. The pseudo-loop ZEM approaches zero as usual, but because the method is assuming a spherical Earth, there is a targeting bias. This can typically be compensated for with an aimpoint offset. The precision of the system should still be excellent using PVD guidance with a Kepler Lambert solution.

Figure 37:
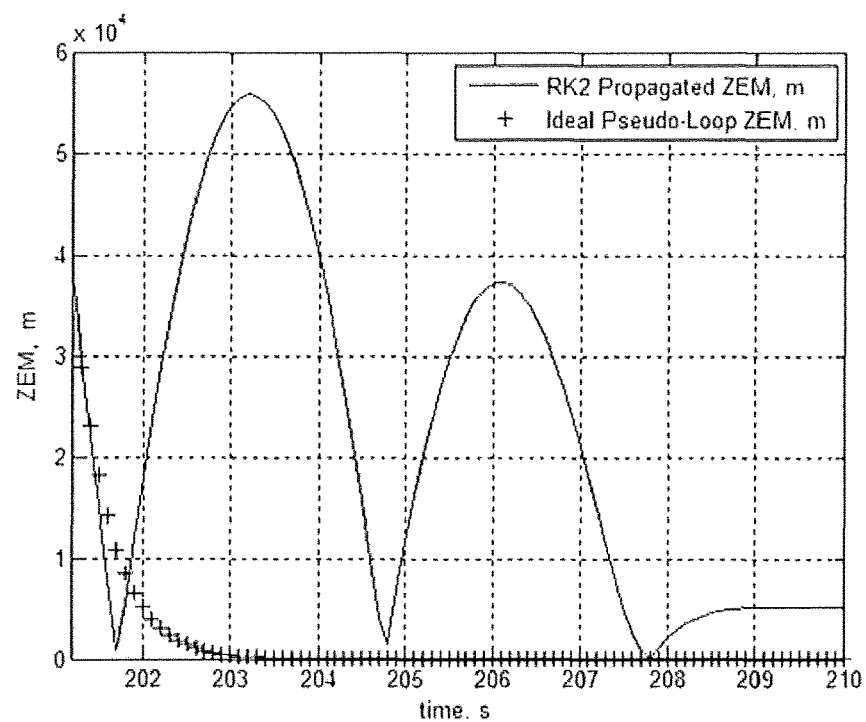
FIG. 37 depicts the ZEM comparisons for the nominal run of set 208 of the simulations.
Figure 38:
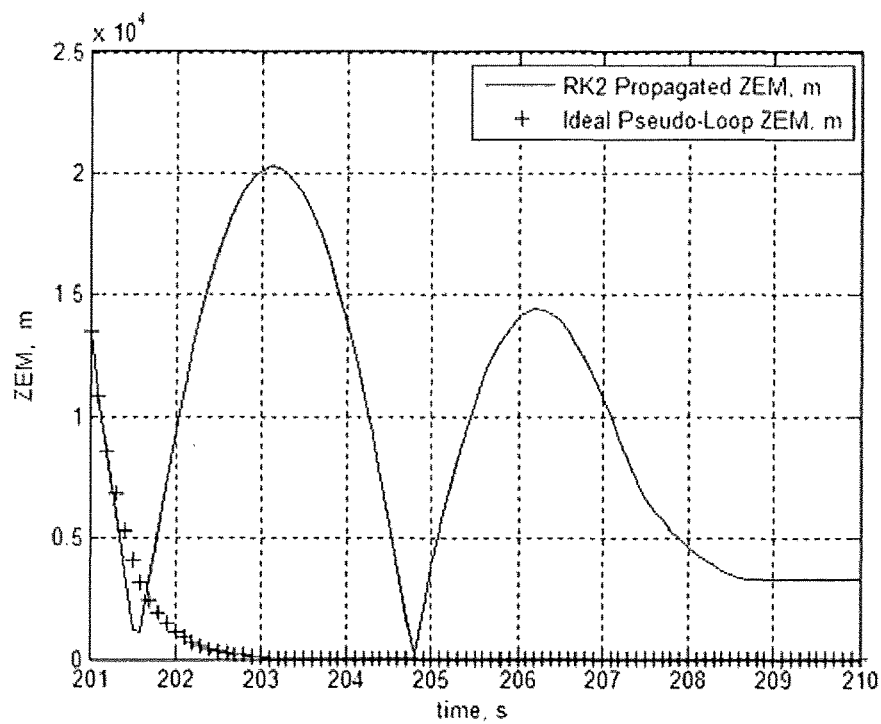
FIG. 38 depicts the ZEM comparisons for the nominal run of set 209 of the simulations.

FIGS. 37 and 38 represent sets 208 and 209, respectively, which are identical to 204 and 205 except that the dynamic time constant limiting is turned off without increasing the time constant to allow for the body rate limit. When the PVD guidance maneuver first starts, the missile axis can be far away from the RIA and the PVD method will command the vehicle to transition toward the RIA very quickly. The speed at which this can occur is limited primarily by the autopilot pitch rate limit. If the missile is not able to keep up with the guidance command, then oscillation will occur because there will be a lag that is too large for good guidance stability. In the time domain, the missile is simply not doing what the guidance needs it to do. The way to avoid this is to increase the time constant or provide a lower limit on the time constant that decays back to the original constant value over a short period of time as the maneuver settles and the system returns to a linear response. This dynamic tau limiting is discussed in detail in herein. FIGS. 37 and 38 show the oscillation that occurs. Neither of these cases will achieved acceptable PVD guidance accuracy.

Aimpoint Dispersion Plots

The purpose of the PVD guidance method is to improve the accuracy of a ballistic missile. To demonstrate the performance of the PVD guidance method, dispersion scatter plots were generated for all Monte-Carlo sets. The non-PVD runs (sets 101 through 107) are compared to the equivalent PVD sets (sets 304, 305, and 201 through 207). The remaining sets (208 through 213) are also compared to provide insight into behavior and trends.

The greatest contributor to aimpoint dispersion for the non-PVD runs was expected to be the Isp uncertainty which is fairly large with a 0.5% 1-sigma scale value. The delta-V of a rocket motor can be predicted using the rocket equation as shown in equation 17.

$$deltaV = gIsp \ln\left(\frac{m_i}{m_f}\right) \quad 17$$

From this equation it is apparent that delta-V is proportional to Isp. Based on this, a 3-sigma Isp draw (1.015 scale factor) will correspond to a 1.5% increase in the delta-V of the stage. Multiplying this 1.5% change in delta-V by the ballistic propagation time results in an estimate of the aimpoint miss due to a three sigma Isp draw if PVD guidance is not used. The total third stage delta-V is approximately 2000 m/s and the ballistic propagation time is approximately 2000 seconds for the fixed target, therefore the dispersion is estimated to be about +−60 km as shown in equation 18. Since there are many other sources of error, it could be larger than this. The 0.5% mass uncertainty will have a significant contribution as well, but was not evaluated here.

$$\left(2000 \; \frac{m}{s}\right)(2000 \; s)(0.015) = 6.e4m = 60 \; km \quad 18$$

Orthogonal POCA Miss Distances

It is typical to plot ballistic missile targeting dispersions in terms of downrange and crossrange miss distances; however these terms lose their meaning for a ballistic intercept. While downrange and crossrange distances are very useful for understanding the system performance against a ground target, they are not really representative of the distances that the guidance is attempting to null. Lambert guidance methods are actually trying to hit a point in inertial space and as such they are trying to null the ZEM distance. This is true for Earth fixed targets and for intercepts. The downrange and crossrange misses are basically equivalent to projections of the ZEM onto the surface of the Earth.

Since both Earth fixed and ballistic intercept targets are employed in this study, it was desired to have orthogonal (2-D) miss distances similar to downrange and crossrange that could be applied to both type of targets. The true miss distance occurs at POCA and it was decided to use this point as the reference. While commonly used for analysis of ballistic intercepts, POCA is not typically referred to when discussing ground targets. It does however have two advantages for the purposes at hand: it can be applied to both types of targets, and it can be directly compared to the ZEM distance which is also calculated at POCA.

In order to created 2-D scatter plots, an orthogonal 2-D frame was needed in which both the missile and the target exist at POCA. A sensible way to do this was to construct a 3-D frame with the x-axis along the relative inertial velocity vector between the target and missile, the y vector is horizontal to the right, and z completes the right hand rule. The miss distance in the x direction is zero, y miss is called horizontal and the z miss is called vertical. All of the aimpoint dispersion plots show scatters that are resolved into these vertical and horizontal distances. The horizontal miss distance is roughly equivalent to crossrange while the vertical is roughly equivalent to downrange multiplied by the sine of vertical flight path angle.

Basic PVD Runs

Sets 304 and 305 were tests of the basic, unenhanced versions of PVD. In these runs, the time constant must be large enough (slow enough) to not "outrun" the missile's pitch rate limit. This results in a lower overall guidance gain and less accuracy than is available if the time constant is ramped down as described herein. The advantages of the basic method are that it can be summed up in a single equation (equation 7), it has only one tuning parameter (the time constant), and it works.

Figure 39:
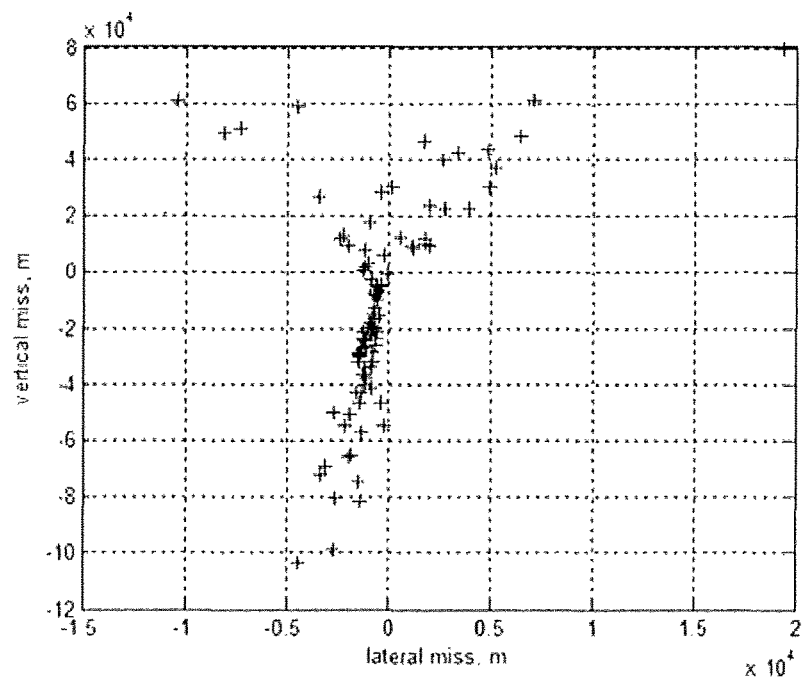
FIG. 39 shows the miss distance dispersions of the baseline set 104 of the simulations.
Figure 40:
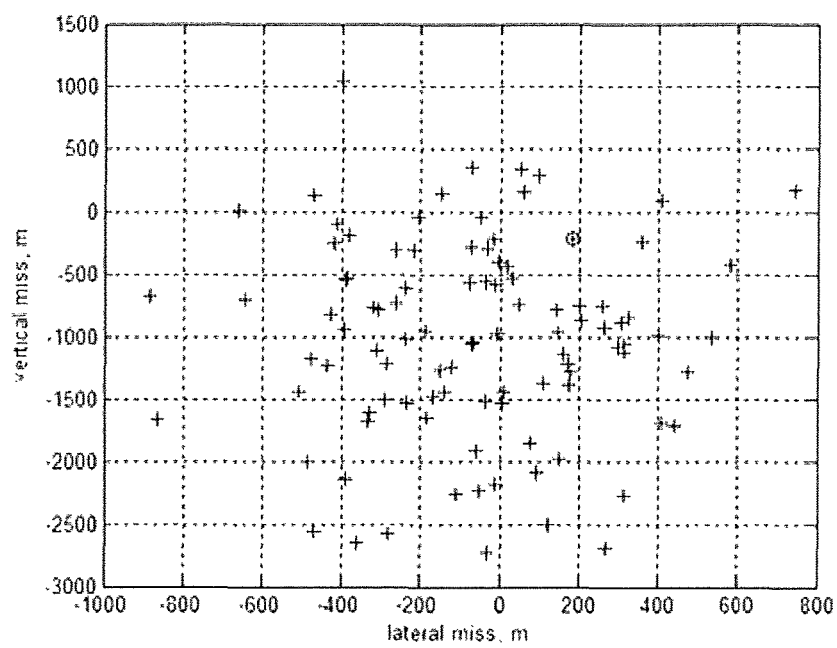
FIG. 40 shows the miss distance dispersions of set 304 of the simulations.

FIG. 39 shows the miss distance dispersions of the baseline set 104, and FIG. 40 shows the miss distance dispersions of set 304. Set 104 targeted an Earth fixed position with only GEMS and no PVD guidance. Set 304 is the most basic PVD method against the same target, without any dynamic tau limiting. The improvement in accuracy is nearly two orders of magnitude.

Figure 41:
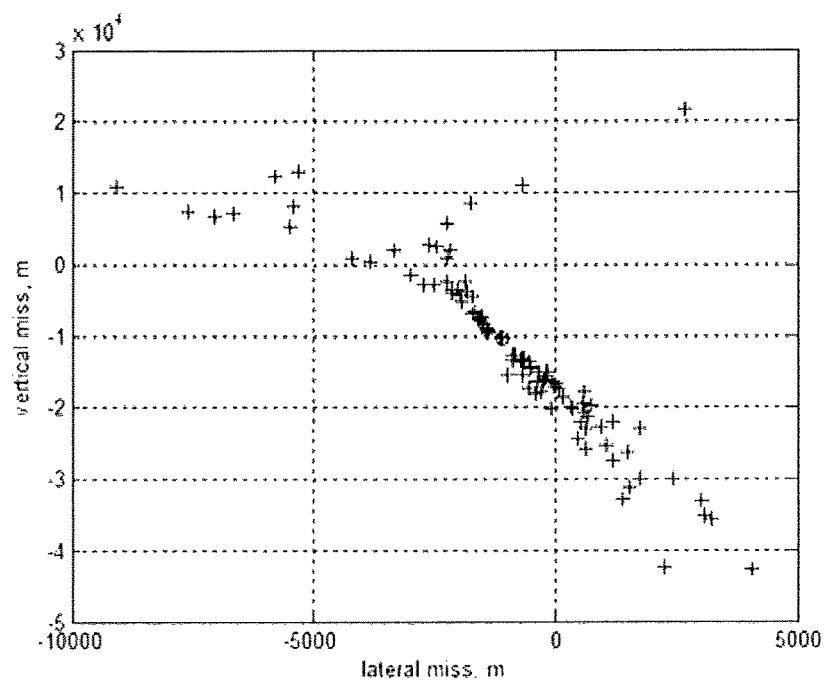
FIG. 41 shows the miss distance dispersions of the baseline set 105 of the simulations.
Figure 42:
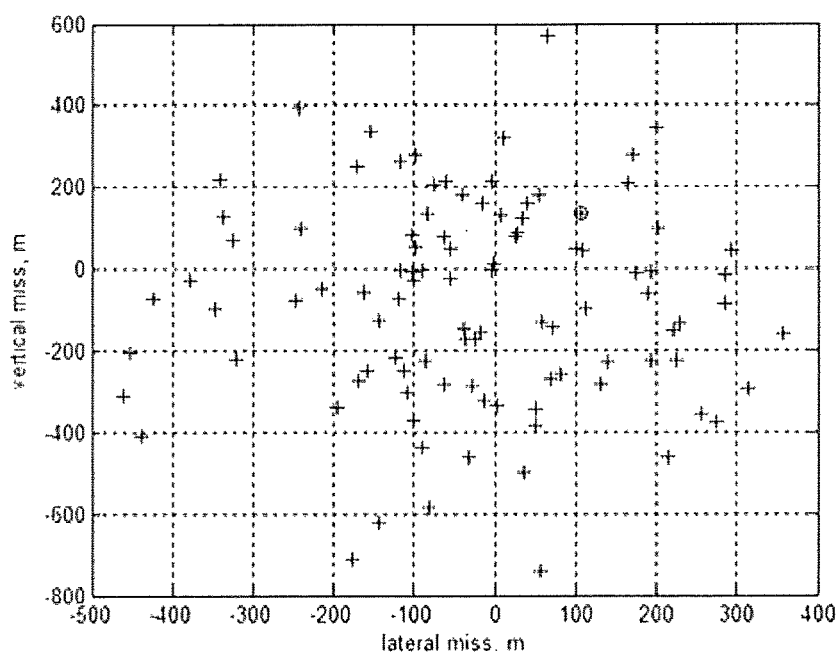
FIG. 42 shows the miss distance dispersions of set 305 of the simulations.

FIG. 41 shows the miss distance dispersions of the baseline set 105, and FIG. 42 shows the miss distance dispersions of set 305. Set 105 targeted a ballistic state with only GEMS and no PVD guidance. Set 305 is the most basic PVD method against the same target, without any dynamic tau limiting. The improvement in accuracy is about 1.5 orders of magnitude.

Sensitivity of Aimpoint Dispersion to Various Error Sources

Figure 43:
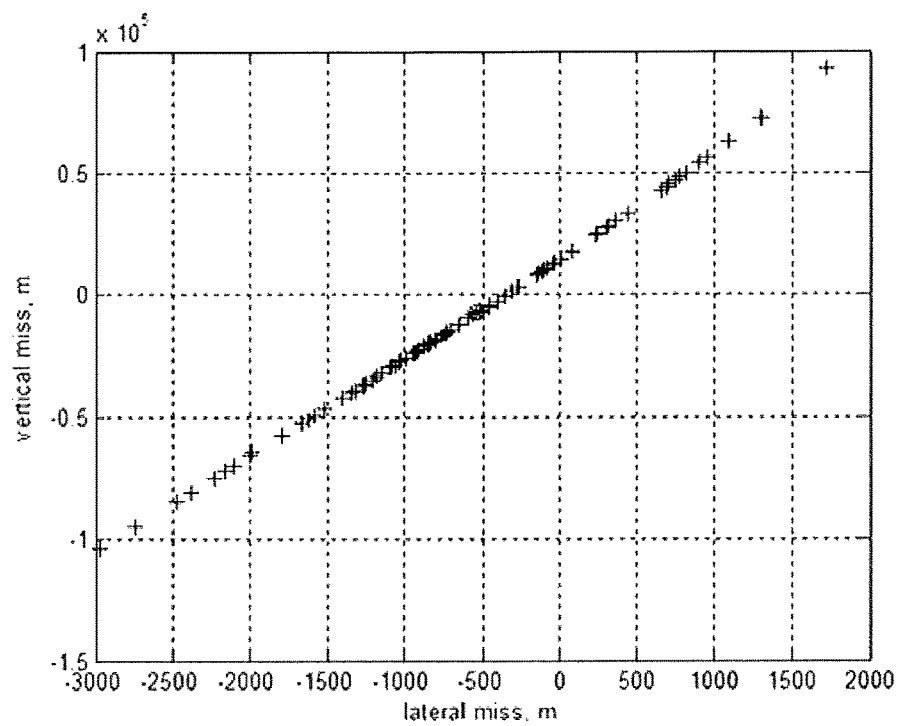
FIG. 43 shows the miss distance dispersions of set 101 of the simulations using Group 1 uncertainties.
Figure 44:
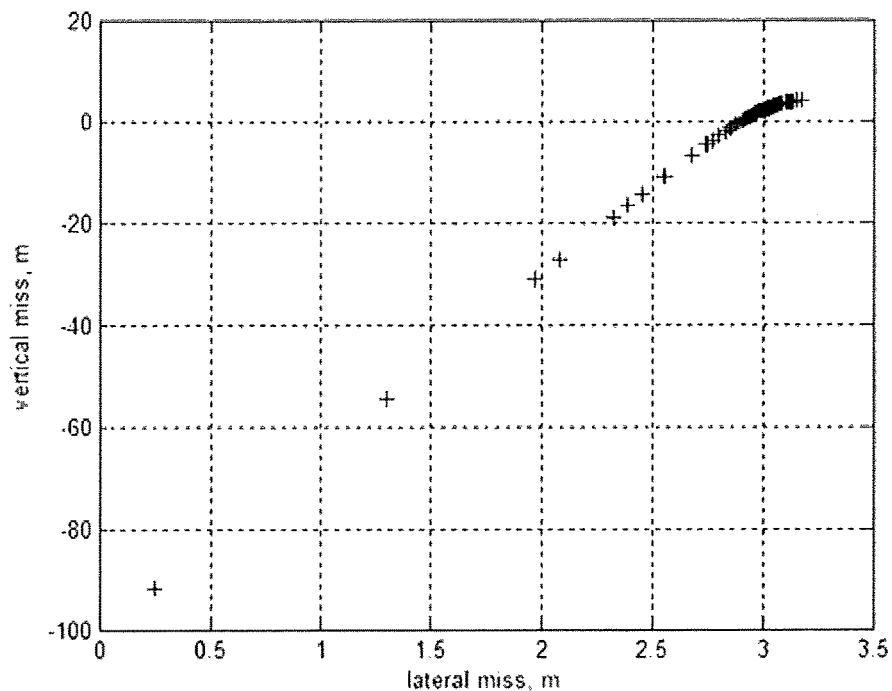
FIG. 44 shows the miss distance dispersions of set 201 of the simulations using Group 1 uncertainties.

FIG. 43 shows the set 101 miss distance dispersions, and FIG. 44 shows the set 201 miss distance dispersions. These figures only include the uncertainties Group 1 uncertainties in Table 1, which are mass and Isp. These are the primary dispersion sources that PVD guidance is designed to compensate for. The 1-sigma mass and Isp dispersions are 0.5% of the nominal.

Set 101 used GEMS to compensate for the nominal missile impulse, however no attempt was made to compensate for uncertainties. The total scatter due to these uncertainties is about than 200 km (100 km each way) which is a bit larger than the prediction of 60 km (radius) made herein. This prediction was however based only on the Isp uncertainty. Set 201 uses PVD guidance which compensates for the mass and Isp uncertainty. The total scatter is about 100 meters.

Figure 45:
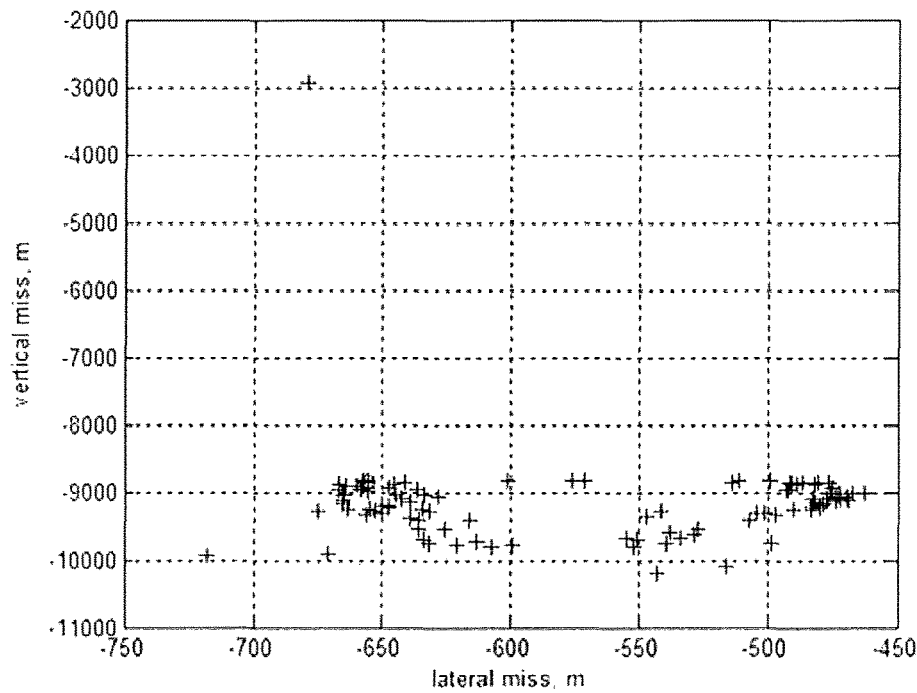
FIG. 45 shows the miss distance dispersions for set 102 of the simulations using Group 2 uncertainties.
Figure 46:
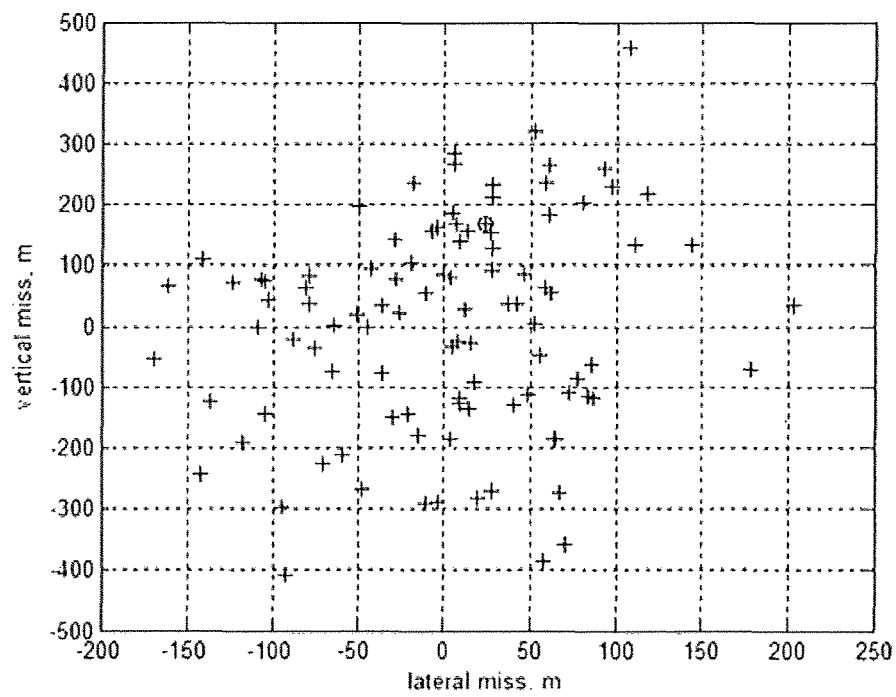
FIG. 46 shows the miss distance dispersions for set 202 of the simulations using Group 2 uncertainties.

FIG. 45 shows the miss distance dispersions for set 102, and FIG. 46 shows the miss distance dispersions for set 202; however, these figures only include the uncertainties Group 2 uncertainties in Table 1 which are the lateral TVC pivot location and the lateral center of gravity. Both of these uncertainties are 0.005 meter 1-sigma biases. For conventional guidance methods this is a secondary source of dispersion. Set 101 which does not use PVD guidance has a total scatter of about 1.2 km (discounting the outlier) due to these uncertainty sources while the PVD guidance has about 1 km. While these errors only contribute to a small portion of the total dispersion for the non-PVD runs, they are the main source of dispersion for the PVD runs due to the PVD's ability to almost completely compensate for the mass and Isp.

Figure 47:
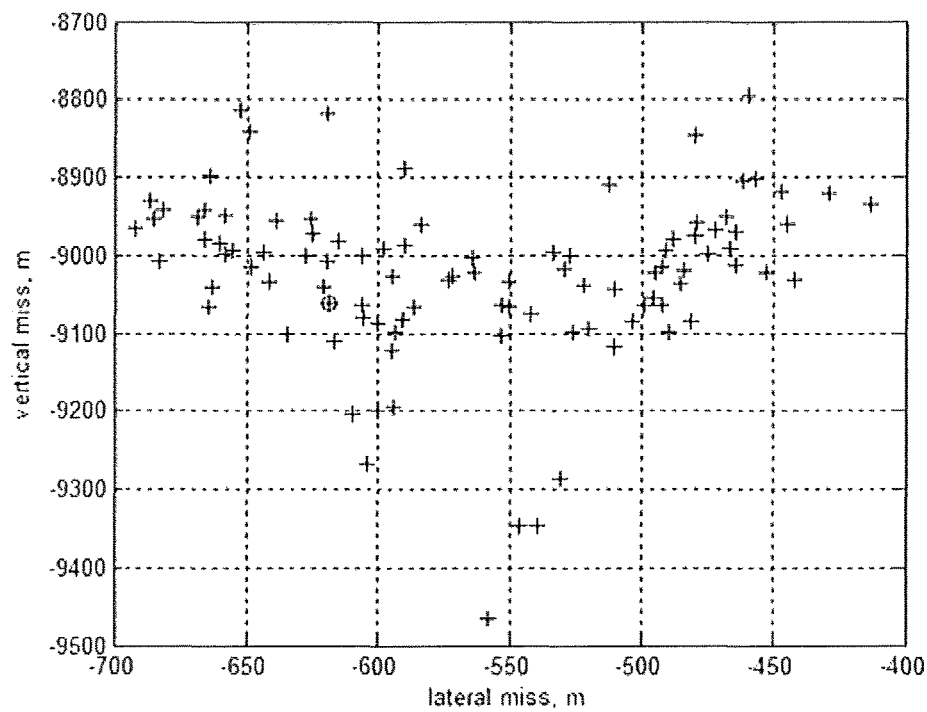
FIG. 47 shows the miss distance dispersions for set 103 of the simulations using Group 3 uncertainties.
Figure 48:
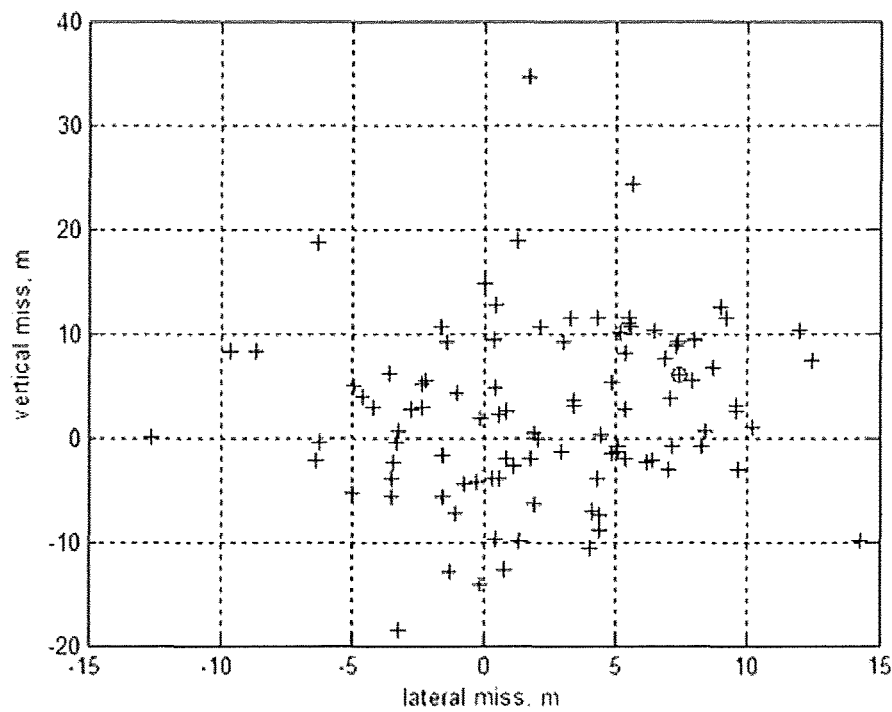
FIG. 48 shows the miss distance dispersions for set 203 of the simulations using Group 3 uncertainties.

FIG. 47 shows the miss distance dispersions of set 103, and FIG. 48 shows the miss distance dispersions of set 203; however, these figures show only the Group 3 uncertainties in Table 1. These are not major sources of aimpoint dispersions. Set 103 has a total dispersion due to these uncertainties of less than 700 meters. This is negligible compared to dispersions due to the Group 1 and Group 2 uncertainties. The PVD guidance used in set 203 reduces this dispersion to about 55 meters.

Figure 49:
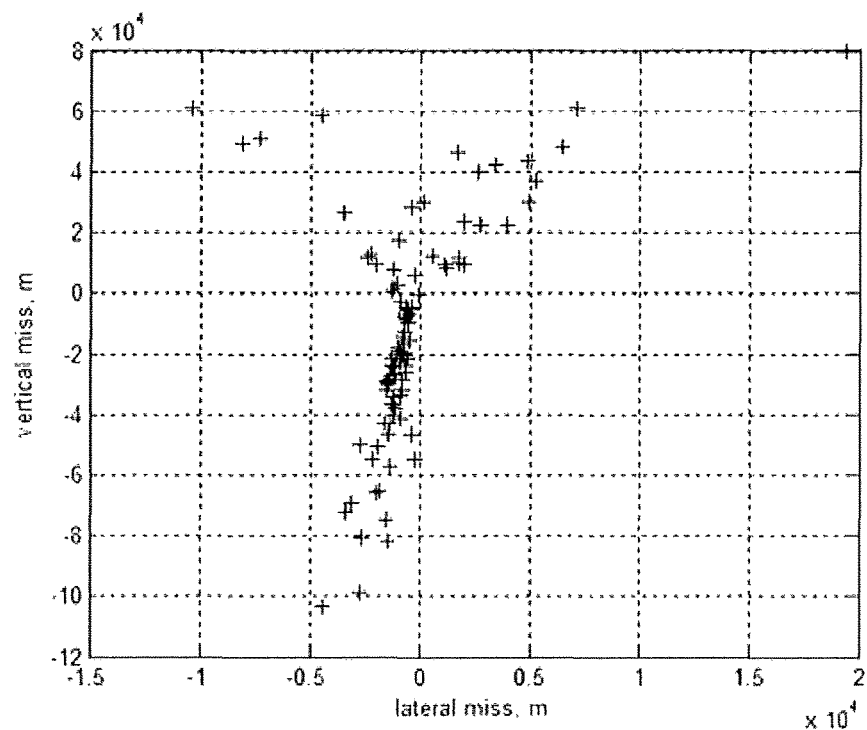
FIG. 49 shows the miss distance dispersions for set 104 of the simulations, including all Monte Carlo error sources.
Figure 50:
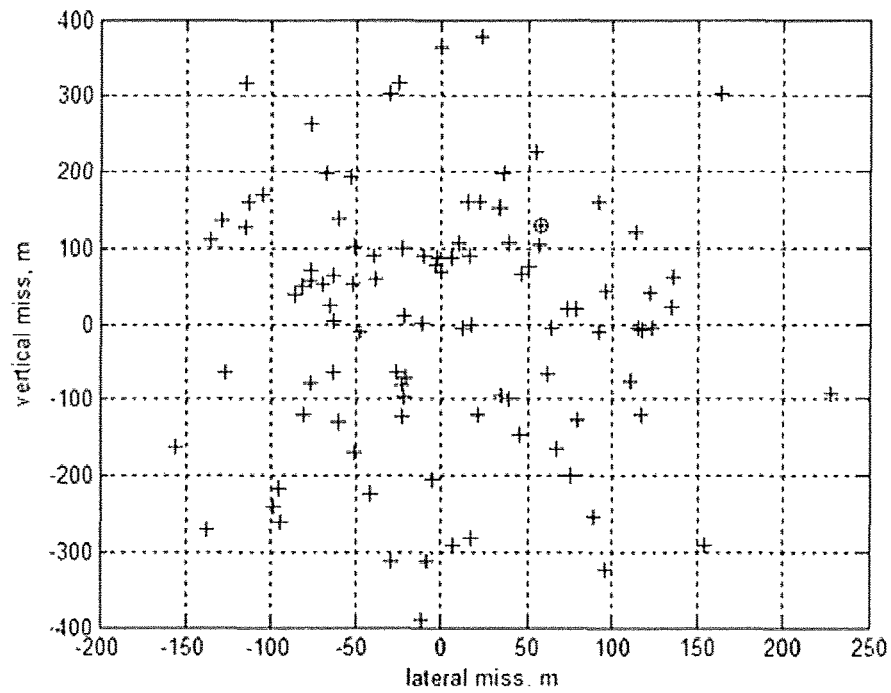
FIG. 50 shows the miss distance dispersions for set 204 of the simulations, including all Monte Carlo error sources.

FIG. 49 shows the miss distance dispersions of set 104, and FIG. 50 shows the miss distance dispersions of set 204; these figures include all Monte-Carlo error sources. The non-PVD set 104 has about 160 km of dispersion while the PVD guidance set 204 has about 800 meters. The set 104 dispersions are mainly due to mass and Isp uncertainties. The set 204 dispersions are mainly due to lateral pivot point uncertainty and lateral cg uncertainty because the PVD guidance compensates for the mass and Isp uncertainties.

Figure 51:
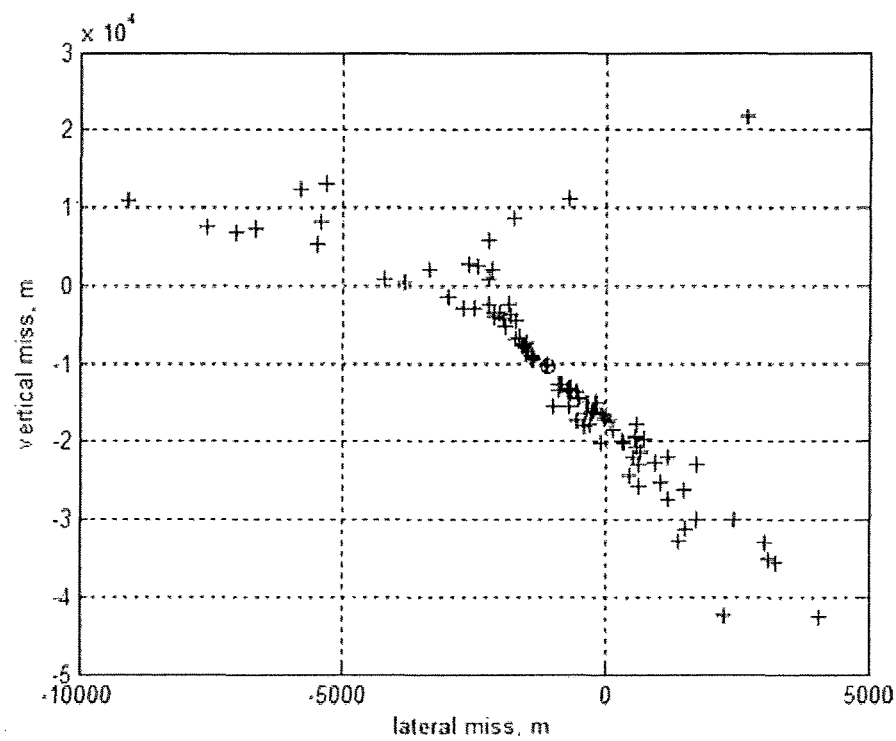
FIG. 51 shows the miss distance dispersions for set 105 of the simulations, including all Monte Carlo error sources.
Figure 52:
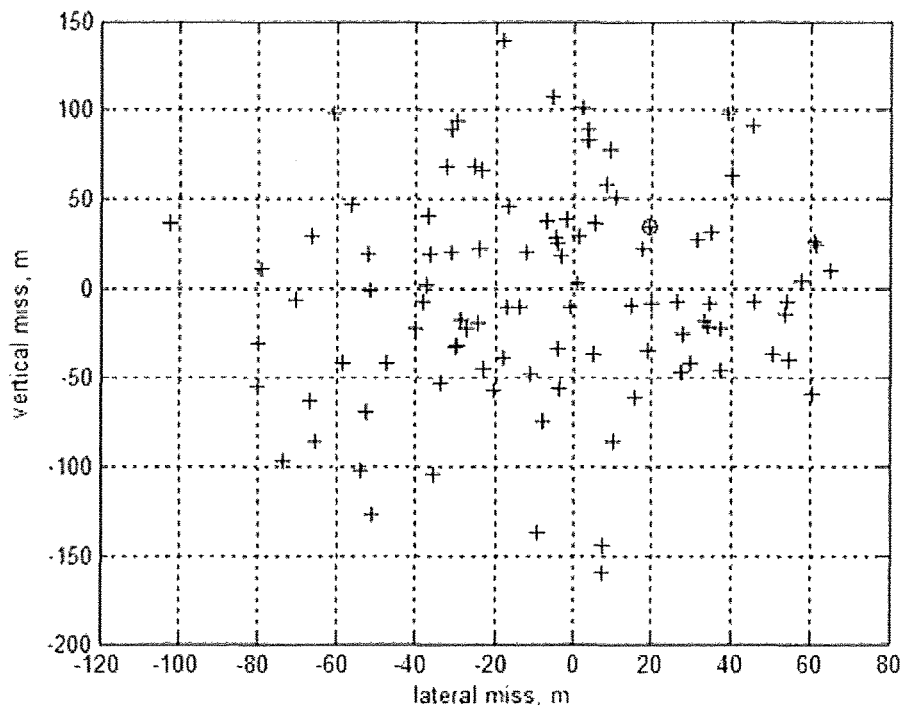
FIG. 52 shows the miss distance dispersions for set 205 of the simulations, including all Monte Carlo error sources.

FIG. 51 shows the miss distance dispersions for set 105, and FIG. 52 shows the miss distance dispersions for set 205; these figures include all the Monte-Carlo error sources but differ from sets 104 and 204 in that the target is a ballistic ICBM range trajectory that is intercepted. The performance is similar to sets 103 and 204 except that the dispersions are smaller due to the shorter TOF of the ballistic intercept.

Figure 53:
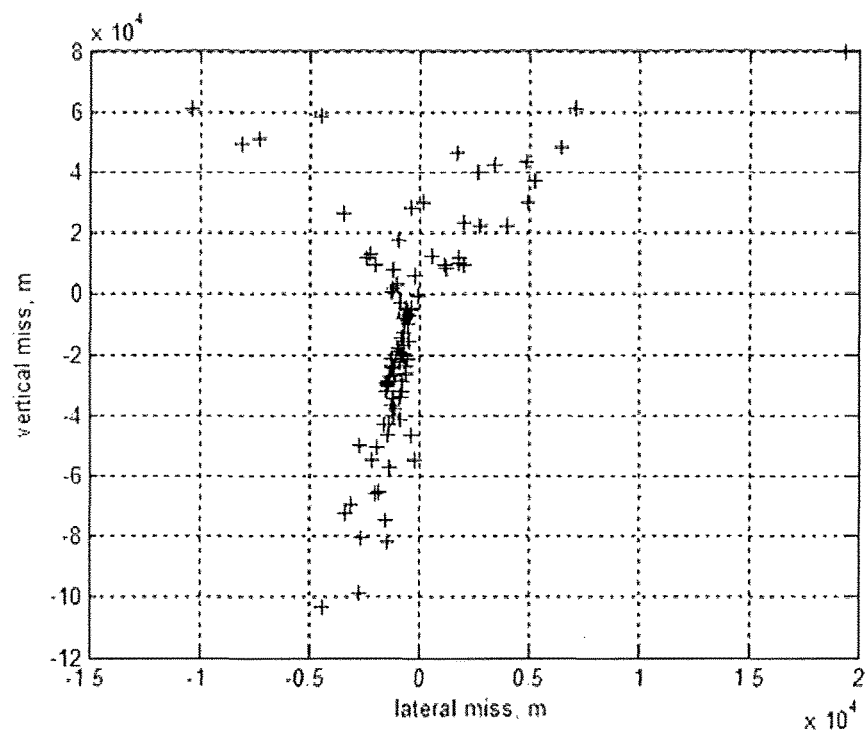
FIG. 53 shows the miss distance dispersions for set 106 of the simulations, using the traditional Kepler Lambert solution rather than MCPI.
Figure 54:
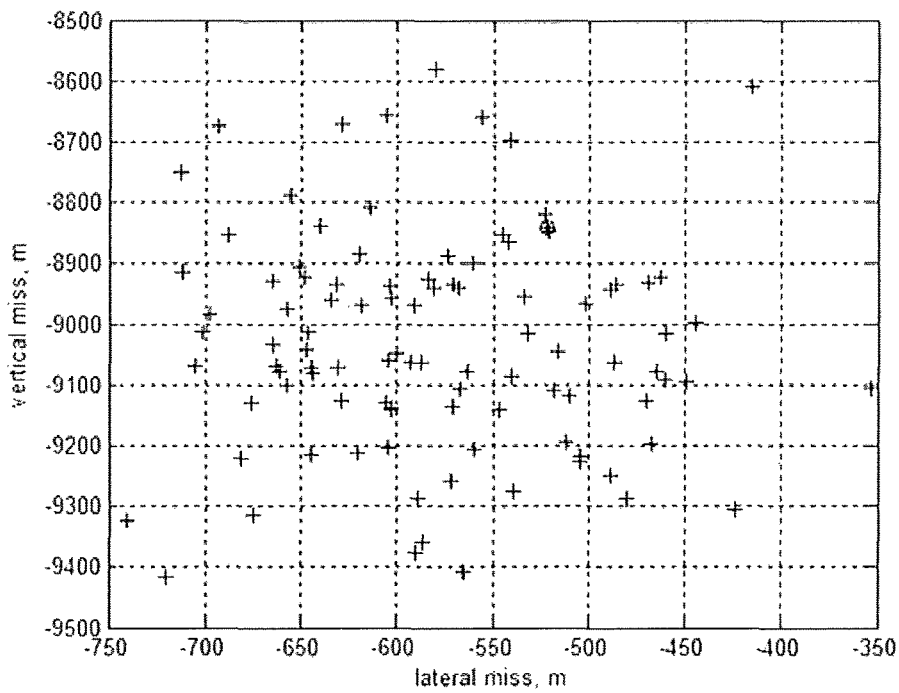
FIG. 54 shows the miss distance dispersions for set 206 of the simulations, using the traditional Kepler Lambert solution rather than MCPI.

FIG. 53 shows the miss distance dispersions for set 106, and FIG. 54 shows the miss distance dispersions for set 206; these figures use the traditional Kepler Lambert solution rather than MCPI. These results are very similar to sets 104 and 204 which used MCPI. The primary difference is that the Kepler solution introduces a bias error due to the spherical gravity assumption inherent in it. Because of the large scatter in the non-PVD set 106 the bias is not apparent. In the PVD guidance set 206 the bias can be clearly seen. The dispersion pattern size is about the same for the Kepler and MCPI sets.

Figure 55:
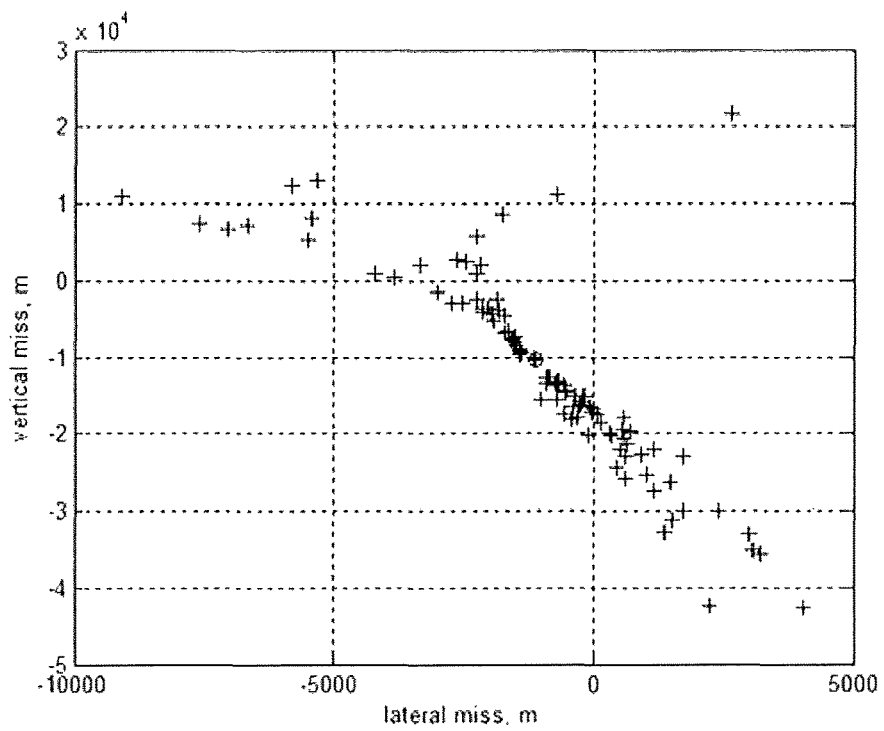
FIG. 55 shows the miss distance dispersions for set 107 of the simulations, using the traditional Kepler Lambert solution rather than MCPI.
Figure 56:
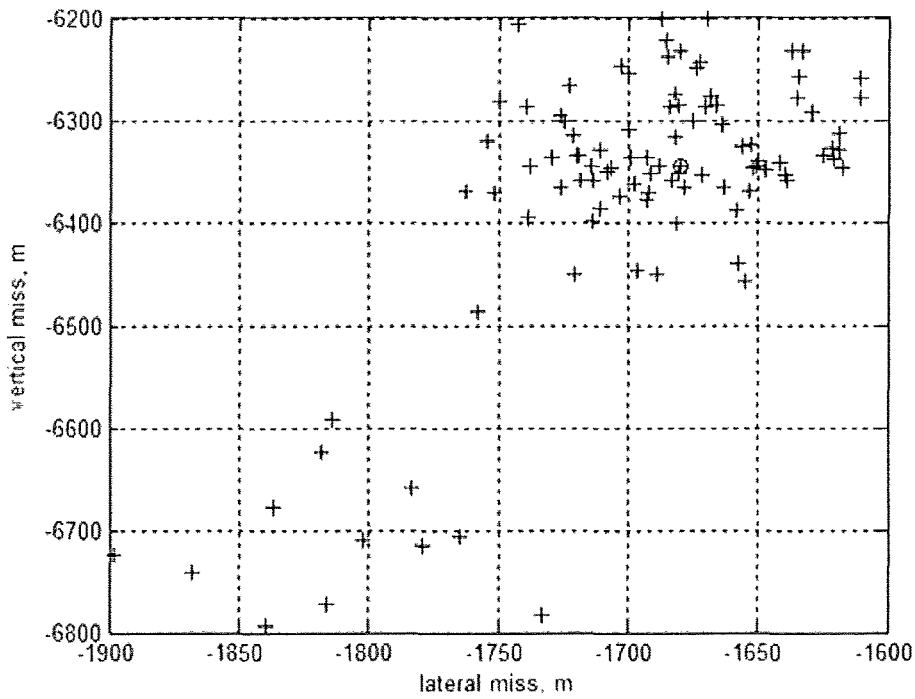
FIG. 56 shows the miss distance dispersions for set 207 of the simulations, using the traditional Kepler Lambert solution rather than MCPI.

FIG. 55 shows the miss distance dispersions of set 107, and FIG. 56 shows the miss distance dispersions of set 207; these figures use the traditional Kepler Lambert solution rather than MCPI. These sets are also ballistic intercept trajectories rather than the Earth fixed target. These results are very similar to sets 105 and 205 which used MCPI. The primary difference is that the Kepler solution introduces a bias error due to the spherical gravity assumption inherent in it. Because of the large scatter in the non-PVD set 107 the bias is not very apparent. In the PVD guidance set 206 the bias can be clearly seen. The dispersion pattern size is about the same for the Kepler and MCPI sets except that set 207 has a large number of outliers forming a 2nd group. The reason for this is unknown.

Aimpoint Dispersion with No Dynamic Tau Limiting

Figures 57, 58:
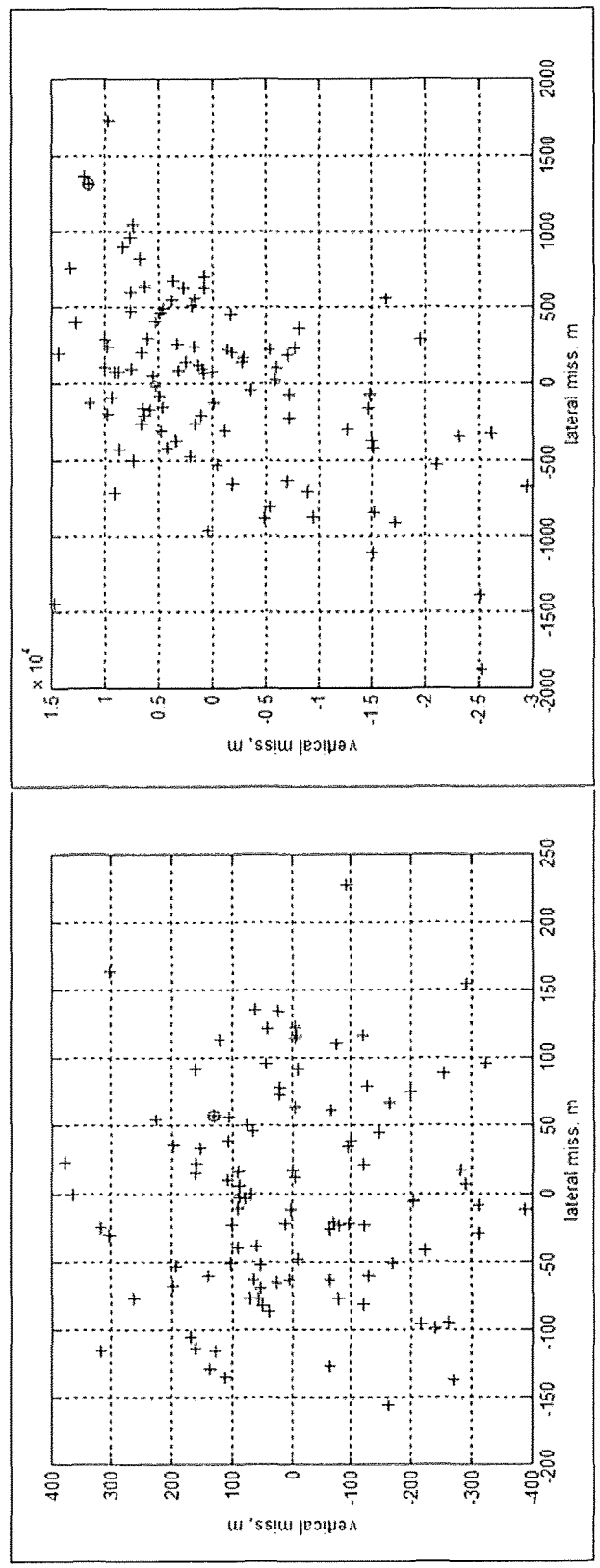
FIG. 57 shows the set 204 miss distance diversions.
FIG. 58 shows the set 208 miss distance dispersions.
Figure 60:
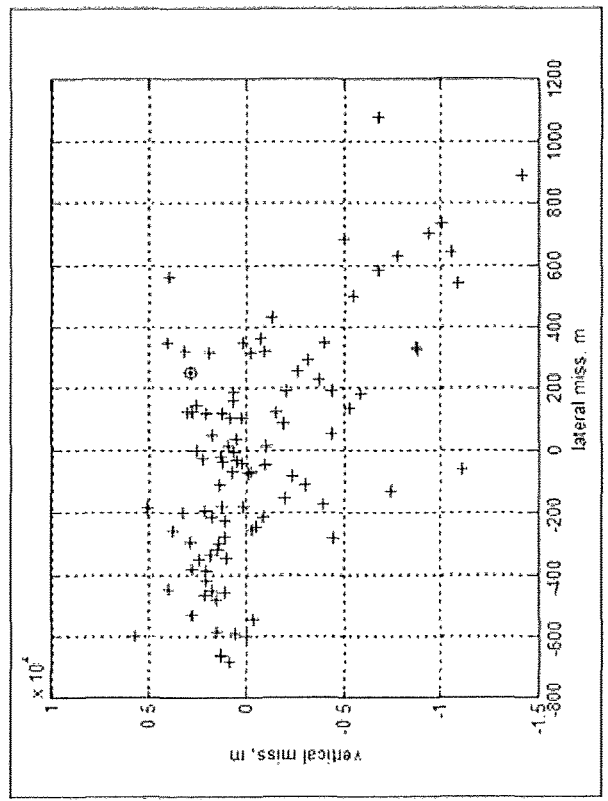
FIG. 60 shows the set 209 miss distance dispersions.
Figure 59:
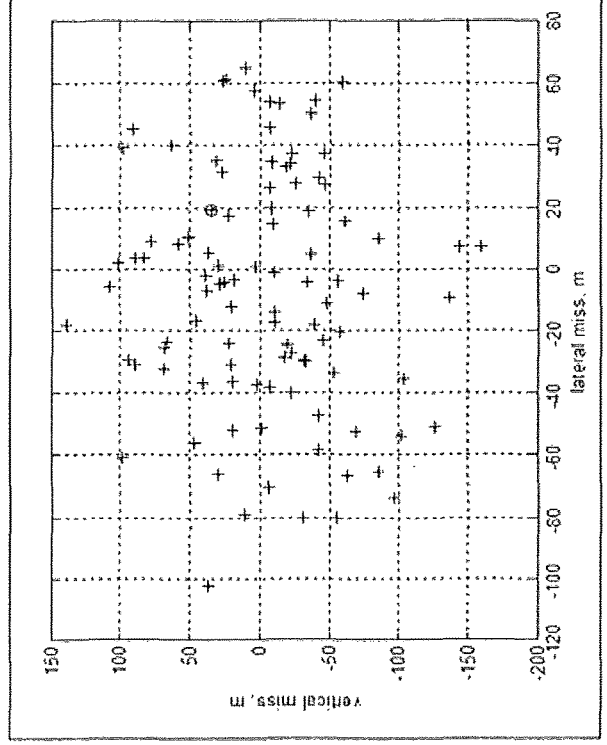
FIG. 59 shows the set 205 miss distance dispersions.

FIG. 57 shows the set 204 miss distance dispersions. FIG. 58 shows the set 208 miss distance dispersions. FIG. 59 shows the set 205 miss distance dispersions. FIG. 60 shows the set 209 miss distance dispersions. Sets 208 and 209 demonstrate the effect of not using the dynamic time constant limiting as described herein and not increasing the time constant as was done in sets 304 and 305. These sets are compared to 204 and 205 which are set up identically except that they employ the limiting. In both cases the elimination of the limiting increases the dispersion.

Accuracy Revisited

The simulation results above demonstrated the performance benefits of the PVD guidance; however there were areas that could be improved. The first of these was noticed in FIG. 44 which shows the POCA scatter for a case where only the motor Isp and the vehicle mass uncertainties were included. The PVD plot shows less than 100 meters of scatter, however the PVD guidance should be more capable than this, and the shape of pattern suggests that something may be limiting the PVD effectiveness. It was suspected that the 200 m/s Vcap GEMS reserve was insufficient to allow complete settling of the ZEM during the PVD guidance. In other words, an earlier transition to PVD guidance may be beneficial.

One additional point of concern was that there were no uncertainties applied to the system before third stage ignition. Dispersions prior to 3rd stage ignition are not expected to have any significant effect on accuracy, however for completeness it would be good to demonstrate this.

To address these concerns an additional two Monte-Carlo sets were performed. To address the lack of dispersions at 3rd stage ignition a launch location uncertainty was added to the initial latitude and longitude of the missile. This will assure that significant scatter is present in the ignition state of the 3rd stage booster. The uncertainties were also divided into two groups rather than three as was done in the original runs. The revised uncertainties are shown in Table 3 and Table 4. In Table 3, a launch position uncertainty of 1 degree (1-sigma) was added for latitude and longitude.

Table 4 is the run matrix for the four supplemental sets. These sets are all being flown against the Earth fixed target, with Dynamic Tau Limiting, GEMS, and the MCPI Lambert solution turned on.

Vcap Reserve Sufficiency

Figures 61, 62:
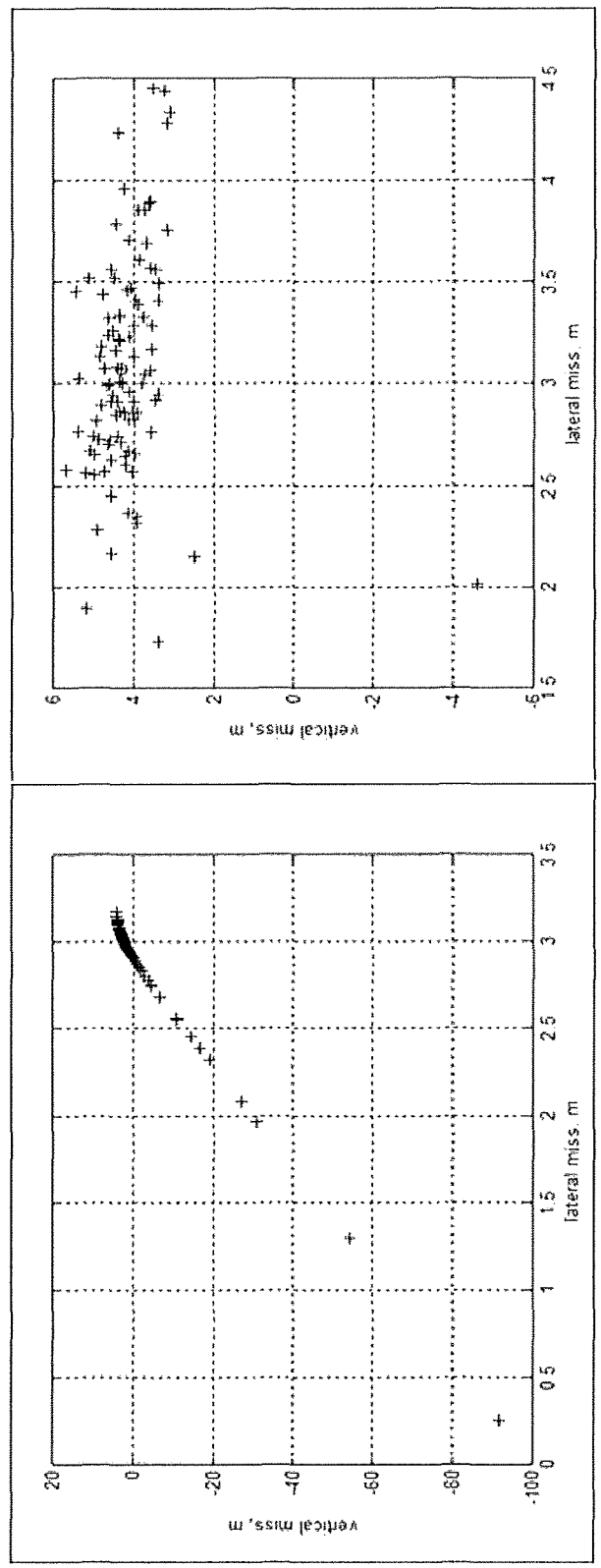
FIG. 61 shows the miss distance dispersions for set 201 of the simulations.
FIG. 62 shows the miss distance dispersions for set 401 of the simulations.

FIG. 61 shows the miss distance dispersions of set 201, and FIG. 62 shows the miss distance dispersions of set 401. Set 201 only includes Isp and mass uncertainties whereas set 401 includes all the uncertainties shown in Table 3 except the Group 4 uncertainties. The Group 1 uncertainties indicate error sources that introduce misalignment between the nominal thrust vector (no TVC deflection) and the missile axis. These errors are lateral cg location, lateral TVC pivot location, and thrust vector misalignment. The other difference between the two is that set 401 uses a 400 m/s Vcap reserve while set 201 uses 200 m/s. The linear stringing of the miss distances in set 201 indicates that for some Monte-Carlo runs the PVD guidance is not completely settled before the motor burns out. The scatter should be much smaller. Set 401 shows what happens when more time is allowed. By doubling the Vcap reserve, the PVD guidance will start earlier allowing more time. Even with the additional error sources, set 401 has a much smaller dispersion pattern due to the increased reserve value. The maximum dispersion for set 401 is about 6 meters from the aimpoint. This is exceptional accuracy for a set of Monte-Carlo runs with large mass and motor uncertainties over a 10,000 km range trajectory using an EGM96 Earth gravity model.

Figures 63, 64:
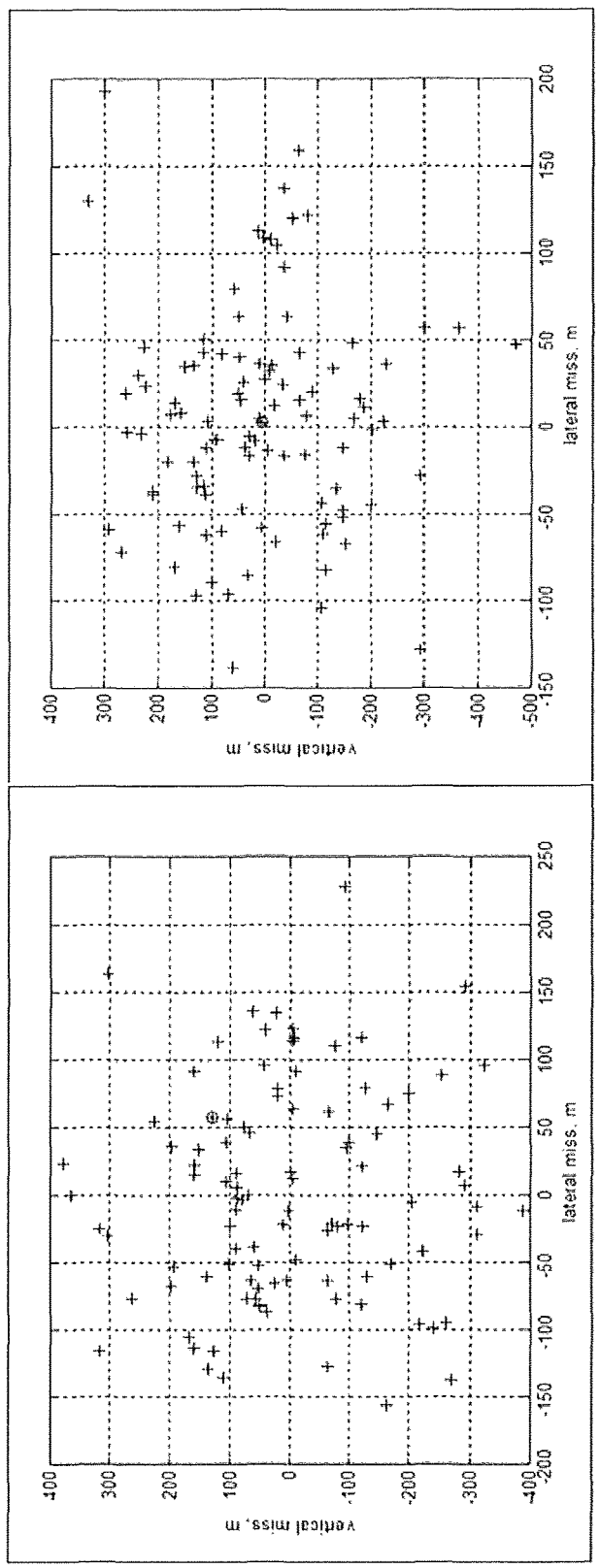
FIG. 63 shows the miss distance dispersions for set 204 of the simulations.
FIG. 64 shows the miss distance dispersions for set 402 of the simulations.

FIG. 63 shows the miss distance dispersions for set 204, and FIG. 64 shows the miss distance dispersions for set 402. Set 204 includes all of the error sources that were originally included in this study, while set 402 includes the error sources shown in Table 3 which are identical to the original errors with the addition of launch point scatter. Set 204 has a 200 m/s Vcap reserve while set 402 has a 400 m/s reserve. The miss distance dispersions are comparable for these two sets, with a slight overall improvement for set 402 due to the additional time allowed by the additional Vcap reserve. The primary sources of dispersion for both of these sets are the lateral cg bias, lateral TVC pivot bias, and thrust vector direction bias all of which introduce nominal thrust misalignment with the missile axis.

Conclusions from Simulations

The analysis and simulations successfully demonstrated the behavior and performance of the PVD guidance method. The guidance method performed as expected throughout the study.

The following aspects of PVD guidance were demonstrated:

Pseudo-loop ZEM comparisons show that the analogy is correct and PVD guidance works exactly the way it is claimed to work.

Dispersion scatter plots show that PVD guidance virtually eliminates any sensitivity to mass and impulse uncertainties.

TVC and cg lateral bias errors and thrust vector alignment errors are the most significant contributor to targeting dispersions when using PVD guidance. This assumes sufficient settling time for the PVD guidance as well as perfect navigation and no reentry aerodynamics.

Earth fixed target performance and ballistic intercept performance are comparable if scaled for TOF.

Dynamic time constant limiting prevents system nonlinearities from dominating the dynamics, and allows for a much smaller time constant at the end, which results in improved accuracy.

Kepler Guidance Methods

Basic Lambert Solution:

The Lambert boundary value problem is the classic ballistic missile guidance solution for the correlated velocity vector. The basic Lambert solution solves the 2-D Kepler boundary value problem defined by the Earth centered radius to the missile, the Earth centered radius to the aimpoint, and the angle between these two radii subject to a time-of-flight (TOF) constraint as shown by Zarchan. There are many methods for solving this problem. Zarchan provides an easily implemented method that relies on iteration of equations (14.1) through (14.3) using the parameters shown in FIG. 16.

$$V = \sqrt{\frac{gm(1-\cos(\phi))}{r_i \cos(\gamma)\left(\frac{r_i}{r_f}\cos(\gamma) - \cos(\phi+\gamma)\right)}} \qquad 19$$

$$\lambda = \frac{r_i V^2}{gm} \lambda < 2 \qquad 20$$

$$TOF = \frac{r_i}{V\cos(\gamma)}\left(\frac{\tan(\gamma)(1-\cos(\phi)) + (1-\lambda)\sin(\phi)}{(2-\lambda)\left(\frac{1-\cos(\phi)}{\lambda\cos^2(\gamma)} + \frac{\cos(\gamma+\phi)}{\cos(\gamma)}\right)} + \frac{2\cos(\gamma)}{\lambda\left(\frac{2}{\lambda}-1\right)^{\frac{3}{2}}} \arctan\left(\frac{\sqrt{\frac{2}{\lambda}-1}}{\cos(\gamma)\cot\left(\frac{\phi}{2}\right) - \sin(\gamma)}\right)\right) \qquad 21$$

Zarchan suggests a secant method for solving the system of equations. The SED guidance uses a Newton Raphson as shown below, which is similar to the secant method:

i=0.
while ((abs(TOF$_{desired}$−TOF)>ε)&(i<10)) //Iterate on gamma until TOF converges
{
TOF,V=getTF($\gamma$, $r_i$, $t_f$, $\phi$); //get nominal TOF and velocity
TOFd,Vd=getTF($\gamma$+$\delta$, $r_i$, $r_f$, $\phi$); //perturb gamma to get perturbed TOF and velocity
$\gamma$=$\gamma$+$\delta$/(TOF$_\delta$−TOF)(TOF$_{desired}$−TOF); //use Newton Raphson method to update gamma i++
}

3-D Lambert with Earth Rotation

The full 3-D Lambert problem with Earth rotation can be easily transformed into the basic 2-D problem to solve as shown in the previous section. This is performed by first defining two separate [ECF2ECI] direction cosine matrices (DCMs) as shown in equations 22 through 24. The first of these is for the missile at ti (the current time during flight) and the second for the aimpoint at tf (time of arrival) where tf minus ti is equal to TOF. Using these DCMs the ECF missile position and the ECF aimpoint can be transformed into the ECI frame such that the missile is at its current position and the aimpoint is at the position it will hold when the missile arrives at the end of the flight.

$$ECF2ECI(t) = \begin{bmatrix} \cos(\omega t) & -\sin(\omega t) & 0 \\ \sin(\omega t) & \cos(\omega t) & 0 \\ 0 & 0 & 1 \end{bmatrix} \quad 22$$

$$\vec{X}_{ECI\,missile} = ECF2ECI(t_i)\vec{X}_{ECF\,missile} \quad 23$$

$$\vec{X}_{ECI\,aimpoint} = ECF2ECI(t_f)\vec{X}_{ECF\,aimpoint} \quad 24$$

Once the ECI positions for the missile and the aimpoint are obtained, the 2-D Lambert inputs can be calculated as follows in equations 25 through 27.

$$r_i = |\vec{X}_{ECImiss}| = \sqrt{X_{ECImiss}^2 + Y_{ECImiss}^2 + Z_{ECImiss}^2} \quad 25$$

$$r_f = |\vec{X}_{EClaim}| = \sqrt{X_{EClaim}^2 + Y_{EClaim}^2 + Z_{EClaim}^2} \quad 26$$

$$\phi = \arccos\left(\frac{\vec{X}_{ECImiss} \cdot \vec{X}_{EClaim}}{|\vec{X}_{ECImiss}||\vec{X}_{EClaim}|}\right) \quad 27$$

Based on these missile and aimpoint ECI positions, a convenient Lambert frame from which the 2-D solution may be transformed into ECI can be defined as follows:
1. Z axis (downward direction) is along the negative ECI missile position vector
2. Y axis (right hand direction) is found by taking the cross product of ECI aimpoint position vector and the ECI missile position vector
3. X axis (downrange direction) completes the right hand rule by crossing Y with Z.

These three unit vectors form the columns of the L2ECI DCM that transforms the 2-D Lambert velocity vector into the ECI frame as shown in equations 28 through 30.

$$\vec{X}_L = \frac{-\vec{X}mis_{ECI}}{|\vec{X}mis_{ECI}|} \vec{Y}_L = \frac{\vec{X}aim_{ECI} \times \vec{X}mis_{ECI}}{|\vec{X}aim_{ECI} \times \vec{X}mis_{ECI}|} \vec{Z}_L = \frac{\vec{Y}_L \times \vec{Z}_L}{|\vec{Y}_L \times \vec{Z}_L|} \quad 28$$

$$[L2ECI] = [\{\vec{X}_L\}\{\vec{Y}_L\}\{\vec{Z}_L\}] \quad 29$$

$$\vec{V}_{ECI} = [L2ECI]\begin{Bmatrix} V\cos(\gamma) \\ 0 \\ -V\sin(\gamma) \end{Bmatrix} \quad 30$$

Apogee Correlated Velocity from Lambert Solution

The apogee guidance solution is obtained by iterating on the full 3-D rotating Earth Lambert solution as shown below:
TOF=time of flight
δ=small delta time
$r_0$=radius magnitude from Earth center to missile
$r_f$=radius magnitude from Earth center to aimpoint
$r_{Vec0}$=radius vector froth Earth center to missile
$r_{Vecf}$=radius vector from Earth center to aimpoint
ϕ=angle between missile and aimpoint about Earth center
γ=angle above horizontal for the the inertial velocity vector
v=inertial velocity magnitude
atar=desired apogee
a,aδ=nominal and perturbed apogee
vgo=velocity-to-go vector
$u_{guide}$=attitude guidance unit vector in body frame
$xVec_M$=Vector position of the missile in the ECEF frame
$xVec_{Aim}$=Vector position of the aimpoint in the ECEF frame ECF2ECI(t)=ECEF to ECI transformation matrix at time=t
i=0.
while((abs(atar−a)>e)&(i<10))
{
  i++;
  //get apogee for nominal TOF of this iteration
  rVec0=[ECF2ECI(t)]xVec$_M$;
  rVecf=[ECF2ECI(t+TOF)]xVec$_{Aim}$;
  ϕ=arcos(dotproduct(rVec0,rVecf)/($r_0$*$r_f$));
  γ,v=Lambert($r_0$,$r_f$,ϕ,TOF); //per Zarchan
  a=getApogee($r_0$,γ,v); //per Bates
  //get apogee for perturbed TOF of this iteration
  rVecf=[ECF2ECI(t+TOF+δ)]xVec$_{Aim}$;
  ϕ=arcos(dot_product(rVec0,rVecf)/($r_0$*$r_f$));
  γ,v=Lambert($r_0$,$r_f$,ϕ,TOF+δ);//per Zarchan
  aδ=getApogee($r_0$,γ,v); //per Bates
  //get TOF next using Newton Raphson method
  TOF=TOF+δ(atar−a)/(aδ−a);
}

This is similar to the iteration that was performed for the Lambert solution itself except here TOF is the iteration variable being manipulated in order to arrive at the desired apogee. The apogee is predicted at each iteration as shown in equations 31 through 33 with the orbital parameters shown below (see R. Bate, D. D. Mueller and J. E. White, Fundamentals of Astrodynamics, New York: Dover, 1971):

Definitions:

μ = Earth gravity constant gm
$r_{Earth}$ = Earth radius
p = semi latus rectum
e = eccentricity
$\vec{r}$ = Earth center radius vector to missile
r = Earth center radius magnitude to missile
$\vec{v}$ = inertial missile velocity vector
v = inertial missile velocity magnitude $$e = \left|\frac{1}{\mu}\left(\left(v^2 - \frac{\mu}{r}\right)\vec{r} - (\vec{r}\cdot\vec{v})\vec{v}\right)\right| = \frac{1}{\mu}\sqrt{(rv^2\cos^2(\gamma) - \mu)^2 + (rv^2\sin(\gamma)\cos(\gamma))^2} \quad 31$$

$$p = \frac{|\vec{r}\times\vec{v}|^2}{\mu} = \frac{(rv\cos(\gamma))^2}{\mu} \quad 32$$

$$\text{apogee} = \frac{p}{1-e} - r_{Earth} \quad 33$$

To be clear, the process for obtaining the apogee solution requires a pair of nested iterations. The inner iteration loop is for the Lambert solution which solves for the correlated velocity vector at given TOF and the outer loop iterates on TOF to arrive at the desired apogee.

The inner loop Lambert solution requires determining the Lambert 2-D inputs as described in equations 22 through 27 and performing the iteration discussed herein. The Lambert solution provides the correlated velocity vector from which apogee is calculated. It is important to note that equations 31 through 33 which define the apogee can be calculated in any frame. It is convenient to use a simple 2-D frame defined by the X (downrange) and Z (down) vectors of the native Lambert frame defined in equations 28 and 29.

Once the apogee loop has converged to the desired apogee, the correlated velocity vector from the final Lambert solution (with desired apogee) must be transformed into the ECI frame using the L2ECI DCM.

TABLE 1

Monte Carlo Uncertainties

| | | Parameter | Type | 1 Sigma | Units |
|---|---|---|---|---|---|
| 1 | Group 1 | motor Isp | scale | 0.02 | s |
| 2 | Uncertainties | motor mass | scale | 0.01 | kg |
| 3 | | upper section mass | scale | 0.01 | kg |
| 4 | Group 2 | nozzle pivot location y | bias | 0.01 | m |
| 5 | Uncertainties | nozzle pivot location z | bias | 0.01 | m |
| 6 | | upper section cgy | bias | 0.01 | m |
| 7 | | upper section cgz | bias | 0.01 | m |
| 8 | Group 3 | motor burn time | scale | 0.05 | s |
| 9 | Uncertainties | nozzle pivot location x | bias | 0.01 | m |
| 10 | | motor cgx | bias | 0.05 | m |
| 11 | | motor cgy | bias | 0.01 | m |
| 12 | | motor cgz | bias | 0.01 | m |
| 13 | | motor Ixx | scale | 0.01 | kg * m^2 |
| 14 | | motor Iyy | scale | 0.01 | kg * m^2 |
| 15 | | motor Izz | scale | 0.01 | kg * m^2 |
| 16 | | motor Ixy | bias | 5.00 | kg * m^2 |
| 17 | | motor Ixz | bias | 5.00 | kg * m^2 |
| 18 | | motor Iyz | bias | 5.00 | kg * m^2 |
| 19 | | upper section cgx | bias | 0.05 | m |
| 20 | | upper section Ixx | scale | 0.01 | kg * m^2 |
| 21 | | upper section Iyy | scale | 0.01 | kg * m^2 |
| 22 | | upper section Izz | scale | 0.01 | kg * m^2 |
| 23 | | upper section Ixy | bias | 5.00 | kg * m^2 |
| 24 | | upper section Ixz | bias | 5.00 | kg * m^2 |
| 25 | | upper section Iyz | bias | 5.00 | kg * m^2 |
| 26 | | nozzle pitch misalignment* | bias | 0.50 | deg |
| 27 | | nozzle yaw misalignment* | bias | 0.50 | deg |
| 28 | | TVC bandwidth | scale | 0.05 | Hz |
| 29 | | TVC damping | scale | 0.05 | — |

Group 1 uncertainty indicates primary contributor to dispersion without PVD guidance. PVD guidance compensates for these effects.
Group 2 uncertainty indicates secondary contributor to dispersion. PVD Guidance does not compensate for these effects.
Group 3 uncertainty indicates minimal contribution to dispersion.
*Results indicate that nozzle alignment should have been considered as a Group 2 uncertainty

TABLE 2

Simulation Run Matrix

| # | ID | PVD | Tau Lim | MCPI | GEMS | Ballistic | G1 | G2 | G3 | ALL | Description/Purpose |
|---|---|---|---|---|---|---|---|---|---|---|---|
| 1 | 101 | | | X | | X | | | | X | Baseline primary errors PVD is designed to compensate for |
| 2 | 102 | | | X | X | | | X | | | Baseline secondary errors SF/Attitude Autopilot is designed to compensate for |
| 3 | 103 | | | X | X | | | | X | | Baseline errors that should have minimal effect on accuracy |
| 4 | 104 | | | X | X | | | | | X | Baseline sensitivity to all error sources |
| 5 | 105 | | | X | X | X | | | | X | Baseline ballistic intercept with all error sources |
| 6 | 106 | | | | X | | | | | X | Baseline Kepler guidance only with all error sources |
| 7 | 107 | | | | X | X | | | | X | Baseline Kepler guidance ballistic intercept with all error sources |
| 8 | 201 | X | X | X | X | | X | | | | PVD primary error sources which PVD is designed to compensate for |
| 9 | 202 | X | X | X | X | | | X | | | PVD secondary errors SF/Attitude Autopilot is designed to compensate for |
| 10 | 203 | X | X | X | X | | | | X | | PVD sensitivity to errors that should have minimal effect on accuracy |
| 11 | 204 | X | X | X | X | | | | | X | PVD sensitivity to all error sources |
| 12 | 205 | X | X | X | X | X | | | | X | PVD ballistic intercept with all error sources |
| 13 | 206 | X | X | | X | | | | | X | PVD Kepler guidance only with all error sources |
| 14 | 207 | X | X | | X | X | | | | X | PVD Kepler guidance ballistic intercept with all error sources |
| 15 | 208 | X | | X | X | | | | | X | Demonstrate benefit of Tau limiting (variable Tau) |
| 16 | 209 | X | | X | X | X | | | | X | |
| 17 | 304 | X | * | X | X | | | | | X | Demonstrate basic PVD guidance with no enhancements |

TABLE 2-continued

Simulation Run Matrix

| # | ID | PVD | Tau Lim | MCPI | GEMS | Ballistic | Uncertainties G1 | G2 | G3 | ALL | Description/Purpose |
|---|----|-----|---------|------|------|-----------|------|----|----|-----|---------------------|
| 18 | 305 | X | * | X | X | X | | | | X | Demonstrate basic PVD guidance with no enhancements with ballistic intercept |

\* Tau limiting is turned off (constantTau), however tau is sufficiently large (0.5/rateLimit) to avoid major nonlinearities
PVD Proportional Velocity Deficit guidance is turned on
Tau Lim Dynamic PVD time constant (tau) limiting is turned on
MCPI Modified Chebyshev Picard Iteration Lambert solution (alternative is Kepler)
GEMS Generalized Energy Management Steering is turned on
Ballistic Trajectory is the midcourse ballistic intercept (alternative is the fixed target)

TABLE 3

Monte-Carlo Uncertainties Revisited

| | | Parameter | Type | 1 Sigma | Units |
|---|---|---|---|---|---|
| 1 | Group 4 | motor cgy | bias | 0.01 | m |
| 2 | Uncertainties | motor cgz | bias | 0.01 | m |
| 3 | | upper section cgy | bias | 0.01 | m |
| 4 | | upper section cgz | bias | 0.01 | m |
| 5 | | nozzle pitch misalgnment | bias | 0.50 | deg |
| 6 | | nozzle yaw misalgnment | bias | 0.50 | deg |
| 7 | Group 5 | Launch Latitude | bias | 1.00 | deg |
| 8 | Uncertainties | Launch Longitude | bias | 1.00 | deg |
| 9 | | motor Isp | scale | 0.02 | s |
| 10 | | motor burn time | scale | 0.05 | s |
| 11 | | nozzle pivot location x | bias | 0.01 | m |
| 12 | | nozzle pivot location y | bias | 0.01 | m |
| 13 | | nozzle pivot location z | bias | 0.01 | m |
| 14 | | motor mass | scale | 0.01 | kg |
| 15 | | motor cgx | bias | 0.05 | m |
| 16 | | motor Ixx | scale | 0.01 | kg * m^2 |
| 17 | | motor Iyy | scale | 0.01 | kg * m^2 |
| 18 | | motor Izz | scale | 0.01 | kg * m^2 |
| 19 | | motor Ixy | bias | 5.00 | kg * m^2 |
| 20 | | motor Ixz | bias | 5.00 | kg * m^2 |
| 21 | | motor Iyz | bias | 5.00 | kg * m^2 |
| 22 | | upper section mass | scale | 0.01 | kg |
| 23 | | upper section cgx | bias | 0.05 | m |
| 24 | | upper section Ixx | scale | 0.01 | kg * m^2 |
| 25 | | upper section Iyy | scale | 0.01 | kg * m^2 |
| 26 | | upper section Izz | scale | 0.01 | kg * m^2 |
| 27 | | upper section Ixy | bias | 5.00 | kg * m^2 |
| 28 | | upper section Ixz | bias | 5.00 | kg * m^2 |
| 29 | | upper section Iyz | bias | 5.00 | kg * m^2 |
| 30 | | TVC bandwidth | scale | 0.05 | Hz |
| 31 | | TVC damping | scale | 0.05 | — |

Group 4 uncertainty indicates thrust misalignment contributor to dispersion w/PVD guidance
Group 5 indicates minimal contribution to dispersion w/PVD guidance

TABLE 4

Supplemental Run Matrix

| # | ID | PVD | Tau Lim | MCPJ | GEMS | Ballistic | Uncertainties G4 | G5 | Description/Purpose |
|---|----|-----|---------|------|------|-----------|------|----|---------------------|
| 19 | 401 | X | X | X | X | | | X | Demonstrate effect of additional Vcap reserve without thrust misalignments |
| 20 | 402 | X | X | X | X | | X | X | Demonstrate effect of additional Vcap reserve when all uncertainties are included |

What is claimed is:

1. A method for guiding a ballistic missile to a target, the method comprising the steps of:
    initiating a first mode guidance process, the first mode guidance process driving a magnitude of a velocity-to-go (Vgo) vector;
    downwardly to a value substantially equal to a proportional velocity deficit value, where the proportional velocity deficit value is equal to a time constant (Tau) multiplied by a specific force magnitude (sf);
    initiating a second mode guidance process once the magnitude of the Vgo vector has been driven to a value substantially equal to the proportional velocity deficit value by way of the first mode guidance process, the second mode guidance process constraining the magnitude of the Vgo vector to be equal to the proportional velocity deficit value throughout the remaining portion of powered flight;
    integrating each of the above steps into a single onboard missile guidance system.

2. The method of claim 1 wherein the specific force is observable using an accelerometer within an inertial measurement unit (IMU) of the missile.

3. The method of claim 1, wherein the Vgo vector is an additional velocity required to fly in a ballistic manner, with no application of propulsion or control forces, to the target.

4. The method of claim 1, wherein the first and the second mode guidance processes are executed by maintaining substantial alignment of a missile thrust vector along a direction of the Vgo vector.

5. The method of claim 4, wherein the proportional velocity deficit value is limited to a minimum value as a motor of the missile burns out so that a stable thrust vector direction is maintained as the motor's thrust and specific force diminish.

6. The method of claim 1, wherein the first mode guidance process is executed by maintaining substantial alignment of a missile thrust vector along a direction that is biased away from a direction of the Vgo vector by an energy wasting angle, and the second mode guidance process is executed by maintaining substantial alignment of the missile thrust vector along the Vgo vector direction.

7. The method of claim 6, wherein the proportional velocity deficit value is limited to a minimum value as a motor of the missile burns out so that a stable thrust vector direction is maintained as the motor's thrust and specific force diminish.

8. The method of claim 6, wherein the energy wasting angle is determined on regular intervals such that an approximate amount of motor impulse or delta-velocity capability remaining in the system at the initiation of the second mode guidance process is selectable.

9. The method of claim 8, wherein a bias angle is calculated on regular intervals using generalized energy management steering (GEMS).

10. The method of claim 1, wherein a trajectory of the first mode guidance process is constrained by a desired elapsed time of flight or a desired time of arrival on target.

11. The method of claim 1, wherein a trajectory of the first mode guidance process is constrained by a trajectory characteristic other than the desired elapsed time of flight or a desired time of arrival on target.

12. The method of claim 10, wherein the Vgo vector in the first mode guidance process is a correlated velocity vector returned by a Lambert solution minus a missile velocity vector.

13. The method of claim 11, wherein the Vgo vector in the first mode guidance process is the correlated velocity vector returned by a Lambert solution minus a missile velocity vector, where the Lambert solution has been iterated on to achieve a desired constraint.

14. The method of claim 1, wherein a Vgo vector in the second mode guidance process is a vector returned by a correlated velocity vector of a Lambert solution minus a missile velocity vector, where the Lambert solution has been iterated on to constrain the Vgo vector magnitude to be equal to the proportional velocity deficit value.

15. The method of claim 14, wherein two possible solutions exist for the Vgo vector direction and the desired solution is forced by first estimating an elapsed time of flight or time of arrival of a desired solution and then using this estimate as an initial guess in the iteration.

16. The method of claim 15, wherein the time of flight or time or time of arrival on target for the desired Vgo vector solution is estimated by using analytical geometry in conjunction with a local linearization of the locus of Lambert solutions.

17. The method of claim 1, wherein the second mode guidance process time constant (Tau) is varied from an initial value to a final value over a period of time starting at the initiation of the second mode guidance process.

18. The method of claim 17, wherein the initial value of the time constant must be larger than a minimum time required for a missile thrust axis to transition from an attitude of the missile thrust axis as it is at the beginning of the second mode guidance process to a range-insensitive-axis (RIA) of the trajectory, wherein the RIA is defined as the axis along which adding additional impulse will not change a ballistic zero effort miss distance (ZEM).

19. The method of claim 18, wherein a total included angle between the initial attitude and the RIA is not substantially greater than 90 degrees.

20. The method of claim 17, wherein an appropriate final value of Tau is determined through a pseudo-loop analysis using established linear controls analysis methods.

21. The method of claim 20, wherein an appropriate final value of Tau is determined such that a bandwidth of a pseudo-loop is substantially less than a bandwidth of the missile control system.

22. The method of claim 17, wherein Tau is varied over a substantially short period of time at the beginning of the second mode guidance process.

23. A method for guiding a ballistic missile to a target, the method comprising the steps of:
    repeatedly calculating on regular intervals a proportional velocity deficit value, where the proportional velocity deficit value is substantially equal to a time constant (Tau) multiplied by a specific force magnitude (sf);
    constraining the magnitude of a velocity-to-go (Vgo) vector to be equal to the proportional velocity deficit value.

24. The method of claim 23, further comprising integrating each of the steps of the process of repeatedly calculating on regular intervals a proportional velocity deficit value and then constraining the magnitude of Vgo to be substantially equal to the proportional velocity deficit value, into a single onboard missile guidance system.

25. The method of claim 24, further comprising: before the step of constraining the magnitude of Vgo to be substantially equal to the proportional velocity deficit value, driving the magnitude of Vgo downwardly to a value substantially equal to the proportional velocity deficit value.

26. The method of claim 24, further comprising the use of generalized energy management steering (GEMS) to control the approximate amount of motor impulse or delta-velocity capability remaining in the system at the initiation of the second mode guidance process.

\* \* \* \* \*